US012192674B2

(12) United States Patent
Lu et al.

(10) Patent No.: US 12,192,674 B2
(45) Date of Patent: Jan. 7, 2025

(54) VIDEO CALL METHOD AND DISPLAY APPARATUS

(71) Applicant: JUHAOKAN TECHNOLOGY CO., LTD., Shandong (CN)

(72) Inventors: Feng Lu, Shandong (CN); Kun Gao, Shandong (CN); Hongye Ren, Shandong (CN); Lei Zhang, Shandong (CN)

(73) Assignee: JUHAOKAN TECHNOLOGY CO., LTD., Shandong (CN)

( * ) Notice: Subject to any disclaimer, the term of this patent is extended or adjusted under 35 U.S.C. 154(b) by 222 days.

(21) Appl. No.: 18/145,596

(22) Filed: Dec. 22, 2022

(65) Prior Publication Data
US 2023/0126656 A1 Apr. 27, 2023

Related U.S. Application Data

(63) Continuation of application No. PCT/CN2021/101051, filed on Jun. 18, 2021.

(30) Foreign Application Priority Data

Jul. 8, 2020 (CN) .......................... 202010651978.X
Jul. 14, 2020 (CN) .......................... 202010674682.X
(Continued)

(51) Int. Cl.
*H04N 7/14* (2006.01)
*G06F 3/0481* (2022.01)

(52) U.S. Cl.
CPC ........... *H04N 7/147* (2013.01); *G06F 3/0481* (2013.01)

(58) Field of Classification Search
CPC .............................. H04N 7/147; G06F 3/0481
See application file for complete search history.

(56) References Cited

U.S. PATENT DOCUMENTS 10,362,272 B1 * 7/2019 Van Os .................... H04L 51/04
11,140,203 B1 * 10/2021 Butterfield ............ H04L 65/403
(Continued)

FOREIGN PATENT DOCUMENTS

| CN | 101212751 A | 7/2008 |
|----|-------------|--------|
| CN | 102572370 A | 7/2012 |

(Continued)

OTHER PUBLICATIONS

Chinese First Office Action, mailed Jan. 31, 2024, from China Application No. 202010674682.X, 9 pages.
(Continued)

*Primary Examiner* — Amal S Zenati
(74) *Attorney, Agent, or Firm* — Workman Nydegger

(57) ABSTRACT

Provided are a video call method and a display apparatus. The display apparatus includes: a display, an audio player, a communicator, a user input interface, and a controller. The controller is configured to: control the display to present a first area and a second area on a call interface for a video call, where the first area is for presenting one or more video chatting windows, and the second area is for presenting one or more voice chatting windows; obtain a quantity Y for indicating number of parties currently participating in the video call from the sever; and in response to the quantity Y being greater than a preset quantity X of channels that the display apparatus is able to support, control the display to present X video chatting windows in the first area, and control the display to present (Y-X) voice chatting windows in the second area.

20 Claims, 36 Drawing Sheets

(30) Foreign Application Priority Data

| | | |
|---|---|---|
| Jul. 14, 2020 | (CN) | 202010677179.X |
| Aug. 3, 2020 | (CN) | 202010766773.6 |
| Aug. 6, 2020 | (CN) | 202010783609.6 |

(56) References Cited

U.S. PATENT DOCUMENTS

| | | |
|---|---|---|
| 2005/0168628 A1 | 8/2005 | Wang et al. |
| 2007/0115948 A1 | 5/2007 | Dasgupta et al. |
| 2011/0314394 A1* | 12/2011 | Kilmer ............... H04L 12/1822 715/755 |
| 2015/0070582 A1 | 3/2015 | Jung et al. |
| 2015/0244981 A1 | 8/2015 | Johnson |
| 2018/0146161 A1 | 5/2018 | Kang et al. |

FOREIGN PATENT DOCUMENTS

| | | |
|---|---|---|
| CN | 102857637 A | 1/2013 |
| CN | 103259820 A | 8/2013 |
| CN | 103458311 A | 12/2013 |
| CN | 104010158 A | 8/2014 |
| CN | 104065911 A | 9/2014 |
| CN | 104253899 A | 12/2014 |
| CN | 104580995 A | 4/2015 |
| CN | 104954591 A | 9/2015 |
| CN | 105068728 A | 11/2015 |
| CN | 105094957 A | 11/2015 |
| CN | 105407408 A | 3/2016 |
| CN | 105872439 A | 8/2016 |
| CN | 105872832 A | 8/2016 |
| CN | 106162046 A | 11/2016 |
| CN | 106453828 A | 2/2017 |
| CN | 106664389 A | 5/2017 |
| CN | 106817627 A | 6/2017 |
| CN | 107222791 A | 9/2017 |
| CN | 107396198 A | 11/2017 |
| CN | 108111797 A | 6/2018 |
| CN | 108632560 A | 10/2018 |
| CN | 108712577 A | 10/2018 |
| CN | 108881633 A | 11/2018 |
| CN | 109151367 A | 1/2019 |
| CN | 109348070 A | 2/2019 |
| CN | 109714485 A | 5/2019 |
| CN | 110087021 A | 5/2019 |
| CN | 110430384 A | 11/2019 |
| KR | 20140022132 A | 2/2014 |
| KR | 20160092820 A | 8/2016 |

OTHER PUBLICATIONS

Chinese First Office Action, mailed Feb. 29, 2024, from China Application No. 202010677179.X, 22 pages.

Chinese First Office Action, mailed Jan. 31, 2024, from China Application No. 202180054945.X, 12 pages.

International Search Report and Written Opinion, mailed Sep. 3, 2021, from PCT/CN2021/101051.

Chinese First Office Action, mailed Aug. 31, 2021, from China App. No. 202010651978.X.

Chinese First Office Action, mailed Mar. 11, 2021, from China App. No. 202010766773.6.

Chinese Second Office Action, mailed Jun. 24, 2022, from China App. No. 202010766773.6.

* cited by examiner

VIDEO CALL METHOD AND DISPLAY APPARATUS

CROSS-REFERENCE OF RELATED APPLICATIONS

The application is a continuation application of International Application No. PCT/CN2021/101051 filed Jun. 18, 2021, which claims the priorities from Chinese Patent Applications No. 202010651978.X filed on Jul. 8, 2020, No. 202010674682.X filed on Jul. 14, 2020, No. 202010677179.X filed on Jul. 14, 2020, No. 202010766773.6 filed on Aug. 3, 2020, and No. 202010783609.6 filed on Aug. 6, 2020, which are hereby incorporated by reference in their entireties.

TECHNICAL FIELD

Embodiments of the disclosure relates to the field of video call technology, and in particular, to a video call method and a display apparatus.

BACKGROUND

A video call application can be installed in a display apparatus. After a video call is established, multiple parties can join the conversation in the corresponding virtual room, which requires multiple windows to be displayed on the call interface, so as to form a multi-channel video call.

SUMMARY

Embodiments of the disclosure provide a video call method and a display apparatus.

An embodiment of the disclosure provides a display apparatus, including: a display: an audio player: a communicator configured to connect the display apparatus in communication with a server: a user interface configured to receive an operation input by a user; and a controller connected with the display, the audio player, the communicator and the user interface respectively, where the controller is configured to: control the display to display a first area and a second area on a call interface, where the first area is used to display a window for video, and the second area is used to display a window for voice: obtain the number Y of current call channels of a video call from the sever; and in response to determining that the number Y of current call channels is greater than a preset number X of channels, control the display to display X windows for video in the first area, and control the display to display (Y-X) windows for voice in the second area, where Y is a positive integer, and X is an integer greater than or equal to 2.

An embodiment of the disclosure provides a video call method for a display apparatus, including: controlling a display of the display apparatus to display a first area and a second area on a call interface, where the first area is used to display a window for video, and the second area is used to display a window for voice: obtaining the number Y of current call channels of a video call from a server connected communicatively to the display apparatus; and in response to determining that the number Y of current call channels is greater than a preset number X of channels, controlling the display to display X windows for video in the first area, and controlling the display to display (Y-X) windows for voice in the second area, where Y is a positive integer, and X is an integer greater than or equal to 2.

DETAILED DESCRIPTION

In order to make the purposes, embodiments and advantages of the disclosure clearer, the embodiments of the disclosure will be described clearly and completely below in combination with the accompanying drawings in embodiments of the disclosure. Obviously the described embodiments are only some but not all the embodiments.

It should be noted that the brief description of the terms in the disclosure is only for the convenience of understanding the embodiments described hereafter, and is not intended to limit the embodiments of the disclosure. Unless indicated otherwise, these terms should be understood according to the plain and ordinary meanings.

The term "remote control" used in the embodiments of the disclosure refers to a component of an electronic device (such as the display apparatus disclosed in the disclosure), which can generally control the electronic device wirelessly within a relatively short distance range. This component may generally be connected with the electronic device by using infrared ray and/or Radio Frequency (RF) signal and/or Bluetooth, and may also include the Wireless Fidelity (WiFi) based on the IEEE 802.11b standard, wireless Universal Serial Bus (USB), Bluetooth, motion sensor and other modules. For example, the handheld touch remote control uses a user interface in the touch screen to replace most of the physical keys in the general remote control device.

Figure 1:
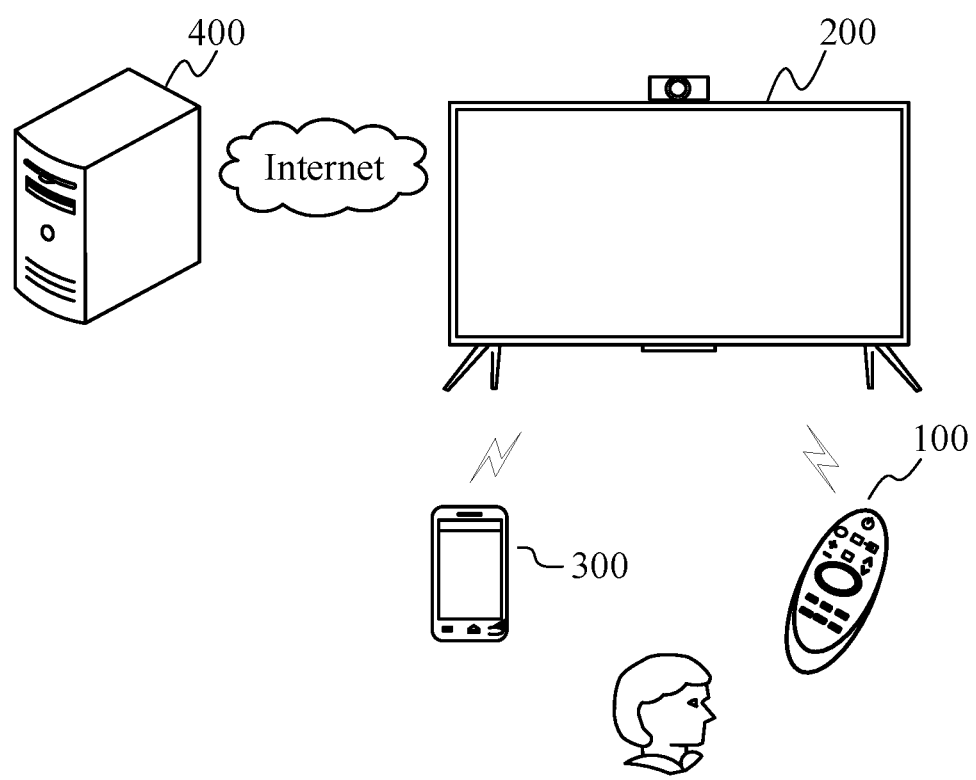
FIG. 1 shows a schematic diagram of a scenario between a display apparatus 200 and a control device 100.

FIG. 1 shows a schematic diagram illustrating a scenario of a display apparatus according to some embodiments. As shown in FIG. 1, a user can operate the display apparatus 200 through the mobile terminal 300 or the control device 100.

In some embodiments, the control device 100 may be a remote controller, which includes the infrared protocol communication or Bluetooth protocol communication and other short-range communication methods, etc., and controls the display device 200 wirelessly or by other wired methods.

In some embodiments, a mobile terminal, tablet computer, computer, laptop and other smart devices may also be used to control the display apparatus 200.

In some embodiments, the mobile terminal 300 and the display apparatus 200 may have software applications installed, so that the connection and communication between them through the network communication protocols can be implemented, thereby achieving the purpose of one-to-one control operation and data communication.

As also shown in FIG. 1, the display apparatus 200 can perform the data communication with a server 400 through various communication methods.

The display apparatus 200 may be a liquid crystal display, an OLED display, or a cast display apparatus.

In addition to the broadcasting TV function, the display apparatus 200 may additionally provide the smart network TV function supported by the computer.

Figure 2:
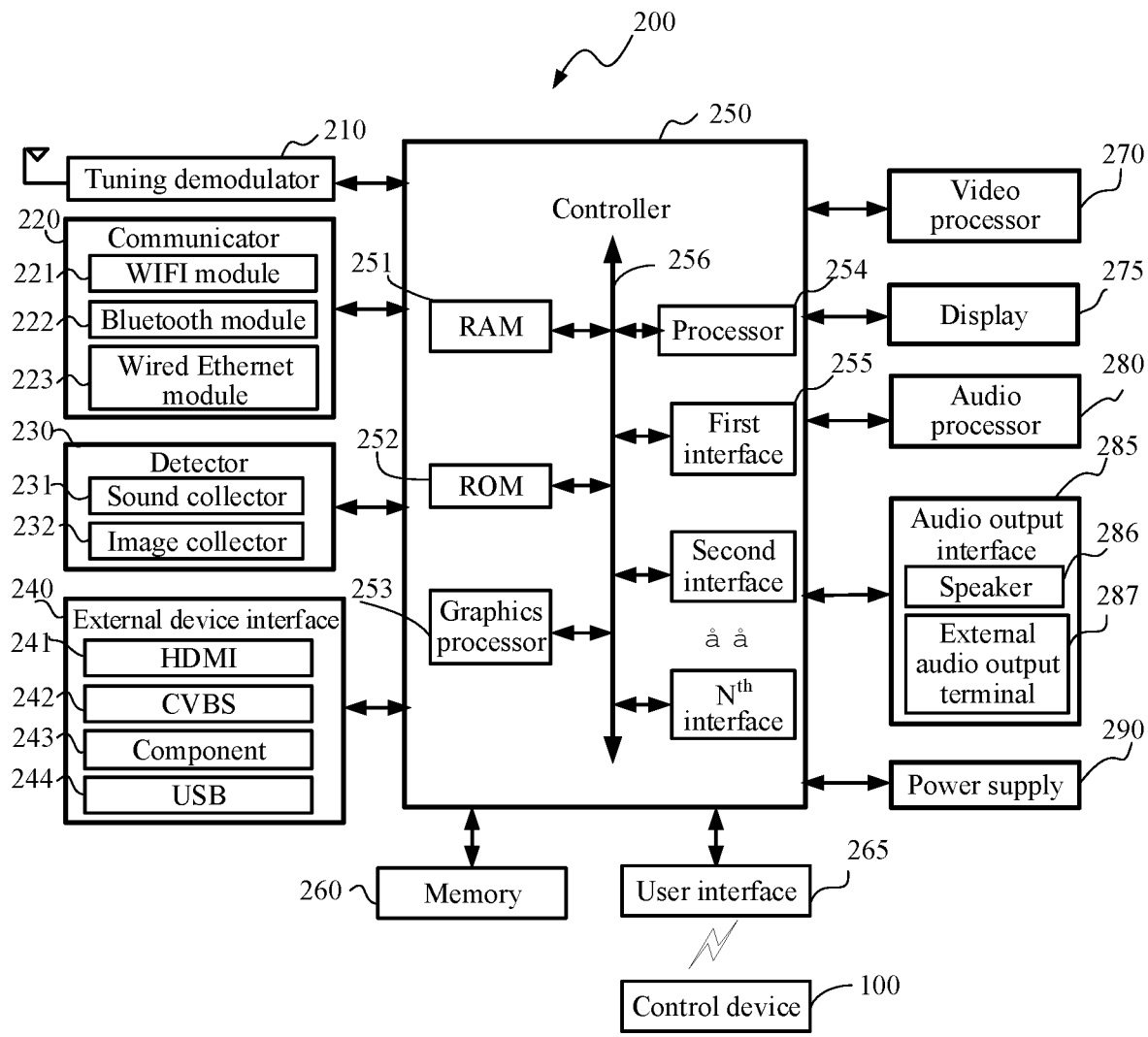
FIG. 2 shows a block diagram of a hardware configuration of the display apparatus 200 in FIG. 1.

FIG. 2 shows a block diagram of the hardware configuration of the display apparatus 200 according to an embodiment.

In some embodiments, the display apparatus 200 includes at least one of a controller 250, a modem 210, a communicator 220, a detector 230, an input/output interface 255, a display 275, an audio output interface 285, a memory 260, a power supply 290, a user interface 265 and an external device interface 240.

The detector 230 may also include a sound collector or the like, such as a microphone, which may be used to receive the user's voice, for example, including a voice command from the user to control the display apparatus 200, or collect the environmental sounds to identify the type of the environmental scene, so that the display apparatus 200 can adapt to the environmental noise.

In some embodiments, as shown in FIG. 2, the input/output interface 255 is configured to communicate data between the controller 250 and other external device or other controller 250, for example: receive the video signal data and audio signal data or the instruction data from the external device, etc.

In some embodiments, the controller 250 controls the operations of the display apparatus and responds to the user's operations through various software applications stored in the memory. The controller 250 controls the overall operation of the display apparatus 200. For example, in response to receiving a user command for selecting a UI object displayed on the display 275, the controller 250 may perform the operations related to the object selected by the user command.

In some embodiments, the object may be any one of selectable objects, e.g., hyperlink, icon or other controls available for selection. The operations related to the selected object include: the operation of displaying the link to the hyperlink page, document, image or the like, or the operation of launching an application corresponding to the icon. The user command for selecting the UI object may be a command input through various input devices (for example, mouse, keyboard, touch pad, etc.) connected with the display apparatus 200 or a voice command corresponding to the voice uttered by the user.

As shown in FIG. 2, the controller 250 includes at least one of a Random Access Memory (RAM) 251, a Read-Only Memory (ROM) 252, a video processor 270, an audio processor 280, other processor 253 (e.g., a Graphics Processing Unit (GPU)), a Central Processing Unit (CPU) 254, a communication interface, and a communication bus 256.

In some embodiments, the graphics processor 253 is used to generate various graphics objects, such as icons, operation menus, graphics for user commands input, etc. The graphics processor includes: an arithmetic unit that performs operations by receiving various interactive commands input from users and displays various objects according to the display attributes, and a renderer that renders various objects obtained based on the arithmetic unit and displays the rendered objects on the screen.

In some embodiments, the video processor 270 is configured to receive an external video signal and perform at least one of decompression, decoding, scaling, noise reduction, frame rate conversion, resolution conversion, image synthesis and other video processing according to the standard codec protocol of the input signal, to obtain a signal that can be displayed or played directly on the display apparatus 200.

In some embodiments, the video processor 270 includes a de-multiplexing module, a video decoding module, an image synthesis module, a frame rate conversion module, a display formatting module, etc.

Here, the de-multiplexing module is used to de-multiplex the input audio and video data stream, e.g., the MPEG-2 signal, and the de-multiplexing module de-multiplexes it into a video signal and an audio signal, etc.

The video decoding module is used to process the de-multiplexed video signal, including decoding and scaling, etc.

The image synthesis module, such as image synthesizer, is used to superimpose and mix a GUI signal generated by a graphics generator itself or according to the user input with the scaled video image, to generate an image signal for display on the display:

In some embodiments, the graphics processor 253 may be integrated with the video processor, and may process graphics signals output to the display: or the graphics processor 253 may be separated from the video processor, and may perform different functions, for example, GPU+FRC (Frame Rate Conversion) architecture.

In some embodiments, the audio processor 280 is used to receive an external audio signal, and perform decompression and decoding, etc, according to the standard codec protocol of the input signal, to obtain a sound signal that can be played in the speaker.

In some embodiments, the video processor 270 may include one or more chips. The audio processor may also include one or more chips.

In some embodiments, the video processor 270 and the audio processor 280 may be separate chips, or may be integrated into one or more chips together with the controller.

In some embodiments, the audio output interface receives the sound signal output from the audio processor 280 under the control of the controller 250, such as a speaker 272: may include an external audio output terminal for outputting to a speaker of an external device, such as an external audio interface or a headphone interface, etc, in addition to the speaker carried by the display apparatus 200 itself; and may also include a short-range communication module in the communication interface, such as a Bluetooth module for outputting sound from a Bluetooth speaker.

The power supply 290 provides the power supply support for the display apparatus 200 through the power input from an external power supply under the control of the controller 250. The power supply 290 may include a built-in power supply circuit inside the display apparatus 200, or may be a power supply outside the display apparatus 200, and a power interface of the external power supply is provided in the display apparatus 200.

The user interface 265 is used to receive user input signals, and then send the user input signals to the controller 250. The user input signals may be remote controller signals received through the infrared receiver, and various user control signals may be received through the network communication module.

In some embodiments, the user inputs a command through the control device 100 or the mobile terminal 300, the user input interface is based on the user's input, and the display apparatus 200 responds to the user's input through the controller 250.

In some embodiments, the user may input a command on the Graphical User Interface (GUI) presented on the display 275, and the user input interface receives the command through the Graphical User Interface (GUI). Alternatively, the user may input a command by inputting the particular sound or gesture, and the user input interface recognizes the sound or gesture through the sensor to receive the command.

The memory 260) includes various software modules for driving the display apparatus 200. For example, various software modules stored in the first memory include at least one of: a basic module, a detection module, a communication module, a display control module, a browser module, and various service modules, etc.

The basic module is an underlying software module for the signal communications among various hardware in the display apparatus 200 and sending the processing and control signals to the upper modules. The detection module is a management module for collecting various information from various sensors or user input interfaces and performing digital-to-analog conversion and analysis management.

For example, the voice recognition module includes a voice parsing module and a voice command database module. The display control module is a module for controlling the display to present the image content, and can be used to play the information such as multimedia image content and UI interface. The communication module is a module for performing the control and data communications with external devices. The browser module is a module for performing the data communications among browsing servers. The service module is a module for providing various services and various applications. Meanwhile, the memory 260 is further used to store external data and user data received, images of various items on various user interfaces, and visual effect diagrams of focus objects, etc.

Figure 3:
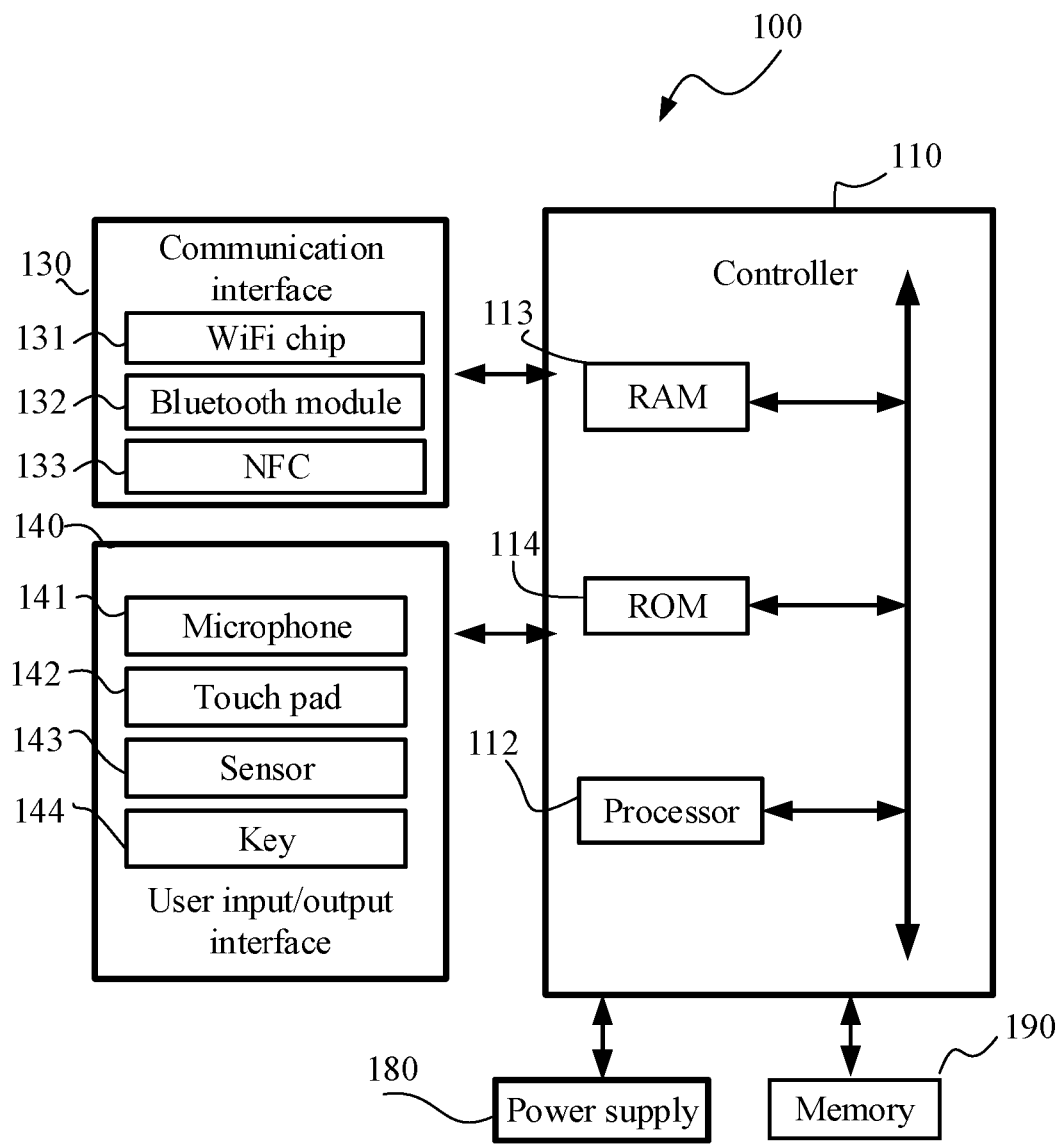
FIG. 3 shows a block diagram of a hardware configuration of the control device 100 in FIG. 1.

FIG. 3 shows a configuration block diagram of the control device 100 according to some embodiments. As shown in FIG. 3, the control device 100 includes a controller 110, a communication interface 130, a user input/output interface, a memory, and a power supply.

The control device 100 is configured to control the display apparatus 200, receive the input operation commands from the user, and convert the operation commands into instructions that can be recognized and responded by the display apparatus 200, playing an intermediary role between the user and the display apparatus 200. For example, the user operates the channel +/−keys on the control device 100, and the display apparatus 200 responds to the channel +/−operations.

In some embodiments, the control device 100 may be a smart device. For example, the control device 100 may install various applications for controlling the display apparatus 200 according to the user requirement.

In some embodiments, as shown in FIG. 1, the mobile terminal 300 or another smart electronic device may perform the function similar to the control device 100 after installing an application for controlling the display apparatus 200. For example, the user may provide various function keys or virtual buttons on the graphical user interface of the mobile terminal 300 or another smart electronic device by installing applications, to realize the functions of the physical keys on the control device 100.

The controller 110 includes a processor 112, an RAM 113, a ROM 114, a communication interface 130, and a communication bus. The controller is used to control the running and operations of the control device 100, and the communication cooperation among internal components as well as the external and internal data processing functions.

The communication interface 130 realizes the communications of control signals and data signals with the display apparatus 200 under the control of the controller 110. For example, the received user input signal is sent to the display apparatus 200. The communication interface 130 may include at least one of a WiFi chip 131, a Bluetooth module 132, an NFC module 133 and other near field communication modules.

In the user input/output interface 140, the input interface includes at least one of a microphone 141, a touch panel 142, a sensor 143, a key 144 and other input interfaces.

The input interface includes an interface for sending the receiving user command to the display apparatus 200. In some embodiments, it may be an infrared interface or a radio frequency interface.

In some embodiments, the control device 100 includes at least one of the communication interface 130 and the input/output interface 140. The communication interface 130 is configured in the control device 100, and may encode the command input from the user according to the WiFi protocol, Bluetooth protocol or NFC protocol and send it to the display apparatus 200.

The memory 190 is used to store various operating programs, data and applications that drive and control the control device 100 under the control of the controller. The memory 190 may store various kinds of signal commands input from the user.

The power supply 180 is used to provide operating power support for all the elements in the control device 100 under the control of the controller. It may be a battery and a related control circuit.

Figure 4:
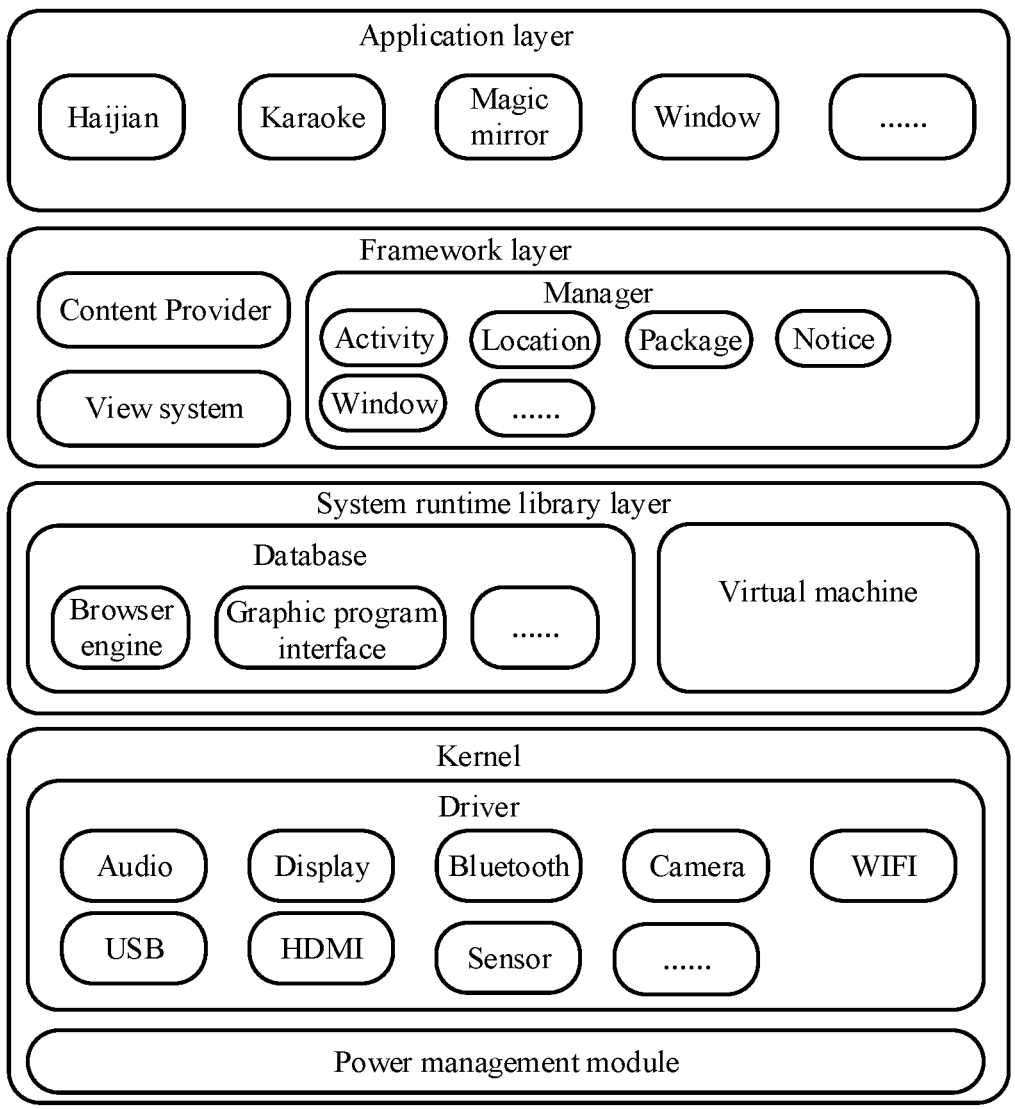
FIG. 4 shows a schematic diagram of a software configuration of the display apparatus 200 in FIG. 1.

Referring to FIG. 4, in some embodiments, the system is divided into four layers, which are, from top to bottom, an applications layer (referred to as "application layer" for short), an application framework layer (referred to as "framework layer" for short), an Android runtime and system library layer (referred to as "system runtime library layer" for short), and a kernel layer.

As shown in FIG. 4, the application framework layer in embodiments of the disclosure includes a manager, a content provider, etc., where the manager includes at least one of: an Activity Manager used to interact with all activities running in the system: a Location Manager used to provide system services or applications with access to system location services: a Package Manager used to retrieve various information related to application packages currently installed on the device: a Notification Manager used to control the presentation and removal of notification messages: a Window Manager used to manage icons, windows, toolbars, wallpapers and Desktop widget on the user interface.

In some embodiments, the software applications and/or modules corresponding to the software architecture in FIG. 4 are stored in the first memory or the second memory shown in FIG. 2 or FIG. 3.

In some embodiments, for a display apparatus with a touch function, taking a split-screen operation as an example, the display apparatus receives an input operation (such as a split-screen operation) from the user on the display screen, and the kernel layer can generate a corresponding input event according to the input operation and report the event to the application framework layer. The activity manager of the application framework layer sets the window mode (such as multi-window mode), window position and size, etc, corresponding to the input operation. The window manager of the application framework layer draws a window according to the settings of the activity manager and then sends the drawn window data to the display driver of the kernel layer, and the display driver presents corresponding application interfaces in different display areas of the display screen.

Figure 5:
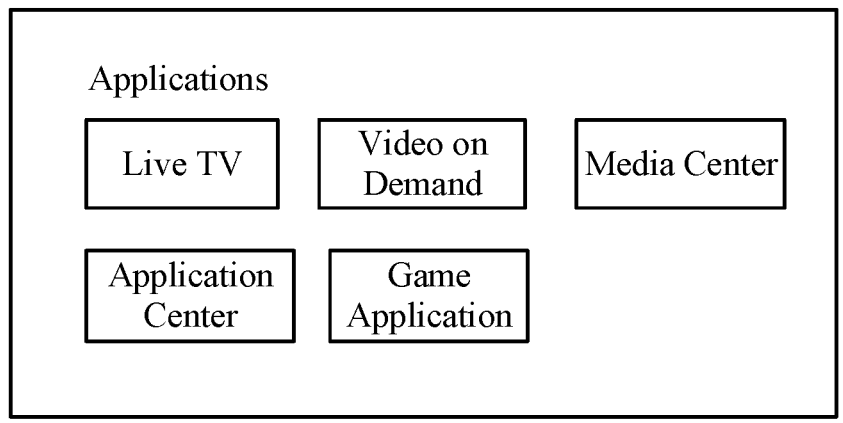
FIG. 5 shows a schematic diagram of interface display of icons of applications in the display apparatus 200.

In some embodiments, as shown in FIG. 5, the application layer includes at least one application whose icon can be shown on the display, such as: an icon for live TV application, an icon for video-on-demand application, an icon for media center application, an icon for application center, an icon for game application, etc.

In some embodiments, the live TV application may provide live TV through different signal sources. For example, the live TV application may provide television signals from the cable television, radio broadcast, satellite service, or other types of live TV services. In addition, the live TV application may display the video of the live TV signals on the display apparatus 200.

According to the above display apparatus 200, the disclosure provides a calling method, which can be applied to the above display apparatus 200. The display apparatus 200 may be a smart TV device. It should be noted that, in the embodiments of the disclosure, the application interface display method is not only applied to the smart TV device, but may also be other display apparatuses such as tablet computer, smart phone, smart cast device, etc.

The applications are software applications installed in the operating system of the display apparatus 200, including system applications, customed applications, and third-party applications, etc. Different applications have different functions to meet the requirements of different users. For example, video applications can provide users with online video resource playback to enrich the signal sources of the display apparatus 200: music applications can provide users with online audio resource playback: entertainment applications can provide users with entertainment experiences such as games through a series of interactions and images; and information applications can provide users with news information through real-time updated texts, pictures, videos and other messages. The hardware configuration, software configuration and function implementation of the display apparatus are described above. When the calling party initiates a video call, the server will establish a corresponding virtual room. An image collector of the display apparatus is used to collect the video of the local user in real time during the video call, and an sound collector of the display apparatus is used to collect the audio of the local user in real time during the video call, and then the audio and video data of the local user is sent to the server. The audio and video data of each member in the virtual room can be uploaded to the server in this way, so that the display apparatus obtains the audio/video data of other members from the server for local display and play back during the video call.

After the video call is started, the virtual room will record the number of current call channels, that is, the number of users currently accessing to the virtual room. The number of current call channels recorded in the virtual room needs to be updated as the number of members increases (for example, new members answer or are invited to join the video call) or decreases (for example, members end the video call).

In some embodiments, the display apparatus needs to obtain the number of current call channels from the server to compare the number of current call channels with a preset number of channels, so as to perform the corresponding process of the multi-channel video call. The display apparatus can send a query request to the server, and the server will query the number of current call channels recorded in the virtual room and send the number of current call channels to the display apparatus in response to the query request, or the server detects that the number of current call channels recorded in the virtual room changes, and then needs to send the latest number of current call channels to the display apparatus, so as to synchronize the number of current call channels recorded in the virtual room to the display apparatus of each call member.

Based on the configuration and model of the display apparatus, different display apparatuses configure different preset numbers of channels. The preset number of channels is the number of video call channels that the display apparatus can support, that is, the upper limit of the number of windows for video that can be displayed in the video call interface. The preset number of channels is determined according to the processing capability and experience value of the display apparatus, and the number of channels supported by a display apparatus is fixed configured with a hardware model. In some embodiments, the display apparatus with higher configuration can support the video call with up to 9 channels. When the display apparatus supports video calls with 2 channels, it only support one-to-one video calls. When the display apparatus supports video calls with 2 to 9 channels, multiple-to-multiple video calls can be realized.

Figure 6A:
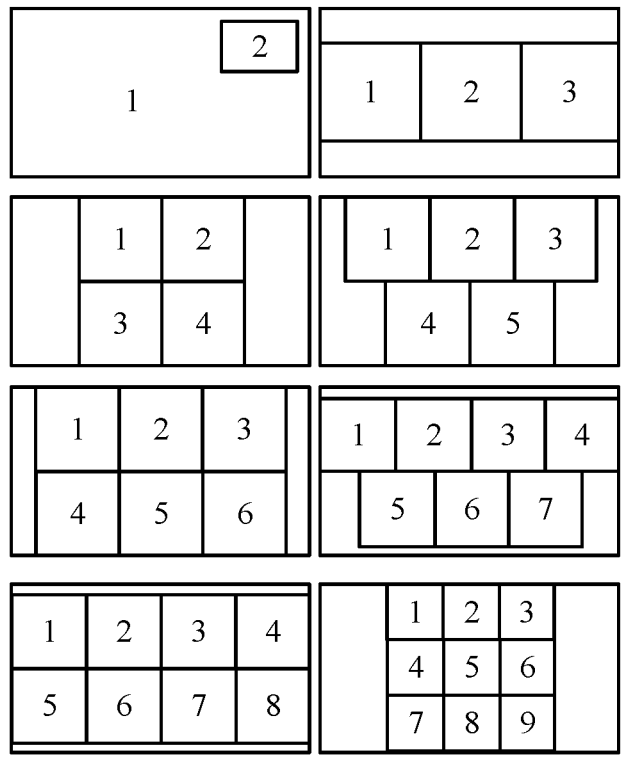
FIG. 6A shows a schematic diagram of an interface layout template.

The display apparatus is generally configured with an interface layout template, that is, the size and position of each video call window during a call. When the number of current call channels is less than or equal to the preset number of channels, the interface layout template can be used to present windows for video of which the number is the same as the number of current call channels. The interface layout template has a corresponding relationship with the number of video call channels. In some embodiments, as shown in FIG. 6A, different interface layout templates corresponding respectively to the numbers of channels from 2 to 9 are shown. Here, when the number of channels is 2, the video image of the counterpart user may be presented in a full-screen window and the video image of the local user is presented in a small window; or two video call windows may be the same in size: when the number of channels is 3-9, the windows for video may be arranged in an array. For example, if the preset number of channels for a display apparatus is 6, it can support a video call with 2-6 channels. For example, if the number of current call channels is 4, the windows for video of 4 members are presented according to the interface layout template of 4 channels, i.e., the window layout of array 2*2 in FIG. 6A. The interface layout template corresponding to the above number of call channels is shown for illustration for implementing the call method. Those skilled in the art can also provide other designs by adjusting the size and position of the window for video, and the settings of the size and position of the display window can design according to needs.

However, in some embodiments, different display apparatuses may support different numbers of call channels. When two display apparatuses that support different numbers of channels start a call, or when the invited callers joins the video call, or when the number of call channels exceeds the number that is supported by the display apparatus after the newly-invited caller is added during the call, the display apparatus that supports calls with a lower number of channels still needs to remain in the call process, and this user cannot be forced to quit. The disclosure allows the display apparatus that supports calls with a lower number of channels to remain in the call process when the preset number of call channels is exceeded, improving the user experience.

In the disclosure, the basic processing method of the multi-channel video call includes: obtaining the number of current call channels of a video call from the server: in response to determining that the number of current call channels is greater than a preset number of channels, invoking an interface layout template corresponding to the preset number of channels, to control the display of the display apparatus to present a first portion of windows for video chatting whose number is the same as the preset number of channels in a first area on the video call interface and present a second portion of windows for voice chatting whose number is the difference between the number of current call channels and the preset number of channels in the second area of the video call interface, where the sum of the first portion of windows for video chatting and the second portion of windows for voice chatting is the number of current call channels; and in response to determining that the number of current call channels is less than or equal to the preset number of channels, invoking an interface layout template corresponding to the number of current call channels, to control the display to present video windows whose number is the same as the number of current call channels on the video call interface, not arranging a window for voice chatting. The basic processing of the multi-channel video call is described in detail below:

In some embodiments, when there are many members joining the virtual room of the video call, the case where the number of current call channels is greater than the preset number of channels may occur. For example, there are 10 members in the communication group GA, and the user UB initiates a video call in the communication group. After the other 9 members answer the video call, the number of current call channels is 10. However, the preset number of channels of the display apparatus is 9, that is, the video call interface displays at most 9 windows for video chatting, so one member cannot access the call by video. In this case, this member can access the call by voice chatting, that is, the mode with both windows for video chatting and window(s) for voice chatting is adopted, where 9 windows for video chatting and 1 window for voice chatting are presented on the video call interface. For another example, when the display apparatus DA that supports two-channel video is in a two-channel video call with the display apparatus DB that supports three-channel video, if either party in the call invites a third party, the display apparatus DA that supports two-channel video can set the audio and video data of the display apparatus DC of the last accessed third-party as a voice call by determining the call access time, so that the current call can maintain, while the display apparatus DB that supports three-channel video can invoke the interface layout template of the three-channel video call to perform the video call. For another example, when the display apparatus DA that supports two-channel video, the display apparatus DB that supports three-channel video and the display apparatus DC that supports four-channel video are performing a three-party video call, if any of the three parties in the call invites a display apparatus DD, the display apparatus DA that supports two-channel video can set the audio and video data of the last accessed display apparatus DD as a voice call by determining the call access time, so that the current call can maintain: the display apparatus DB that supports three-channel video can set the audio and video data of the last accessed display apparatus DD as a voice call by determining the call access time, so that the current call can maintain; and the display apparatus DC that supports four-channel video can use the interface layout template of the four-channel video call to display the call windows.

In some embodiments, the display apparatus determines audio and video data of a display apparatus at the counterpart end for video call display and audio and video data of a display apparatus at the counterpart end for audio call display according to the access time of the display apparatuses at the counterpart ends joining in the call. For the display apparatus at the counterpart end that accesses later during the video chatting, only the audio data of the later accessed party is played when the current number of channels exceeds the preset number of channels.

In some embodiments, the display apparatus sets the audio and video data of the display apparatus for display in video, and the audio and video data of the display apparatus for only display in audio, according to a switch operation from the user.

Figure 6B:
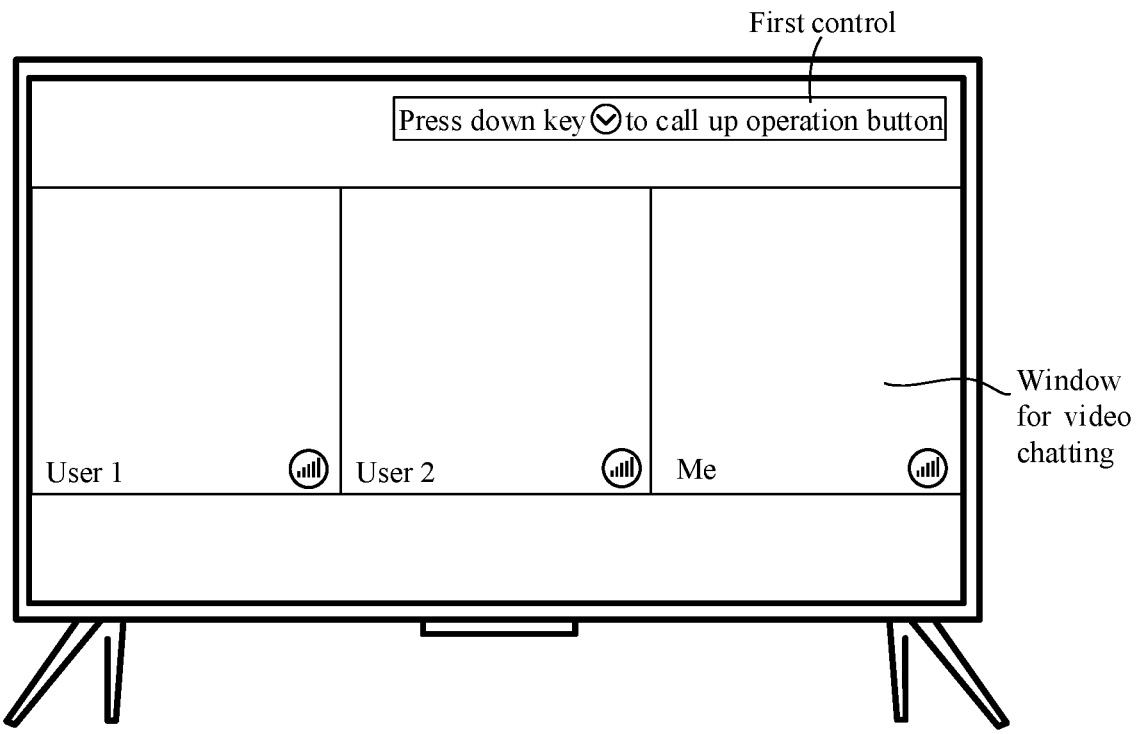
FIG. 6B shows a schematic diagram of a video call interface when the number of current call channels and the preset number of channels are 3.
Figure 6C:
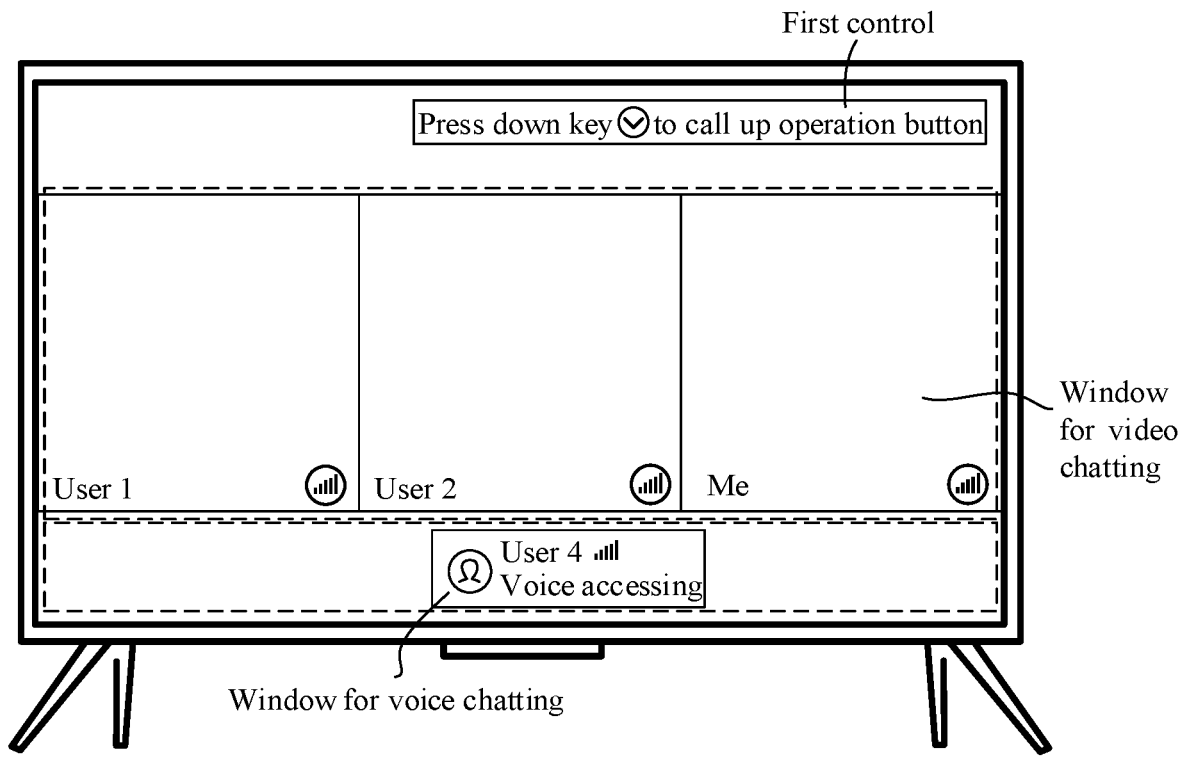
FIG. 6C shows a schematic diagram of a video call interface when the number of current call channels is 4 and the preset number of channels is 3.

In some embodiments, as shown in FIG. 6B and FIG. 6C, the implementation of the interface during a call is described by taking a display apparatus that supports 3-channel video calls as an example, and the switching process of other number of channels is similar to this example. In the windows displayed in the interface, user IDs are added to both the window for voice chatting and the window for video chatting to indicate different display apparatuses corresponding to the audio and video streams. In some embodiments, the user ID may be generated according to the address book or note of the display apparatus. In some embodiments, the user ID may be generated according to the device ID or account ID of the counterpart end.

In some embodiments, the display apparatus of the user 1 is display apparatus DA, the display apparatus of the user 2 is display apparatus DB, the user's own display apparatus is display apparatus DC, and the display apparatus of the user 4 is display apparatus DD.

In some embodiments, in the scenario shown in FIG. 6B, the user 1, user 2 and local user are in a video call, the server creates a virtual room for the video call, and the display apparatus DA, display apparatus DB and display apparatus DC access the virtual room respectively, to upload the audio and video data collected by local devices to the server and pull the audio and video data uploaded by the display apparatus at the counterpart end according to the device ID and/or account ID. In some embodiments, the server may distinguish the audio and video data at the counterpart end according to the device ID and/or account ID, and then notify the display apparatus to pull.

In some embodiments, in the scenario shown in FIG. 6C, when any one of the three parties previously in the call invites the user 4 to join the call through the invitation control presented on the call interface, or when there are four call members joining the call at the beginning, that is, the number of current call channels is 4, but the user 4 joins later than the user 1, user 2 and local user, or when the user 4 may join the call through other automatic call joining method, the display apparatus adds a floating layer (for example, second area) to the original interface, where a window for voice chatting is set in the second area, and according to preset characters and the user ID that is obtained from the server and corresponds to the audio and video data sent from the user who joined later, the window for voice chatting may display the ID of the user 4 and other alert information in the control corresponding to the user ID.

In some embodiments, if the user 1 exits from the call, the window for video chatting that previously displays the user 1's audio and video data in the display interface can be used to display the user 4's audio and video data, and the second area containing window for voice chatting of the user 4 is removed.

In some embodiments, when the number of current call channels is greater than the preset number of channels, that is, when the video call interface including the window(s) for video chatting plus the window(s) for voice chatting is used, the interface may mainly include a first area and a second area, where windows for video chatting, of which the number is the same as the preset number of channels, are displayed in the first area, and window(s) for voice chatting, of which the number is the difference between the actual number of channels and the preset number of channels, is/are displayed in the second area.

Figure 7:
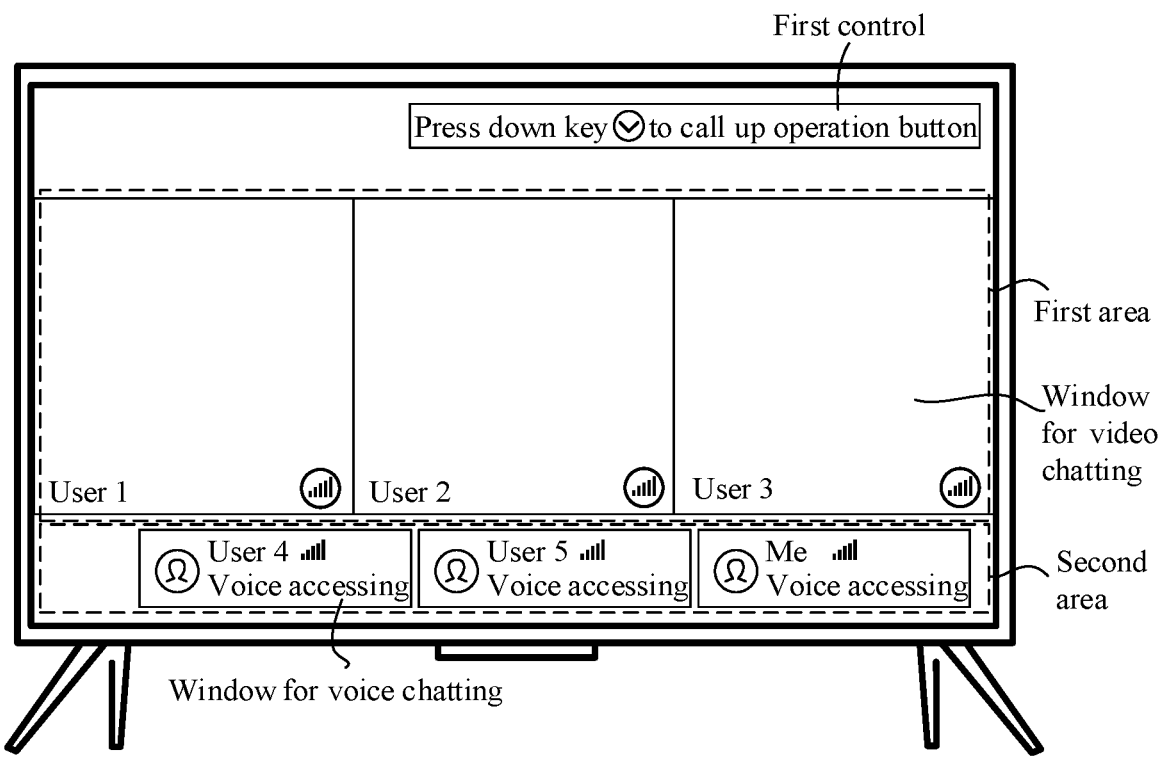
FIG. 7 shows a schematic diagram of a video call interface when the actual number of channels is 6 and the preset number of channels is 3.

For example, the actual number of channels of the video call is 6, and the preset number of channels of the display apparatus is 3. As shown in FIG. 7, since the preset number of channels is 3, the first area includes 3 windows for video chatting, and each window for video chatting presents the video image of the corresponding member, while a voice control is also provided in the window for video chatting to play the audio of a corresponding member. The user ID can also be identified in the window for video chatting to identify the call member corresponding to each window for video chatting. The user ID described here can be a user name, account or note name, etc., for example, the user IDs corresponding to the three windows for video chatting in FIG. 7 are user 1, user 2 and user 3 respectively (here only an example, and not indicate the actual user ID).

In FIG. 7, the second area includes 3 windows for voice chatting for playing the audio of the corresponding members. Since the real video image of the counterpart cannot be seen in the window for voice chatting, a preset image can be presented, where the preset image may be a unified fictitious avatar or an avatar set by the user in the video call application. The window for voice chatting can present "voice accessing" and other alert information to indicate that the counterpart has accessed by voice and is talking with the local user. The user ID can also be identified in the window for voice chatting to identify the call member corresponding to each window for voice chatting, where the user ID may be user name, account or note name, etc., for example, the user IDs corresponding to the three windows for voice chatting in FIG. 7 are user 4, user 5 and local user respectively. The first area and the second area have no intersection, overlap and block in position.

In the video call interface, when the number of current call channels is greater than the preset number of channels for the display apparatus, the number of windows for video chatting in the first area is equal to the preset number of channels, and the number of windows for voice chatting in the second area is not limited, mainly depending on the number of call channels accessing to the virtual room, the number of invited new members and the number of hung-up voice accesses during the call. Due to the limitations of the video call interface and the size of the window for voice chatting in the second area, the windows for voice chatting may not be fully displayed. For example, there are 6 voice access members, but the user can only see at most 4 windows for voice chatting in the second area. Then, the user can slide left and right in the second area to view two windows for voice chatting hidden in the second area. When the number of current call channels is less than or equal to the preset number of channels, there is only a need to display the windows for video chatting according to the interface layout template corresponding to the number of current call channels. In this case, the second area and the window for voice chatting are not displayed.

In practical applications, the window(s) for video chatting and window(s) for voice chatting are relatively fixed. Referring to FIG. 7, the user 4 accesses by voice, so the local user and user 4 can only do voice chat but not video chat. Similarly, the user 1 accesses by video, the local user and user 1 can only maintain video chat and cannot switch to voice chat. The user can only see the caller corresponding to the window for video chatting in the first area, but cannot see the caller corresponding to the window for voice chatting in the second area. Since the user cannot see the video images of all members in the virtual room, there is a need to autonomously choose which member's video image for view:

In this regard, in the mode where the video call interface comprises video call window(s) in the first area and voice call window(s) in the second area, the disclosure provides a method for switching between a window for voice chatting and a window for video chatting during the video call. The process of switching between window for voice chatting and window for video chatting and the corresponding change of UI display when a multi-channel video call is started will be discussed below: Here, the following discussed takes 3 as an example of the preset number.

In some embodiments, when a video call is started, it is firstly determined whether the number of current call channels is greater than the preset number of channels: if so, it means that the number of video channels in the call exceeds the upper limit of the number of windows for video chatting in the first area, the interface layout template corresponding to the maximum number (that is, the preset number of channels) needs to be invoked in the call interface, and the audio and video data of the accessed display apparatuses is played on the windows for video chatting on the call interface according to the call access time. After all the windows for video chatting on the call interface present the audio and video data corresponding to the audio and video streams, a call member who joins later can only switch to voice access and is presented through a window for voice chatting in the second area. If the number of current call channels does not exceed the preset number of channels, it means that the number of video channels in the call does not exceed the upper limit of the number of windows for video in the first area, the interface layout template corresponding to the number of current call channels can be invoked on the call interface, and the audio and video data of the display apparatuses accessing the video call is presented in the windows for video chatting in the first area. The call member who joins later can still access by video until the number of windows for video in the first area reaches the upper limit. If the actual number of channels in the video call is equal to the preset number of channels, it means that the number of windows for video chatting in the first area right reached the upper limit after the local user accesses, then the call member who joins later can only jpin by voice access.

In some embodiments, when a new caller joins, it is firstly determined whether the number of current call channels is greater than the preset number of channels. If the number of current call channels is greater than the preset number of channels, it means that the number of windows for video chatting in the first area has reached the upper limit, the call members who join now and later can only join by voice access and are presented through windows for voice chatting in the second area. If the number of current call channels is not greater than the preset number of channels, it means that the first area is not full, then the call member who joins later can also access by video, and different interface layout templates are invoked to play the audio and video data of the accessed display apparatuses until the number of windows for video chatting in the first area reaches the upper limit. If the number of current call channels is equal to the preset number of channels, it means that the number of windows for video in the first area just reaches the upper limit of the local display apparatus after it accesses, then a newly added call member can only switch to voice access.

In some embodiments, for example, the preset number of channels of the local display apparatus is 3, but there are 5 members currently accessing the video call. Then, when a new user accesses, the new user generally defaults to be in the voice access mode on the local display apparatus, that is, a new window for voice chatting is added in the second area, which can be seen as shown in FIG. 6B and FIG. 6C. The local display apparatus DC, after receiving a notification for indicating a access from a new user from the server, adds a second area and sets a window for voice chatting in the second area. The controller of the display apparatus DC pulls the audio and video data uploaded by the newly-accessed display apparatus DD from the virtual room at the server, and separates the audio data and video data from the received audio and video data. In some embodiments, the controller of the display apparatus DC only parses the separated audio data and sends it to the sound output device of the display apparatus DC for audio output, and does not parse the separated video data. In some embodiments, the controller of the display apparatus DC parses the separated audio data and the separated video data, but sends the parsed audio data to the sound output device of the display apparatus DC for audio output and discards the parsed video data, so as to realize the voice access of the display apparatus DD.

In some embodiments, the user ID presented on the window for voice chatting can be determined according to the user ID carried in the notification for indicating the access from the new user from the server, or according to the user ID in the audio and video data received from the server.

In some embodiments, a prompt and guidance for the user to switch between window for audio chatting and window for video chatting can be provided. When the number of current call channels is greater than the preset number of channels, a pop-up window for prompt can be presented on the upper layer of the video call interface, and the pop-up window for prompt may be presented at the time when the video call is started or during the call. For example, the preset number of channels of the display apparatus is 3, and the number of current call channels is 3. During the call, any party can invite a new member to join the call. After the new member enters the virtual room, the number of current call channels exceeds the preset number of channels, and then the display apparatus can present a pop-up window after receiving the successful invitation information. For another example, the local apparatus supports 4-channel calls. Before the local user answers the video call for 8 users, 5 users have already accessed in the virtual room, and the local user is the sixth to access. Thus, when the local user accesses, the preset number of channels supported by the local apparatus has been exceeded, and then a pop-up window for prompt can be shown after the local user answers the call successfully. When the number of channels of the current video call is less than or equal to the preset number of channels, no pop-up window is presented.

Figure 8:
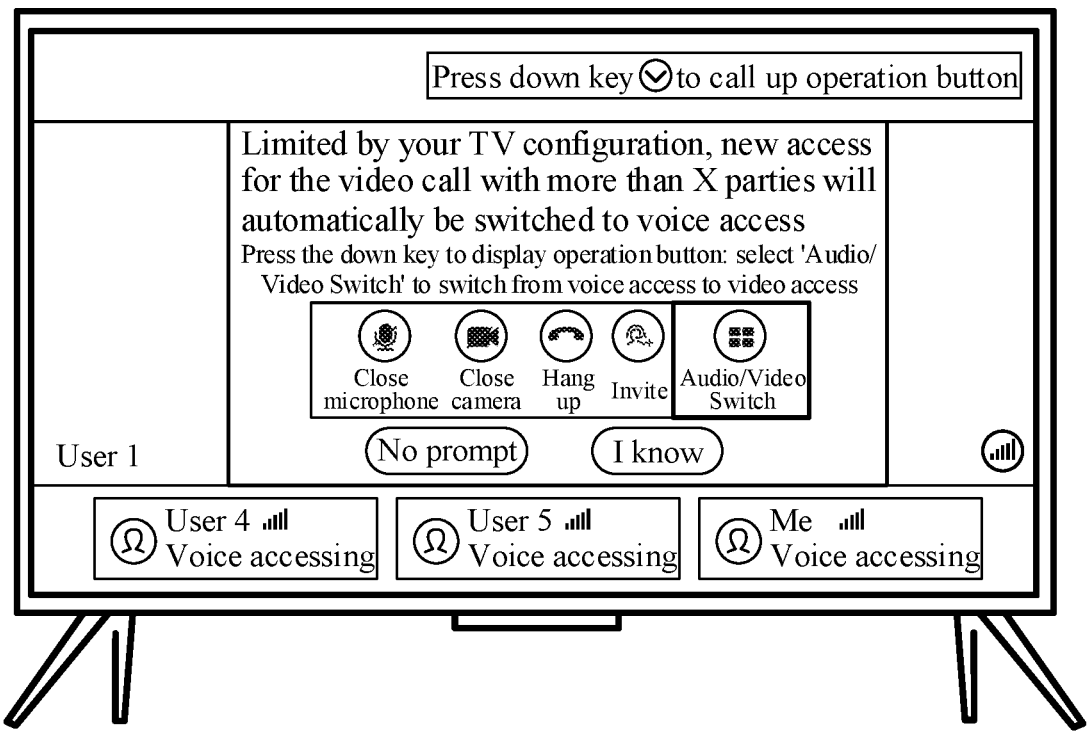
FIG. 8 shows a schematic diagram of displaying a prompt pop-up window when a video call is started.

In some embodiments, a display interface with the pop-up window for prompt is shown in FIG. 8. The prompt information such as "Limited by your TV configuration, new access for the video call with more than X parties will automatically be switched to voice access" may be presented in the pop-up window for prompt, where X is the value of the preset number of channels, so that the local user can know that the number of channels after he/she accesses or a new call party accesses has exceeded the preset number of channels, and the member who enters the virtual room will automatically access to the video call in voice.

Secondly, the guidance information such as "Press the down key to display operation button: select 'Audio/Video Switch' to switch from voice access to video access" can also be presented in the pop-up window for prompt. The user can click the first control on the interface as shown in FIG. 7 to display the operation buttons, for example, the first control can be the "down key" in FIG. 7 or in other forms, so as to show the operation buttons, including but not limited to: microphone state control, camera state control, hangup control, invitation control, control for indicating switching between a window for video chatting and a window for voice chatting, and small window call control, etc. The user can click the control for indicating switching between a window for video chatting and a window for voice chatting to switch a user' call stream from the voice chat mode to the video chat mode.

The bottom of the pop-up window for prompt can also be provided with operation controls like "No prompt" and "I know". The user clicks "I know" control to close the current pop-up window: When the user starts a video call next time, the pop-up window for prompt will be activated again if the preset number of channels is exceeded. If the user clicks "No prompt" control, the current pop-up window can be closed, and in this case, the prompt pop-up window is only presented this time, and the pop-up window will no longer be presented even if the preset number of channels is exceeded during accessing a call in the future.

Figure 9:
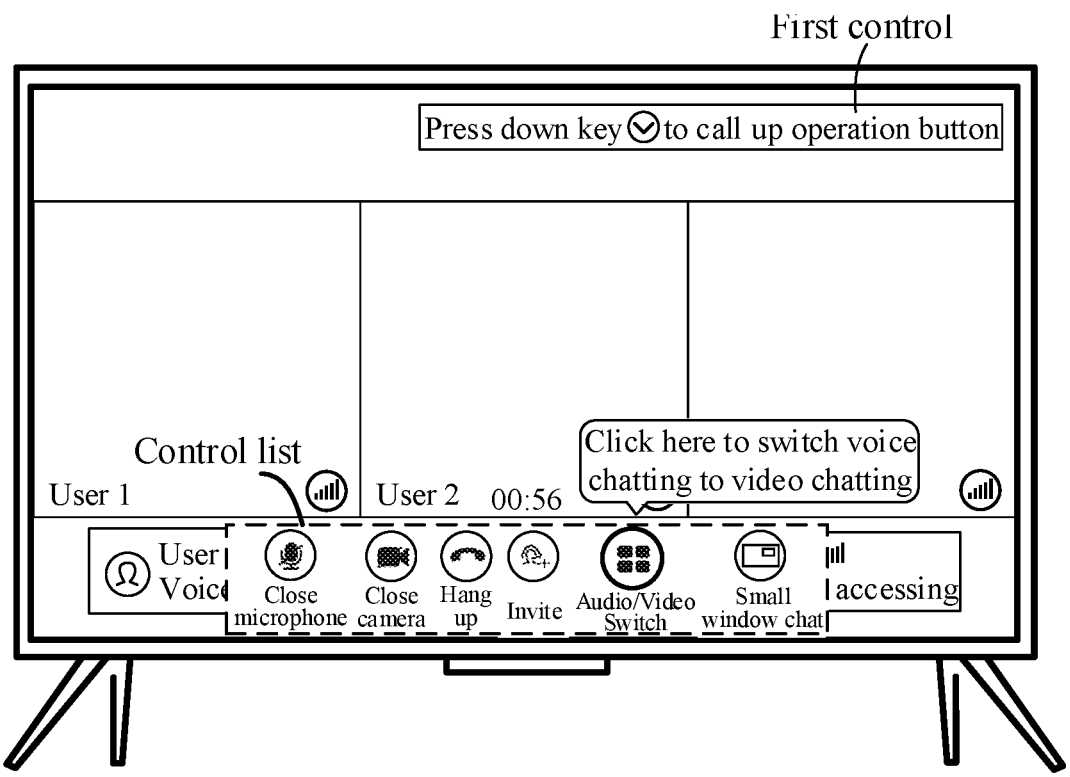
FIG. 9 shows a schematic diagram of a video call interface when a control list is opened.

After the user clicks "I know" or "No prompt" control on the pop-up window for prompt, the pop-up window is closed, and then the user can enter the video call interface as shown in FIG. 7. After clicking the first control, the operation buttons will show; as shown in FIG. 9, including but not limited to microphone state control, camera state control, hangup control, invitation control, control for indicating switching between a window for video chatting and a window for voice chatting, and small window call control, etc. The microphone control is used to turn on or off the microphone when selected: the camera control is used to turn on or off the camera when selected: the hangup control is used to end the current video call when selected: the invitation control is used to invite a new member to join the current video call when selected; and the small window call control is used to switch the current full-screen video call interface to a small window when selected, so as to support the user can make a video call when viewing other signal sources or applications, that is, chat while watching. In addition to these conventional operation controls, the embodiments of the present application adds a control for indicating switching between a window for video chatting and a window for voice chatting to realize the audio and video switching when selected.

Since there are many operation buttons set for the video call, they are presented in a floating layer in the form of a control list. As shown in FIG. 9, the control list is presented as a floating layer in row in the second area, and the operation controls can be selected by sliding left and right. Obviously, the presentation form of the control list is not limited in specific implementations, such as presented in column or in array or the like, and the presentation position of the floating layer of the control list is not limited either. The user can move the cursor at a corresponding control and click the OK key to input an operation command by operating the remote control or mouse or other device. In a specific implementation, when the cursor moves on the control list, different controls can acquire the focus, for example, when the cursor moves to the control for indicating switching between a window for video chatting and a window for voice chatting, the control for indicating switching between a window for video chatting and a window for voice chatting gets the focus and zooms in to a certain degree, meanwhile, an alert message such as "Click here to switch voice to video" is shown. When the user does not click any operation control in the control list, the control list can disappear through a certain operation, for example, the control list is shown when the first control is clicked once, and the control list is hidden when the first control is clicked twice: or, the user clicks/double clicks a position outside the floating layer of the control list on the video call interface to hide the control list: or, a time threshold can be set, and the control list can automatically disappear when the presentation time of the control list exceeds the time threshold and the user does not click any operation control. The hiding and presentation of the control list can be flexibly set according to needs.

In response to an operation for indicating switching between a window for video chatting and a window for voice chatting, a target window for voice chatting corresponding to a first object in the second area is obtained, and a target window for video chatting corresponding to a second object in the first area is obtained, that is, two users whose display windows need to be replaced are firstly determined after the process of switching between a window for video chatting and a window for voice chatting.

Figure 10:
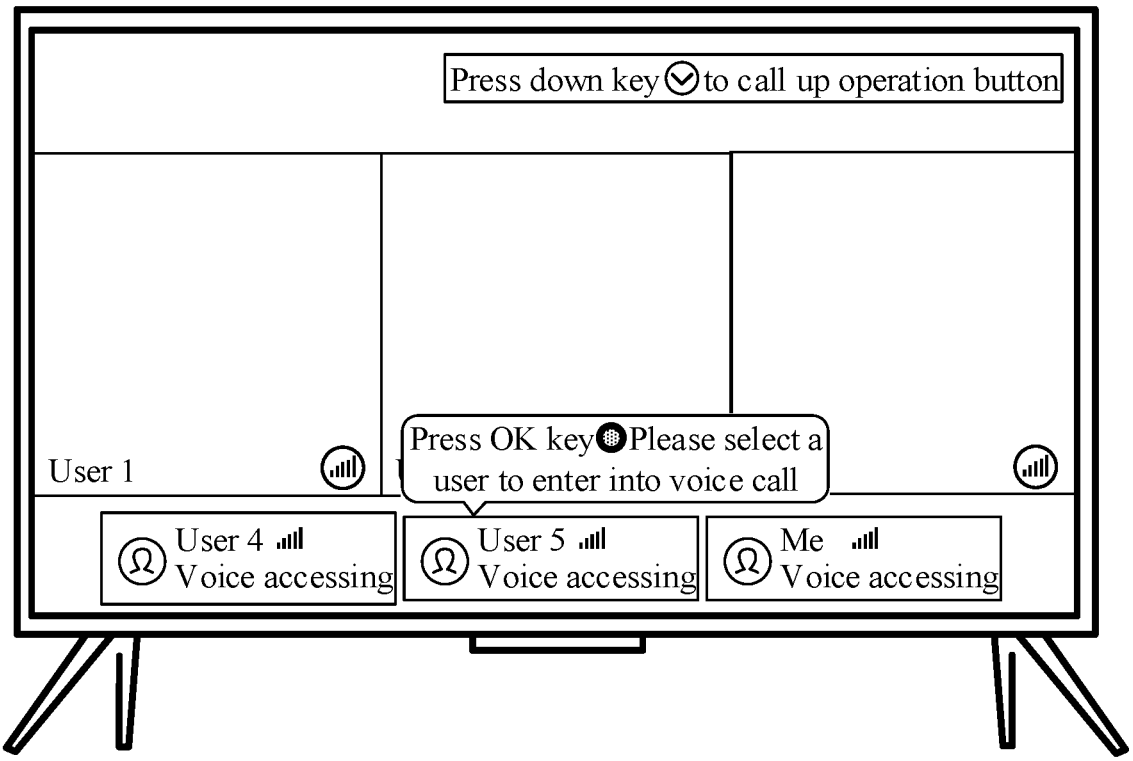
FIG. 10 shows a schematic diagram of a video call interface when the first object is selected.

Specifically, in response to a click operation on the first control, the display is controlled to present the control list on the floating layer of the video call interface: when the number of current call channels is greater than the preset number of channels, the control list is controlled to automatically disappear in response to the user's operation of clicking on the control for indicating switching between a window for video chatting and a window for voice chatting in the control list, meanwhile, the display apparatus starts the process of switching between a window for video chatting and a window for voice chatting. The user can select a target window for voice chatting in the second area, where the call user corresponding to the target window for voice chatting is determined as a substitute user, that is, the first object; and switch the first object call stream to present in a window for video chatting by replacing video window of another user in the first area. In the UI level, as shown in FIG. 10, the user can move the focus left and right in the second area by pressing a direction button on the remote control or moving the remote control/mouse, etc. When a window for voice chatting gets the focus, this window for voice chatting is zoomed in to a certain degree, and meanwhile, a prompt message such as "Press OK key to select a user to voice call" is displayed. In FIG. 10, the window for voice chatting corresponding to the user 4 gets the focus. If the user clicks the OK key, that is, confirms that the window for voice chatting corresponding to the user 4 is the target window for voice chatting, then the display apparatus, in response to the confirmation operation on the target window for voice chatting, determines the first object as the first object ID corresponding to the target window for voice chatting, that is, marks the user 4 as the first object.

Figure 11:
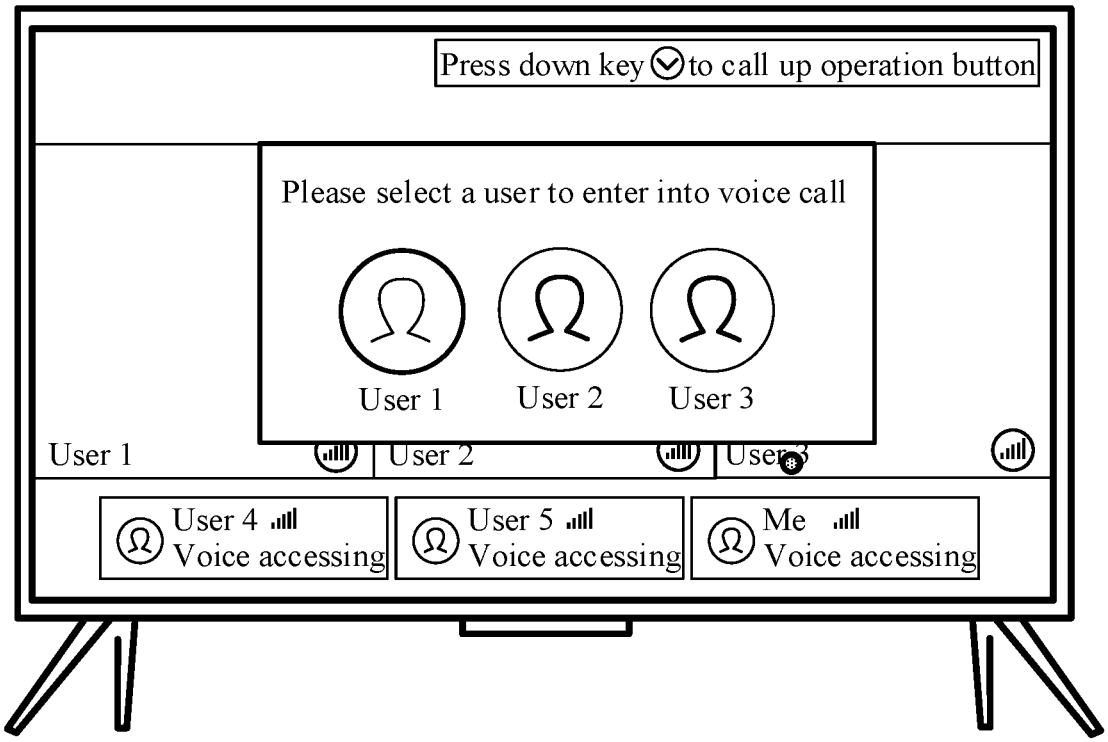
FIG. 11 shows a schematic diagram of a video call interface when a selection pop-up window of the second object is displayed.

After the first object is confirmed, the user can select a target window for video chatting in the first area, where the call user corresponding to the target window for video chatting is determined as a substituted user, that is, the second object; and switch the second object' call stream to present in the window for voice chatting in the second area by replacing the first object. In an implementation for selecting the second object, the display apparatus can also control the display to present a pop-up window for selecting the second object on the upper layer of the call interface in response to a confirmation operation of the target window for voice chatting. At the UI level, as shown in FIG. 11, the pop-up window for selecting the second object is presented on the upper layer of the video call interface, and the prompt message such as "Please select a user to enter into voice call" can be shown in the pop-up window for selecting the second object. The user IDs corresponding to all the windows for video chatting included in the first area are presented in the pop-up window for selecting the second object. In the examples shown in FIGS. 7 to 10, the first area includes three windows for video chatting corresponding to user 1, user 2 and user 3 respectively. Then, the icons indicating user 1, user 2 and user 3 are shown in the pop-up window for selecting as the second object, where the user IDs and avatars may be available for the user to select.

Figure 12:
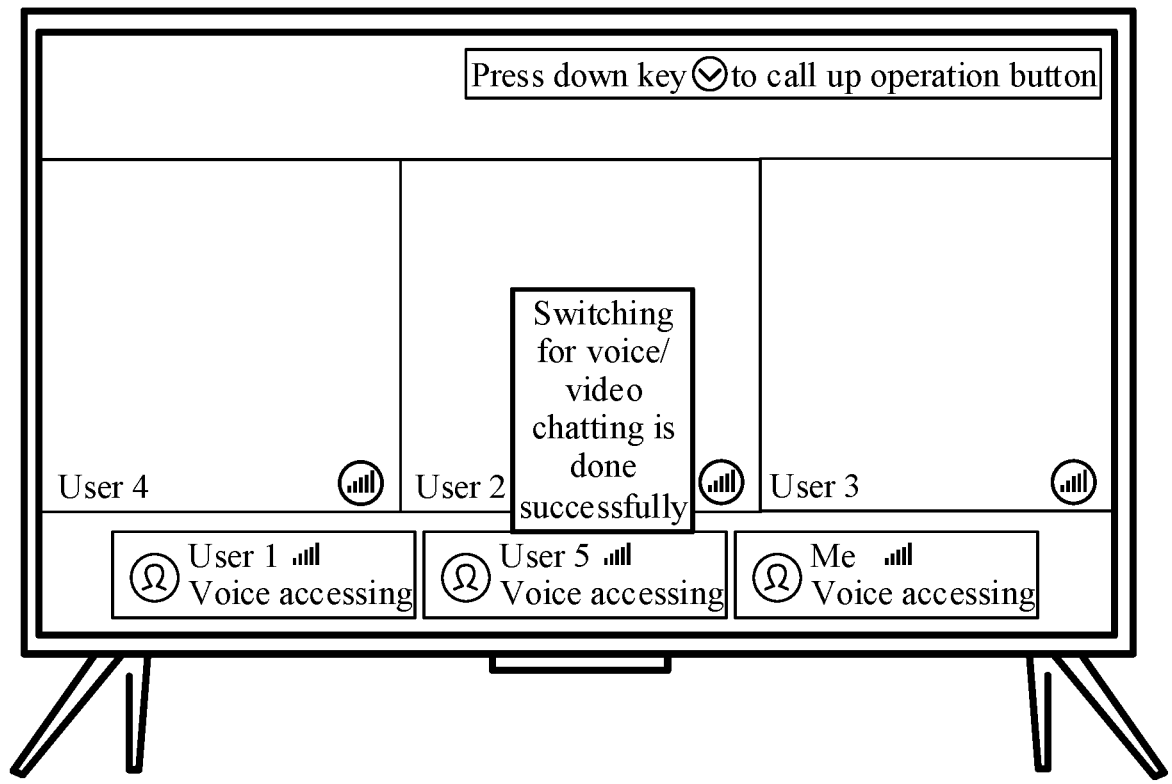
FIG. 12 shows a schematic diagram of an interface when the audio and window for video switching is completed.

The display apparatus obtains the second object ID selected by the user in the pop-up window for selecting the second object. The window for video chatting corresponding to the second object ID is the target window for video chatting. In FIG. 11, control of the user 1 is clicked, that is, the second object ID is user 1, and then the second object is marked as user 1. That is, the call windows of the first object and the second object are exchanged. After the exchange is completed, as shown in FIG. 12, the user 4 is switched to present in the previous window for video chatting of the user 1 (i.e., the target window for video chatting), and the user 1 is switched to present in the previous window for voice chatting of the user 4 (i.e., the target window for voice chatting), so that the user 4 is switched to be in video chat from voice chat, and the user 1 is switched to be in voice chat from video chat. Meanwhile, an alert message (such as "window switching for voice/video chatting is done successfully") for indicating the local user that the switch succeeds can be presented on the interface, and then the process of switching between a window for video chatting and a window for voice chatting ends.

The display apparatus simultaneously pulls the audio and video data of the user 4 from the virtual room of the server, and associates the audio and video data of the user 4 with the target window for video chatting for display. Meanwhile, the display apparatus stops pulling the video data of the user 1 from the virtual room, pulls only the audio data of the user 1, and associates the audio data of the user 1 with the target window for voice chatting for audio output: or, the display apparatus still pulls the audio and video data of the user 1 from the virtual room, but parses and outputs only the audio data of the user 1 without parsing and outputting the video data of the user 1, so that the voice access effect of the user 1 can also be realized.

The method of selecting the second object is not limited to that described in the embodiments of the disclosure, and other implementation methods can also be used. For example, the method similar to the method of selecting the first object can be used to directly click and select the target window for video chatting in the first area. Before the video call ends, the local user can choose any call stream of the parties that access by voice or the local user self to be in the window for video mode at any time according to the local user preference. The user operation, UI display and process of switching between a window for video chatting and a window for voice chatting during switching can refer to the above description.

Figure 13:
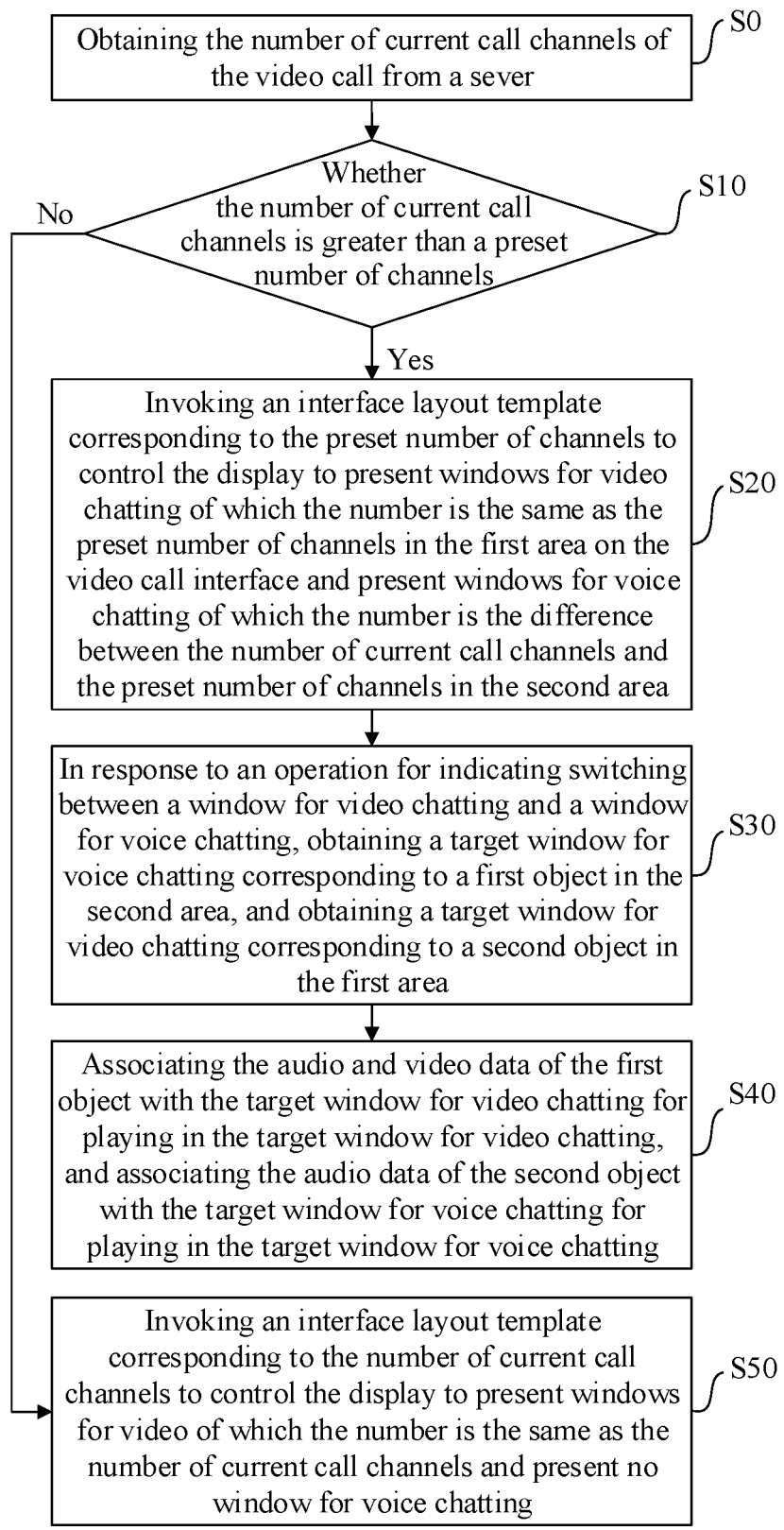
FIG. 13 shows a flowchart of a method for switching audio and windows for video in a multi-channel video call.

The display apparatus includes: a display 275 for presenting a video call interface and the above UI elements, an audio player for playing the audio of each call member, a communicator 220 for connecting the display apparatus 200 with the server 400, a user interface 265 for receiving a user input operation, and a controller 250 for processing a multi-channel video call and switching between a window for video chatting and a window for voice chatting, here the audio player may be the speaker 286, or an external audio device or the like. As shown in FIG. 13, the controller 250 is configured to perform the following method for processing a multi-channel video call.

Step S0: obtaining the number of current call channels of the video call from a sever.

The display apparatus can send a query request to the server, and the server will query the number of current call channels recorded in the virtual room and send the number of current call channels to the display apparatus in response to the query request, or the server detects that the number of current call channels recorded in the virtual room is changed, and then sends the latest number of current call channels to the display apparatus, so as to synchronize the number of current call channels recorded in the virtual room to the display apparatus of each call member.

In some embodiments, after an initiator party initiates a video call, the invited members respond and answer at different times, so the number of current call channels recorded in the virtual room will increase until all members answer. When a member newly accesses the virtual room, the number of current call channels will be incremented by 1 until the number of call persons specified by the initiator is finally reached. In this case, the number of current call channels will not change temporarily.

During the video call, an invitation control is set in the control list, so any party in the call can click the invitation control to invite a new member to join the call, where the new member may be a user that is not invited when the initiator party initiates the call. For example, the user A invites the user B and user C to have a video call, that is, initiates a three-person call. During the call, the user B invites user D to join the video call, so the user D is a new member. After the user D answers the invitation call, the user D accesses to the virtual room, and then the recorded number of current call channels is incremented by 1, that is, the number of current call channels is changed to 4. Every time a new member is successfully invited, the number of current call channels needs to be incremented by 1.

For another example, the local user A invites the user B and user C to have a video call, that is, initiates a 3-person call. Before the video call ends, the user C clicks the hangup control to end the video call, and then the user C exits from the virtual room. The number of current call channels recorded in the virtual room needs to be reduced by 1, that is, the number of current call channels is changed to 2. Every time a member ends the call, the number of current call channels needs to be reduced by 1. After the user C hangs up the video call, the user A or user B can also re-invite the user C to join the video call again through the invitation control. In this case, the new member is included in the invitation list when the initiator party initiates the call.

Step S10: determining whether the number of current call channels is greater than a preset number of channels. In response to the number of current call channels being greater than a preset number of channels, the flow goes to steps S20 to S40; in response to the number of current call channels being greater than a preset number of channels, the flow goes to step S50.

In response to the number of current call channels being greater than the preset number of channels, in step S20, an interface layout template corresponding to the preset number of channels is invoked to control the display to present windows for video chatting of which the number is the same as the preset number of channels in the first area on the video call interface and present windows for voice chatting of which the number is the difference between the number of current call channels and the preset number of channels in the second area.

When the actual number of channels of the video call is greater than the preset number of channels, the video call interface is displayed in the mode of combination of video call in the first area and voice call in the second area. Here the preset number of channels is the number of channels of the video call that the display apparatus can support, the first area shows a preset number of windows for video at most, and then the remaining channels can be switched to be shown in windows for voice chatting in the second area, that is, the sum of the numbers of windows in the first area and the second area is equal to the actual number of channels in the call.

For the windows for video chatting in the first area and the windows for voice chatting in the second area, a preset window sorting rule may be provided. Referring to the layouts of FIG. 6A, FIG. 6B and FIG. 6C, the smaller the index of the window for video chatting, the higher the order priority; and the larger the index of the window for video chatting, the lower the order priority. There may be many sorting rules, such as random sorting, user-specified priority, or sorting by time of joining the virtual room.

In some embodiments, the controller is further configured to: display windows for video chatting in sequence in the first area firstly according to a time sequence in which call members join a virtual room after starting the video call; and in response to the total number of windows for video chatting in the first area reaching the preset number of channels, switch a mode of subsequent call members accessing the virtual room to the voice call mode, and display windows for voice chatting in sequence in the second area according to a time sequence of joining the virtual room.

After the initiator party initiates a video call, called members may answer and respond at different times, so the time for each call member to join the virtual room is also different. For example, the preset number of channels of the local apparatus is 3. The user 1 initiates a video call with 6 persons, and the persons who join the virtual room later are user 2, user 3, user 4, user 5, and local user 6 (that is, the user of the local apparatus) in sequence. User 1 is the initiator (that is, the person who firstly joined the virtual room), and then the user 2 and user 3 joined the virtual room in sequence. Then, on the video call interface displayed by the local apparatus, user 1, user 2 and user 3 are arranged in order and their corresponding windows for video chatting are presented in the first area: when the user 3 accesses, the upper limit of the preset number of channels is reached. Then user 4 after user 3 will be automatically switched to the voice call mode, and then user 5 and user 6 (the local user) accesses by voice according to the their access time. Then, user 4, user 5 and the local user are sorted in order and their corresponding windows for voice chatting are presented in the second area, which can be seen as shown in FIG. 7.

In some embodiments, the local user wants to see his/her own video image in the first area. Then, for example, the sorting rule can be set as: setting the window for video chatting of the local user at the last one position in the first area, and setting the window for video chatting of the initiator party at the first position in the first area. Other windows for video chatting in the first area are sorted according to their access time between the window of the local user and the window of the initiator party and the windows for voice chatting in the second area can be sorted according to the time sequence of accessing the call.

Step S30: in response to an operation for indicating switching between a window for video chatting and a window for voice chatting, obtaining a target window for voice chatting corresponding to a first object in the second area, and obtaining a target window for video chatting corresponding to a second object in the first area.

In some embodiments, referring to FIG. 8, the controller is further configured to: when the video call is started, if the number of current call channels is greater than the preset number of channels, control the display to present a pop-up window for prompt: where the pop-up window for prompt is used to prompt the user to click a first control to cause the display to present a control list and click a control associated with switching between a window for video chatting and a window for voice chatting to switch the voice call to video call, and also prompt the user to click other operation controls to cause the display apparatus to perform the corresponding process. If the number of current call channels is less than or equal to the preset number of channels, the pop-up window for prompt will not present.

When the number of current call channels is greater than the preset number of channels, a pop-up window for prompt as shown in FIG. 8 can be presented, then the pop-up window is closed and the video call interface is shown after the user clicks "I know" or "No prompt" control. When the number of current call channels is less than or equal to the preset number of channels, it means that another party can still access the video call by video, there is no need to display the pop-up window for prompt.

In some embodiments, referring to FIG. 9, the controller is further configured to: in response to a selection operation on the first control, cause the display to present a control list on the floating layer of the video call interface: here the control list includes operation controls such as microphone state control, camera state control, hangup control, invitation control, control associated with switching between a window for video chatting and a window for voice chatting, and small window call control, etc.

In some embodiments, referring to FIG. 10 and FIG. 11, for step S30, the controller is configured to: when the number of current call channels is greater than the preset number of channels, in response to a selection operation on the control associated with switching between a window for video chatting and a window for voice chatting, obtain the target window for voice chatting in the second area based on a user's selection: in response to a confirmation operation on the target window for voice chatting, mark a user ID corresponding to the target window for voice chatting as the first object, and control the display to present a pop-up window for selecting the second object in the upper layer of the video call interface, where the user IDs corresponding to all windows for video chatting included in the first area are presented in the pop-up window for selecting the second object; and obtain a second object ID selected by the user in the pop-up window for selecting the second object, and mark the second object as the selected user ID.

After the control list is shown, among the controls in the control list, the control associated with switching between a window for video chatting and a window for voice chatting, that is, is selected as a command for indicating switching between a window for video chatting and a window for voice chatting. According to the user's selection and confirmation operations in the second area, the controller can obtain and determine the first object and its corresponding target window for voice chatting, for example, the target window for voice chatting in FIG. 10 is the window for voice chatting with the index of 1 in the second area, and the first object identified on the target window for voice chatting is user 4, that is, the first object is determined as user 4; and according to the user's selection operation on the pop-up window for selecting the second object, the controller can obtain and determine the second object and its corresponding target window for video chatting, for example, the target window for video chatting in FIG. 10 is the window for video chatting with the index of 1 in the first area, and the second object identified on the target window for video chatting is user 1, that is, the second object is determined as user 1.

Step S40: associating the audio and video data of the first object with the target window for video chatting for playing in the target window for video chatting, and associating the audio data of the second object with the target window for voice chatting for playing in the target window for voice chatting.

Referring to FIG. 12, the audio and video data of the user 4 is associated with the target window for video chatting for playing, and then the local user can not only hear the voice of the user 4, but also see the video image of the user 4 in the target window for video chatting: for user 1, the local user can no longer see the video image of the user 1, but can hear the voice of the user 1 in the target window for voice chatting, so that the user 4 is switched from the original voice access to video access in the video call, and the user 1 is switched from the original video access to voice access, realizing switching from the video window to voice window:

With respect to the video chatting window for each call participant in the first area, the video and audio data for the video chatting window need to be played simultaneously, so the audio and video data of each call member in the first area needs to be obtained from the server, that is, the video stream and the audio stream are simultaneously pulled from the server. For the voice chatting window(s) in the second area, since only the audio data needs to be played, two methods can be used. The first method is to pull only the audio stream but no video stream from the server; and the second method is to pull both the video stream and the audio stream simultaneously but not decode and render the video data, so that the unparsed video data will not be played on the display, also implementing the effect of separate voice access, where the call member is other call member in the virtual room except the local user. This is because the local user can collect the audio and video data through the local sound/image collector, so there is no need to pull the audio/video stream of the local user from the server, and thus what is pulled is the audio/video stream of the call member at the counterpart end other than the local user.

In some embodiments, for the first case above, the controller is further configured to: obtain the audio and video data of all call users in the virtual room from the server: associate the audio and video data of the call users in the first area with the corresponding video chatting windows respectively for playing: associate only the audio data of the call users in the second area with the corresponding voice chatting windows respectively for playing without parsing the video data of the call users in the second area; and in response to an operation for indicating switching between a video chatting window and a voice chatting window; obtain the audio and video data of the first object from the server, and stop obtaining the video data of the second object from the server. The video chatting window is a window for video chatting. Similarly, the voice chatting window is a window for voice chatting. The video chatting window and the window for video chatting can be used interchangeably.

For the voice chatting window in the second area, only the audio data of the call user, but not the video data, is obtained. When the user chooses to switch the voice chatting window of the first object to a video chatting window, since the first object has been in the voice access state, that is, the audio stream of the first object is always pulled, it only requires to turn on the transmission channel of the video data of the first object to start pulling the video stream of the first object from the virtual room of the server, so that the controller can obtain the audio and video data of the first object and associate it with a target window for video chatting for playing in the target video chatting window: The second object is replaced and switched to voice access, so there is a need to just stop obtaining the video data of the second object from the server and keep obtaining the audio data of the second object from the server. That is, there is only a need to turn off the transmission channel of the video data of the second object to stop pulling the video stream of the second object, and then associate the audio data of the second object with the target window for voice chatting for playing in the target voice chatting window:

In some embodiments, for the second case above, the controller is further configured to: obtain the audio and video data of the call users to be played in the first area from the server, and associate the audio and video data with the corresponding video chatting windows respectively for playing in the corresponding video chatting windows: obtain only the audio data but no video data of the call users to be played in the second area from the server, and associate the audio data of the call users in the second area with the corresponding voice chatting windows for playing in the corresponding voice chatting windows; and in response to an operation for switching between a video chatting window and a voice chatting window; start parsing the video data of the first object and stop parsing the video data of the second object.

In the embodiments, for the voice chatting window in the second area, the video stream and the audio stream are still pulled, but the video data is not parsed. When the user chooses to switch the voice chatting window of the first object to a video chatting window; the audio and video streams of the first object and the second object maintain to be pulled, and the video data of the first object starts being parsed, so that the video of the first object can be played in the target window for video chatting after being parsed: the video data of the second object is stopped being parsed, so that the video data of the second object that has not been parsed cannot be presented on the display, and the audio data of the second object is associated with the target window for voice chatting for playing, so that the second object is switched to voice access mode.

In some embodiments, the associating audio data with the voice chatting window for playing may include: determining not to play the user's video on the display for the user corresponding to the voice chatting window, and only playing the user's voice data through the audio player of the display apparatus. In some embodiments, the user's audio and video data may be pulled from the server or be collected locally, but the user's video data is not parsed and the audio data is parsed, or only the audio data is pulled from the server without pulling the video data.

In some embodiments, the associating audio data with the window for voice chatting for playing may also comprise: determining not to play the user's video on the display for the user corresponding to the window for voice chatting, only playing the user's voice data through the audio player, and loading a dynamic control in the window for voice chatting. The dynamic control is configured in such a way that the dynamic control is presented as a motion image when the voice data of the user corresponding to the window for voice chatting satisfies a preset condition, and the dynamic control is presented as a still image when the user's voice data does not satisfy the preset condition.

In some embodiments, the audio and video data of the first object is associated with the target window for video chatting for playback, which means playing the video data from the audio and video data of the first object in the target window for video chatting, and playing the audio data from the audio and video data of the first object through the audio player. In some embodiments, the user's audio and video data may be pulled from the server or collected locally.

In some embodiments, the audio and video data of the first object is associated with the target window for video chatting for playback, which means playing the video data from the audio and video data of the first object in the target window for video chatting, and playing the audio data from the audio and video data of the first object through the audio player, and meanwhile loading a dynamic control in the target window for video chatting. The dynamic control is configured in such a way that the dynamic control is presented as a motion image when the voice data of the user corresponding to the target window for video chatting satisfies a preset condition, and the dynamic control is presented as a still image when the user's voice data does not satisfy the preset condition.

In some embodiments, each window (window for video chatting or window for voice chatting) is provided with a user identifier control, and the name shown by the user identifier control can directly include an ID of the user who accesses the video call. In some embodiments, the user identifier control can also be presented in conjunction with the pre-stored address book in the display apparatus. If the user who accesses the video call has a name in the address book, the name of the user will be shown on the user identifier control: otherwise, the name customized by the counterpart user is shown, where this name uniquely correspond to or is the same as the user ID.

In some embodiments, the text shown on the user identifier control in the window for the local user is any one of "myself", "local user" and "me", and is not shown as the user ID or name or customed name, but has a mapping relation with the user ID. The name of the counterpart access device is shown in the user identifier control.

In some embodiments, there is a mapping relation between the index of the window and the user ID. After the user pulls the audio and video stream from the server according to the user ID, the parsed video data is displayed in the corresponding window for video chatting according to the mapping relation.

In some embodiments, the audio and video data that needs to be parsed and the audio and video data that does not need to be parsed are determined according to the mapping relation between the index of the video chatting window and the user ID, or, the audio and video data that needs to be parsed and the audio and video data that does not need to be parsed are determined according to the mapping relation between the index of the voice chatting window and the user ID, so that the audio and video data mapped to the video chatting window is parsed for video data, and the audio and video data mapped to the voice chatting window is not parsed for video data.

In some embodiments, according to the mapping relation between the index of the window for video chatting and the user ID, the audio data corresponding to the window is detected, and the dynamic control is presented according to the audio data.

In response to the number of current call channels being less than or equal to the preset number of channels, in step S50, an interface layout template corresponding to the number of current call channels is invoked to control the display to present windows for video of which the number is the same as the number of current call channels and present no window for voice chatting.

When the number of current call channels is less than or equal to the preset number of channels, referring to the interface layout template shown in FIG. 6A, the corresponding interface layout template is selected according to the number of current call channels to display each window for video chatting, and the audio and video data of each call user is pulled from the server and associated with the corresponding window for video chatting for playback. Since no window for voice chatting is displayed, there is no division of the first area and the second area on the video call interface in this case, or it can also be understood that there is only the first area but no second area.

The disclosure can improve the ability of the display apparatus to process the multi-channel video call. When the number of current call channels is greater than the preset number of channels, the free and flexible window switching for audio/video can be realized by the control associated with switching between a video chatting window and a voice chatting window provided in the control list and the corresponding process for voice and video window switching, so that the user can see the video images of users according to the his or her preferences, and the multi-channel video call is no longer limited by the configuration and model of the display apparatus, improving the experience in the video call.

In the above embodiments of the disclosure, considering that it is impossible to see the video images of the voice-accessed members, when switching the first object in the second area from voice access to video access, the first object is firstly selected, and then the video-accessed second object to be replaced by the first object is selected. In practical applications, for example, the current video quality of the user 1 in the first area is not good or a black screen is displayed, so that the local user may not want to watch the user 1's video image, then the user 1 may also be switched to be in voice access by switching a user in the first area from video access to voice access. After clicking the control associated with switching between a video chatting window and a video chatting window: the user can firstly select the user 1 as a substitute user in the first area, and then select the user 4 in the second area, so as to switch the user 1 from video access to voice access and switch the user 4 from voice access to video access.

It should be noted that although the process of the multi-channel video call described in the above embodiments can be configured for the display apparatuses used by each call member in the virtual room, the UIs and window layouts of the video call interfaces on these display apparatuses may be different due to different configurations, performances and models of the display apparatuses. For example, the actual number of channels of the current video call is 6, the preset number of channels of the user 1's display apparatus is 9, and the preset number of channels of the user 2's display apparatus is 3, so the video call interface viewed by the user 1 presents 6 windows for video chatting but no window for voice chatting, and the video call interface viewed by the user 2 presents 3 windows for video chatting and 3 windows for voice chatting. It can be seen that each display apparatus performs the multi-channel video call process based on its own configuration. Further, each call member switches between voice chatting window and voice chatting window according to the member's perference and the UI change generated due to switching between voice chatting window and video chatting window controlled by the local user is only presented on the local apparatus and will not be synchronized to the display apparatuses of other call members, and thus will not affect other call members. Other call members cannot perceive the local user's operation of switching between a window for video chatting and a window for voice chatting.

Although the display apparatus of each member in the virtual room is configured with the same process of the multi-channel video call, the process of the multi-channel video call by each device is independent, and there is no mutual influence or interference. Each display apparatus can process the multi-channel video call at the local end adaptively according to the aforementioned process based on factors such as its own configuration and the local user's viewing preferences.

Figure 14:
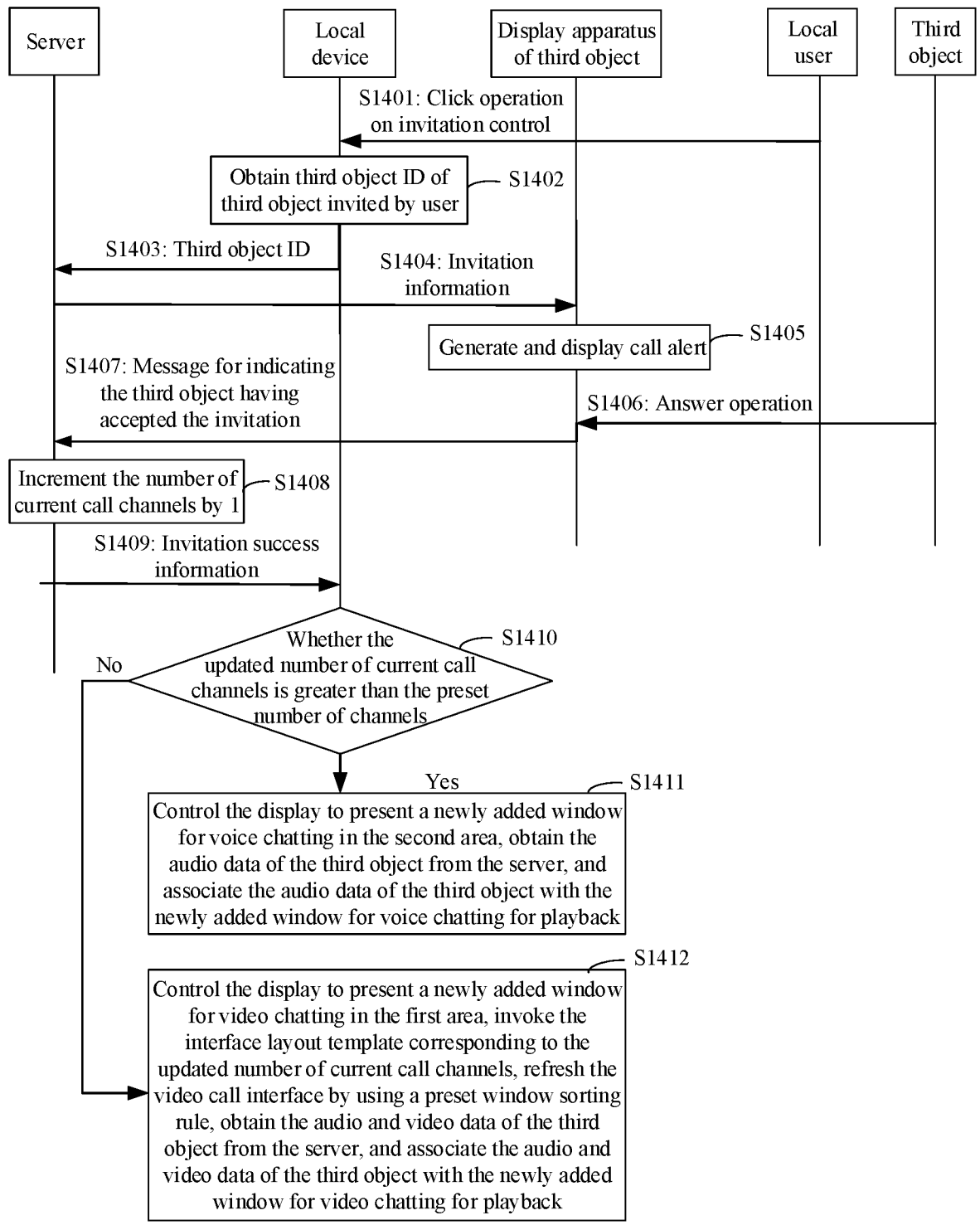
FIG. 14 shows a processing diagram when inviting a third party to join a video call.

In some embodiments, the user may choose to invite a new member to join the current call according to the user's needs during the video call. For this, as shown in FIG. 14, the local user clicks on the invitation control (S1401). The controller in the local device is further configured to: obtain a third object ID of a third object invited by the user in response to the click operation on the invitation control (S1402); and send the third object ID to the server (S1403). After receiving the third object ID, the server sends invitation information to the display apparatus of the third object (S1404).

After the user clicks the invitation control, the user can select the invited third object in the contact list, or enter the account of the third object, the mobile phone number or email address bound to the video call application or other information to find the third object, so as to invite the third object to join the current video call. In this case, the controller can automatically obtain the third object ID of the third object, or the local user can manually input the third object ID of the third object, so that the controller obtains the third object ID. The controller sends the third object ID to the server, and the server receives the third object ID and sends invitation information to the display apparatus used by the third object according to the third object ID, where the invitation information may carry the inviter's information, the relevant information of the video call (for example, including XX chat group, members of the current call in the chat group) and other related content: the display apparatus of the third object can control the video call application to generate an incoming call interface and prompt sound in response to the invitation information, where the incoming call interface may show; for example, "user A invites you to join XX chat group", and an answer control and a cancel control may also be set on the incoming call interface (S1405). If the third object clicks the cancel control, the invitation fails, and the current status of the video call remains unchanged: if the third object clicks the answer control, the third object answers the incoming video call and joins the virtual room, so that the invitation succeeds (S1406: S1407). In response to the message for indicating the third object having accepted the invitation, that is, the third object newly joins the virtual room, the server increments the number of current call channels by 1 (S1408). The server obtains the updated number of current call channels, and then sends the invitation success information to the controller (S1409).

In some embodiments, as shown in FIG. 14, the controller is further configured to: in response to the invitation success information sent from the server, determine whether the updated number of current call channels is greater than the preset number of channels (S1410). When the updated number of current call channels is greater than the preset number of channels, the controller is further configured to: control the display to present a newly added window for voice chatting in the second area, obtain the audio data of the third object from the server, and associate the audio data of the third object with the newly added window for voice chatting for playback (S1411), where the indication information is sent from the server after incrementing the number of current call channels recorded in the virtual room by 1 when the display apparatus of the third object responds to the invitation information and answers the incoming video call.

The controller receives and responds to the invitation success message, and needs to compare the updated number of current call channels and the preset number of channels for the local display apparatus. In this embodiment, the updated number of current call channels is greater than the preset number of channels, meaning that the number of windows for video chatting in the first area has reached the upper limit before the third object accesses. For example, the number of current call channels is 3, and the preset number of channels of the local device is 3, that is, the number of windows for video chatting in the first area is just the upper limit, and the second area is not displayed at this time. When the third object is invited successfully, the updated number of current call channels is changed to 4. Then the local device needs to switch the third object to be in voice access and add a new one window for voice chatting for the third object in the second area, and only receives the audio data of the third object from the server, or receives the audio and video data of the third object but does not parse and output the video data of the third object, and associates the audio data of the third object with the newly added window for voice chatting for playback, so that the local user can hear the voice sent from the third object. For another example, the number of current call channels is 5, and the preset number of channels of the local device is 3, that is, the number of windows for video in the first area reaches the upper limit, and the second area includes 2 windows for voice chatting. Since the third object is the last to access the virtual room, the newly added window for voice chatting for the third object can be sorted and presented following previous voice chatting windows in the second area, and the updated second area includes 3 windows for voice chatting. The third object newly invited in this embodiment accesses by voice. If the local user needs to switch the third object from voice access to video access, the above-mentioned switching between a window for video chatting and a window for voice chatting can be adopted, which will not be described here.

In some embodiments, as shown in FIG. 14, the controller is further configured to: in response to the invitation success information sent from the server, when the updated number of current call channels is less than or equal to the preset number of channels, control the display to present a newly added window for video chatting in the first area, invoke the interface layout template corresponding to the updated number of current call channels, refresh the video call interface by using a preset window sorting rule, obtain the audio and video data of the third object from the server, and associate the audio and video data of the third object with the newly added window for video chatting for play back (S1412), where the indication information is sent from the server after incrementing the number of current call channels recorded in the virtual room by 1 when the display apparatus of the third object responds to the invitation information and answers the incoming video call.

The controller receives and responds to the invitation success message, and needs to compare the updated number of current call channels and the preset number of channels. In this embodiment, the updated number of current call channels is less than or equal to the preset number of channels, meaning that the number of windows for video in the first area has not reached the upper limit before the third object accesses. For example, the number of current call channels is 5, and the preset number of channels of the local device is 6, that is, the number of windows for video in the first area is 5, and the second area is not displayed in this case. When the third object is invited successfully, the updated number of current call channels is changed to 6, that is, the number of windows for video chatting in the first area just reaches the upper limit after the third object accesses, and then the local device supports the video access of the third object. For another example, the number of current call channels is 6, and the preset number of channels of the local device is 9. When the third object is invited successfully, the updated number of current call channels is changed to 7, that is, the number of windows for video chatting in the first area has still not reached the upper limit after the new member's access, so the local device supports the video access of the third object.

When the third object accesses by video, a window for video chatting for the third object needs to be newly added. In this case, due to the increase in the number of windows for video chatting in the first area, the corresponding window layout may need to be adjusted appropriately. For example, the preset number of channels of the local device is 9. The first area previously shows 8 windows for video chatting, and now the number of windows for video chatting is increased to 9 after the third object accesses. Referring to FIG. 6A, the interface layout template used in the first area needs to change from an array of 2 rows and 4 columns into an array of 3 rows and 3 columns, and then the windows for video chatting of all members are sorted according to the preset window sorting rule, for example, according to the time sequence in which the 9 call members in the virtual room access the call. The third object is the last to access the virtual room, so the newly added window for video chatting for the third object can be displayed at the end position of the first area, and the video call interface is refreshed to obtain the updated 3*3 interface after the sorting is completed. Meanwhile, the audio and video data of the third object is received from the server, and the audio and video data of the third object is associated with the newly added window for video chatting for playback, so that the local user can see the video image of the third object and hear the voice of the third object.

The process and UI adjustment when inviting a new member by taking the case of inviting one new member to access the virtual room as an example are discussed. In some embodiments, the inviter can invite one or more new members to join the call at one time, when multiple new members are invited to join once, since the time for each new member to respond and answer the invitation call may be different, that is, a new member accesses at intervals until all the invited new members access the virtual room, the change of the number of current call channels and the UI interface and other content are adaptively adjusted according to the order in which the new members answer. The process is basically similar to the above invitation process, and will omit here.

In some embodiments, before the video call ends, a call user may click the hangup control to exit the video call in advance, which may include but not limited to the following cases: case A: the call user who hangs up accessed by video, and the number of current call channels updated after hanging up is less than the preset number of channels: case B: the call user who hangs up accessed by video, and the number of current call channels updated after hanging up is equal to the preset number of channels: case C: the call user who hangs up accessed by video, and the number of current call channels updated after hanging up is greater than the preset number of channels: case D: the call user who hangs up accessed by voice, and the number of current call channels updated after hanging up is equal to the preset number of channels: case E: the call user who hangs up accessed by voice, and the number of current call channels updated after hanging up is greater than the preset number of channels.

Figure 15:
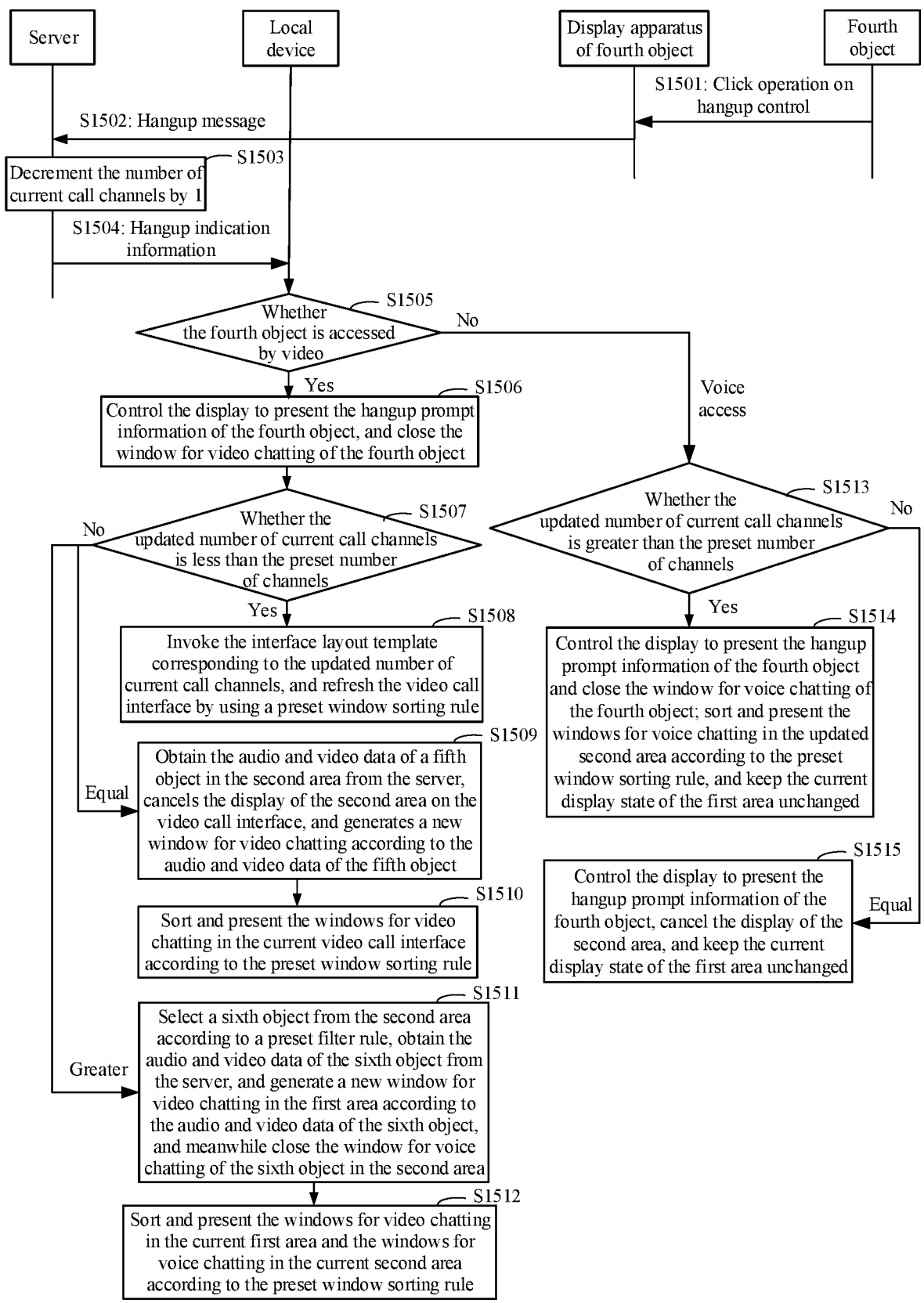
FIG. 15 shows a processing diagram when a call party ends a video call.

In some embodiments, as shown in FIG. 15, for the case A, a fourth object clicks on the hangup control (S1501). The display apparatus of the fourth object sends a hangup message to the server in response to the operation of clicking on the hangup control (S1502). In response to the hangup message, the server decrements the number of current call channels recorded in the virtual room by 1 (S1503); and sends hangup indication information to the controller of the local device (S1504). The controller is further configured to: receive the hangup indication information sent from the server, and determine whether the fourth object accessed by video in response to the hangup indication information (S1505). The hangup indication information is sent from the server after decrementing the number of current call channels recorded in the virtual room by 1 when the fourth object in the virtual room clicks the hangup control. In response to the hangup indication information, if the fourth object accessed by video, the controller controls the display to present the hangup prompt information for the fourth object, and close the window for video chatting for the fourth object (S1506). The controller further determines whether the updated number of current call channels is less than the preset number of channels (S1507). When determining that the updated number of current call channels is less than the preset number of channels, the controller invokes the interface layout template corresponding to the updated number of current call channels, and refreshes the video call interface by using a preset window sorting rule (S1508).

When any call user (namely the fourth object) in the virtual room except the local user clicks the hangup control and exits the video call in advance, the server learns that a user, for example, the fourth object, has exited the virtual room in response to the message that the fourth object has hung up, needs to decrement the recorded number of current call channels by 1 to obtain the updated number of current call channels, and then send the hangup indication information to the controller of the display apparatus, where the hangup indication information may carry a fourth object ID of the fourth object and is used to indicate the controller that the call user corresponding to the ID has hung up the video call. Since the fourth object hangs up in the video access mode, the local apparatus will not continue to pull the audio and video streams of the fourth object, so the window for video chatting for the fourth object cannot present the valid video image. In this case, the window for video chatting may present a black or gray screen or others. The controller receives and responds to the hangup indication information, and controls the display to present the hangup prompt information. The hangup prompt information is, for example, "the fourth object has hung up the call". The display position of the hangup prompt information is not limited. For example, it may be shown as black window for video chatting of the fourth object. Then the window for video chatting of the fourth object needs to be closed, so that the video chatting window of the party who hangs up is no longer shown on the video call interface of the local apparatus.

When the fourth object hangs up the call in the video access mode, the video chatting window for the fourth object needs to be closed. In this case, since the number of windows for video chatting is reduced, the corresponding window layout needs to be adjusted appropriately. If the updated number of current call channels is less than the preset number of channels, it means that the number of windows for video before the fourth object hangs up is less than or equal to the preset number of channels. For example, the preset number of channels of the local apparatus is 4, and the original video call interface presents 4 windows for video chatting. After the fourth object hangs up, the number is reduced to 3 windows for video chatting. Then, referring to FIG. 6A, the interface layout template used in the video call interface needs to be changed from an array of 2 rows and 2 columns to an array of 1 row and 3 columns, and then the 3 windows for video chatting in the new interface layout template are sorted according to the preset window sorting rule, for example, according to the time sequence in which the remaining 3 call members in the virtual room access the call, to obtain the updated interface with the array of 1 row and 3 columns after the sorting is completed.

In some embodiments, if the windows for video chatting are sorted according to time order of the access before the fourth object hangs up, then the sequence positions of other windows for video chatting sorted after the fourth object can be sequentially increased by 1 and the sequence positions of the windows for video chatting sorted before the fourth object remain unchanged after the fourth object hangs up. For example, the user 1, user 2, user 3, and user 4 (the local user) are successively sorted according to the time order of access before the fourth object hangs up. When the user 2 hangs up the video call, that is, the user 2 is the fourth object, the user 1 remains at the first place in the new template, the user 3 is moved up to the second place in the new template, and the user 4 is moved up to the third place in the new template. After refreshing, the order is user 1, user 3 and user 4.

In some embodiments, as shown in FIG. 15, for the case B, the fourth object clicks on the hangup control (S1501). The display apparatus of the fourth object sends a hangup message to the server in response to the operation of clicking on the hangup control (S1502). In response to the hangup message, the server decrements the number of current call channels recorded in the virtual room by 1 (S1503); and sends hangup indication information to the controller of the local apparatus (S1504). The controller is further configured to: receive the hangup indication information sent from the server, and determine whether the fourth object accessed by video in response to the hangup indication information (S1505). The hangup indication information is sent from the server after decrementing the number of current call channels recorded in the virtual room by 1 when the fourth object in the virtual room clicks the hangup control. In response to the hangup indication information, if the fourth object accessed by video, the controller controls the display to present the hangup prompt information of the fourth object, and closes the video chatting window for the fourth object (S1506). The controller further determines whether the updated number of current call channels is less than the preset number of channels (S1507). In response to the updated number of current call channels being equal to the preset number of channels, the controller obtains the audio and video data of a fifth object in the second area from the server, cancels the display of the second area on the video call interface, and generates a new window for video chatting according to the audio and video data of the fifth object (S1509); and sorts and presents the windows for video chatting in the current video call interface according to the preset window sorting rule (S1510).

If the updated number of current call channels is equal to the preset number of channels, it means that the number of call channels before the fourth object hangs up is the preset number of channels plus one, that is, the preset number of windows for video chatting in the first area (including the fourth object)+one window for voice chatting in the second area, then this one window for voice chatting in the second area corresponds to the fifth object. Then, after the fourth object hangs up, the fifth object can be automatically switched from voice access to video access, that is, the voice chatting window for the fifth object is closed, the presentation of the second area is canceled on the video call interface, and the video stream of the fifth object starts to be pulled from the server, plus the audio stream that has been in the streaming state, that is, the audio and video data of the fifth object is simultaneously obtained. A new window for video chatting is generated based on the audio and video data of the fifth object, so that the local user can see the video image of the fifth object and hear the voice of the fifth object according to the new window for video chatting. In this case, the current video call interface presents the preset number of windows for video chatting without the fourth object but including the fifth object.

After the fourth object hangs up, the video chatting window for the user object is closed, and a new window for video chatting is created for the fifth object who originally accessed by voice to play the audio and video data of the fifth object. In some embodiments, the local apparatus cannot pull the audio and video stream of the fourth object after the fourth object hangs up, the window for video chatting of the fourth object may not be closed, but the audio and video data of the fifth object received from the server is associated with the window for video chatting of the fourth object for playback, so that there is no need to create a new window for video chatting for the fifth object, i.e., the fourth object is replaced by the fifth object.

Before the fourth object hangs up, the number of windows for video chatting in the first area is the preset number of channels; and after the fourth object hangs up, the updated number of current call channels is equal to the preset number of channels, so the interface layout template used by the video call interface does not need to be changed, and is the interface layout template corresponding to the preset number of channels. There is only a need to sort and present the windows for video chatting on the current video call interface according to the preset window sorting rule. For example, the window sorting rule may comprise: according to the time sequence of accessing the virtual room, the windows for video chatting that were previously ranked positionally after the window of the fourth object rise one place successively, the windows for video chatting that were previously ranked before the fourth object remain unchanged, and the window for video chatting of the fifth object is ranked at the end position of the template. After the sorting is completed, the update of the video call interface is completed.

In some embodiments, as shown in FIG. 15, for the case C, the fourth object clicks on the hangup control (S1501). The display apparatus of the fourth object sends a hangup message to the server in response to the operation of clicking on the hangup control (S1502). In response to the hangup message, the server decrements the number of current call channels recorded in the virtual room by 1 (S1503); and sends hangup indication information to the controller of the local apparatus (S1504). The controller is further configured to: receive the hangup indication information sent from the server, and determine whether the fourth object accesses by video in response to the hangup indication information (S1505). The hangup indication information is sent from the server after decrementing the number of current call channels recorded in the virtual room by 1 when the fourth object in the virtual room clicks the hangup control. In response to the hangup indication information, if the fourth object is accessed by video, the controller controls the display to present the hangup prompt information of the fourth object, and closes the window for video chatting of the fourth object (S1506). The controller further determines whether the updated number of current call channels is less than the preset number of channels (S1507). In response to the updated number of current call channels being greater than the preset number of channels, the controller selects a sixth object from the second area according to a preset filter rule, obtains the audio and video data of the sixth object from the server, and generates a new window for video chatting in the first area according to the audio and video data of the sixth object, and meanwhile closes the window for voice chatting of the sixth object in the second area (S1511); and sorts and presents the windows for video chatting in the current first area and the windows for voice chatting in the current second area according to the preset window sorting rule (S1512).

If the updated number of current call channels is greater than the preset number of channels, it means that the number of call channels before the fourth object hangs up is the preset number of channels+N (N>2), that is, the preset number of windows for video chatting in the first area (including the fourth object)+N windows for voice chatting in the second area. Since the fourth object has hung up while there are multiple windows for voice chatting in the second area, one of the users (i.e., the sixth object in this embodiment) is selected from the second area to be switched to video access mode. The sixth object may be selected from the second area based on a preset filter rule, where the preset filter rule may comprise, for example, switching the call member corresponding to the window for voice chatting in the first place in the second area to be shown in the first area according to the order of the windows in the second area. Alternatively, if the local user accesses by voice, the local user can be automatically switched to video access. The preset filter rule can be set according to needs, and is not limited in these embodiments.

When the sixth object is selected, the video stream of the sixth object starts to be pulled, and the audio stream of the sixth object has been in the streaming flow, so the audio and video data of the sixth object can be obtained. A new window for video chatting is generated in the first area according to the audio and video data of the sixth object, while the window for voice chatting of the sixth object in the second area is closed, so that the user can see the video image of the sixth object and hear the voice of the sixth object in the new window for video chatting. In this case, the current video call interface is presented as follows: the current first area presents a preset number of windows for video chatting without the fourth object but including the sixth object, the current second area presents (N−1) windows for voice chatting, and the number of current call channels is the preset number of channels+N−1, where N>2.

As discussed above, after the fourth object hangs up, the window for video chatting of the fourth object is closed, and a new window for video chatting is created for the sixth object who originally accessed by voice to play the audio and video data of the sixth object. In some embodiments, the local apparatus cannot pull the audio and video stream of the fourth object after the fourth object hangs up, the window for video chatting of the fourth object may not be closed, but the audio and video data of the sixth object received from the server is associated with the window for video chatting of the fourth object for playback, so that there is no need to create a new window for video chatting for the sixth object, i.e., the fourth object is replaced by the sixth object.

Before the fourth object hangs up, the number of windows for video chatting in the first area is the preset number of channels; and after the fourth object hangs up, the updated number of current call channels is still greater than the preset number of channels, so the interface layout template used by the video call interface does not need to be changed, and can be the interface layout template corresponding to the preset number of channels. There is only a need to sort and present the windows for video chatting on the current video call interface according to the preset window sorting rule. For example, the window sorting rule may comprise: according to the time sequence of accessing the virtual room, the windows for video chatting that were previously ranked in position after the fourth object rise by one successively, the windows for video chatting that were previously ranked in position before the fourth object remain unchanged, and the window for video chatting of the sixth object is ranked at the end position of the template. After the sorting is completed, the update of the first area is completed.

The window for voice chatting of the sixth object is closed in the second area, that is, the number of windows for voice chatting in the second area is reduced, so it is also necessary to re-sort and display the windows for voice chatting in the second area. Referring to FIG. 7, for example, the preset filter rule may comprise switching the user 4 in the first place in the second area to video access, that is, the user 4 is the sixth object. After the window for voice chatting of the user 4 is closed, the window for voice chatting of the user 5 and the window for voice chatting of the local user rise by one successively, that is, the window for voice chatting of the user 5 is ranked first, and the window for voice chatting of the local user is ranked in the second place, which is equivalent to successively moving the windows for voice chatting ranked after the sixth object forward by one. For another example, the preset filter rule may include switching the local user to video access, that is, the local user is the sixth object, and then the order locations of the user 4 and user 5 ranked before the sixth object remains unchanged. If there is no window for voice chatting behind the local user, then the window for voice chatting of the local user is closed. If there are other windows for voice chatting ranked behind the local user, the windows for voice chatting ranked behind the local user rise by one successively in the ranking.

In some embodiments, referring to FIG. 15, for the case D, the fourth object clicks on the hangup control (S1501). The display apparatus of the fourth object sends a hangup message to the server in response to the operation of clicking on the hangup control (S1502). In response to the hangup message, the server decrements the number of current call channels recorded in the virtual room by 1 (S1503); and sends hangup indication information to the controller of the local apparatus (S1504). The controller is further configured to: receive the hangup indication information sent from the server, and determine whether the fourth object is accessed by video in response to the hangup indication information (S1505). The hangup indication information is sent from the server after decrementing the number of current call channels recorded in the virtual room by 1 when the fourth object in the virtual room clicks the hangup control. In response to the hangup indication information, if the fourth object is accessed by voice, the controller determines whether the updated number of current call channels is greater than the preset number of channels (S1513). In response to the updated number of current call channels being equal to the preset number of channels, the display is controlled to present the hangup prompt information of the fourth object, cancel the display of the second area, and keep the current display state of the first area unchanged (S1515).

The fourth object hangs up in the voice access mode, meaning that the number of call channels before the fourth object hangs up is greater than the preset number of channels. Assuming M=the number of call channels before the fourth object hangs up−the preset number of channels, then M>1, that is, before the fourth object hangs up, the second area includes at least one window for voice chatting, that is, the number of call channels before the fourth object hangs up=the preset number of channels+M, and the updated number of current call channels is equal to the preset number of channels, meaning that M=1.

When M=1, please refer to FIG. 6C. When the user 4 as the fourth object hangs up the call, the hangup prompt information of the fourth object may be displayed, and the window for voice chatting of the fourth object is closed. In this case, there is no window for voice chatting displayed in the second area, and then the display of the second area is canceled. No one hangs up in the first area, so the current display state of the first area remains unchanged, that is, the interface layout template, the audio and video playback and window sorting of the call members (user 1, user 2 and the local user) in the first area and other states remain unchanged, and then the update of the video call interface is complete.

In some embodiments, referring to FIG. 15, for the case E, the fourth object clicks on the hangup control (S1501). The display apparatus of the fourth object sends a hangup message to the server in response to an operation of clicking on the hangup control (S1502). In response to the hangup message, the server decrements the number of current call channels recorded in the virtual room by 1 (S1503); and sends hangup indication information to the controller of the local apparatus (S1504). The controller is further configured to: receive the hangup indication information sent from the server, and determine whether the fourth object is accessed by video in response to the hangup indication information (S1505). The hangup indication information is sent from the server after decrementing the number of current call channels recorded in the virtual room by 1 when the fourth object in the virtual room clicks the hangup control. In response to the hangup indication information, if the fourth object is accessed by voice, the controller determines whether the updated number of current call channels is greater than the preset number of channels (S1513). In response to the updated number of current call channels being greater than the preset number of channels, the display is controlled to present the hangup prompt information of the fourth object and close the window for voice chatting of the fourth object: sort and present the windows for voice chatting in the updated second area according to the preset window sorting rule, and keep the current display state of the first area unchanged (S1514).

For the case E, the updated number of current call channels is greater than the preset number of channels, indicating that M is greater than 1. When M is greater than 1, refer to FIG. 7. When the user 5 hangs up the call, that is, the user 5 is the fourth object, the local user can be prompted that "User 5 has hung up call", and the window for voice chatting of the fourth object is closed at the same time. Since M is greater than 1, the second area still has at least one window for voice chatting after the window for voice chatting of the fourth object is closed. In the example of FIG. 7, after the window for voice chatting of the user 5 is closed, there are still 2 voice chatting windows for user 4 and the local user, so there is a need to re-sort according to the window sorting rule. If the user 4, user 5 and the local user are sorted in the time sequence of accessing the virtual room before the user 5 hangs up, then: after the window for voice chatting of the user 5 is closed, the window for voice chatting of the user 4 ranked before the user 5 remains unchanged, and the window for voice chatting of the local user ranked after the user 5 rises by 1 in the ranking, that is, moved forward to the second position for display, thereby completing the update of the second area. Same as the above case D, the fourth object hangs up in the voice access mode in the second area, which has no effect on the display state in the first area.

It should be noted that, if the fourth object hangs up the call in the voice access mode, the updated number of current call channels is greater than or equal to the preset number of channels, and the case where the updated number of current call channels is less than the preset number of channels does not exist.

In some embodiments, after the video call is started, the interface layout template of the video call and the window display in the first area/second area can be adaptively changed and adjusted according to the number of parties currently accessing the virtual room. For example, the preset number of channels of the user 1 (as initiator, local user) is 3. After the user 1 initiates a video call with 5 persons, the current interface will firstly present the window for video chatting of the initiator. Then, after the user 2 accesses, the video call interface is displayed according to the sort order of user 1 and user 2 and the interface layout template of 1 row and 2 columns: the user 3 accesses after the user 2, and then the video call interface is adjusted to the interface layout template of 1 row and 3 columns corresponding to the preset number of channels according to the sort order of user 1, user 2 and user 3: the user 4 accesses after the user 3, the first area keeps the display state when the user 3 accesses, and the window for voice chatting of the user 4 is displayed in the second area; and the user 5 accesses after the user 4, the display state of the first area remains unchanged, and the window for voice chatting of the user 5 is displayed behind the window for voice chatting of the user 4. Then all 5 persons have accessed, and the video call interface is correspondingly adjusted according to each party's access.

In some embodiments, when the initiator initiates a video call with a target number of channels, the server will create a virtual room that supports the target number of channels. Then, when the server sends a call request to other members, the call request carries the target number of channels, In this way, the display apparatus of each call member can directly establish a window layout of the video call interface corresponding to the target number of channels when starting the video call: if the target number of channels is less than the preset number of channels, the interface layout template corresponding to the target number of channels is invoked, and the windows for video chatting of which the number is the target number of channels are displayed: if the target number of channels is equal to the preset number of channels, the interface layout template corresponding to the preset number of channels is invoked, and the windows for video chatting of which the number is the preset number of channels are displayed: if the target number of channels is greater than the preset number of channels, the interface layout template corresponding to the preset number of channels is invoked, the windows for video chatting of which the number is the preset number of channels are displayed in the first area, and the windows for voice chatting of which the number is the difference between the target number of channels and the preset number of channels are generated and displayed in the second area.

In some embodiments, on the initial video call interface of the initiator's device, the video image of the local user can be seen in the first place, and the windows for video chatting of other call users are shown as gray screen and the prompt information such as "waiting for access" is shown on these windows. Then the audio and video data of the call users is successively pulled according to the time sequence in which the call users access the virtual room, and associated with the corresponding window for video chatting for playback, and/or, the audio data of the call user who accesses after the preset number of channels being exceeded is pulled and associated with the corresponding window for voice chatting for playback, until all the windows on the initial video call interface have finished loading data. For example, the user 1 initiates a 4-participant video call, and the preset number of channels of the display apparatus of the user 1 is 3. Then, when user 1 initiates the video call, the initial video call interface established includes 1*3 windows for video chatting in the first area+one window for voice chatting in the second area. The first window for video chatting shows the video image of the user 1: then the user 2 accesses, the audio and video data of the user 2 is obtained from the server, and the audio and video data of the user 2 is associated with the second window for video chatting for playback: the user 3 accesses after the user 2, the audio and video data of the user 3 is pulled, and the audio and video data of the user 3 is associated with the third window for video chatting for playback: the user 4 accesses after the user 3, and meanwhile, the user 4 is automatically switched to voice access, the audio data of the user 4 is pulled, and the audio data of the user 4 is associated with the first window for voice chatting in the second area for playback. Then, all of the video calls of which the number is the target number of channels access.

In some embodiments, for example, the user 1 initiates a 5-participant video call, and invites the user 2, user 3, user 4 and user 5 to access the video call at one time. The preset number of channels of the display apparatus of the user 3 is 4. When the user 3 accesses the video call, the initial video call interface constructed includes 2*2 windows for video chatting in the first area+one window for voice chatting in the second area. Before user 3, the user 1 initiates a call, the user 4 accesses firstly, then the user 2 accesses, and then the user 3 accesses, so the user 3 can receive the audio and video data of the user 1, user 4 and user 2 from the server. Thus, the first window for video chatting plays the audio and video data of the user 1, the second window for video chatting plays the audio and video data of the user 4, the third window for video chatting plays the audio and video data of the user 2, the fourth window for video chatting plays the video image collected locally by the user 3, and the window for voice chatting in the second area shows a gray screen and the prompt information such as "waiting for access". The user 5 accesses after the user 3, and then the audio data of the user 5 is received, so that the audio data of the user 5 is played in the first window for voice chatting, and then all of the video calls of which the number is the target number of channels access.

It should be noted that, during the video call access process of a target number of channels, the specific UI presentation form and process are not limited to those described in the embodiments of the disclosure. In some embodiments, the disclosure provides a display apparatus, including: a display: an audio player configured to output audio data sent from a counterpart end in a video call: a communicator configured to connect the display apparatus with a server: a user input interface configured to receive an input operation; and a controller connected with the display, audio player, communicator and user input interface respectively and configured to: display a first area and a second area on a video call interface according to an operation received via the user input interface, where the first area includes at least two windows for video chatting, and the second area includes at least one window for voice chatting: receive a switch command, receive a command for selecting a first video chatting window; and receive a command for selecting a first voice chatting window; where the first video chatting window is a window for video chatting that displays video data of a first terminal in the first area, the first voice chatting window is a window for voice chatting in the second area and indicates that a second terminal accesses the video call, the first terminal and the second terminal are terminals accessing the video call, and the video data of the second terminal is not displayed in the call interface: update the first video chatting window and the first voice chatting window; so that the updated first video chatting window presents the video data of the second terminal accessing the video call, the updated voice chatting window indicates that the first terminal accesses the video call, and the video data of the first terminal is not displayed in the updated call interface.

In some embodiments, the controller is configured to: in response to the switch command, cause the focus to land in the first area, and receive a confirm command while the focus is located in the first video chatting window and determine that the first video chatting window is selected: in response to a selection of the first video chatting window; cause the focus to land in the second area; and receive a confirm command while the focus is located in the first voice chatting window and determines that the first voice chatting window is selected.

In some embodiments, the controller is configured to: in response to the switch command, cause the focus to land in the second area, and receive a confirm command while the focus is located in the first voice chatting window and determine that the first voice chatting window is selected: in response to a selection of the first voice chatting window; cause the focus to land in the first area; and receive a confirm command while the focus is located in the first video chatting window and determines that the first video chatting window is selected.

In some embodiments, the controller is configured to: stop parsing the video data in the audio-video stream of the first terminal according to a mapping relation between the first video chatting window and the audio-video stream of the first terminal: establish a mapping relation between the first video chatting window and the audio-video stream of the second terminal based on the second terminal corresponding to the first voice chatting window: parse the video data in the audio-video stream of the second terminal according to the mapping relation between the first video chatting window and the audio-video stream of the second terminal, and display the parsed video data in the audio-video stream of the second terminal in the first video chatting window:

In some embodiments, the controller is configured to: remove the mapping relation between the first voice chatting window and the audio-video stream of the second terminal; and establish the mapping relation between the first voice chatting window and the audio-video stream of the first terminal.

In some embodiments, the controller is configured to: load a user identifier of the second terminal in a user identifier control on the updated first video chatting window; and load a user identifier of the first terminal in a user identifier control on the updated first voice chatting window:

In some embodiments, the controller is configured to: receive a voice command for switching the first voice chatting window and the first video chatting window.

In some embodiments, the controller is configured to: receive a command associated with an input preset key value of the remote control: display a control list on a floating layer of the call interface in response to the command associated with the preset key value of the remote control, where the control list includes a hangup control and a control associated with switching between voice chatting window and video chatting window: receive a confirm command while the focus is on the control associated with switching between voice chatting window and video chatting window; and receive a switch instruction for causing the focus to land in the first area or the second area.

In some embodiments, the controller is further configured to: control the display to close the current video call interface in response to a click operation on the hangup control. When the local user clicks the hangup control, the local user actively hangs up the video call and exits the virtual session room. In this case, the local apparatus will no longer collect and upload the audio and video data of the local user, and will not receive the audio and video data of other call user from the server. The video call interface is closed, and the video call is terminated.

In some embodiments, the controller is further configured to: control the display to close the current video call interface in response to reception of information for indicating call participant hanging up sent from the server. The local user does not hang up the call actively, but all the call users who participate in the call except the local user have hung up, that is, there is only one local user in the virtual room, and thus the video call does not need to continue, meaning that the local user hangs up the video call passively. When the server receives hangup messages of all call users in the virtual room except the local user, the server sends the information that for indicating that other call users hang up to the display apparatus of the local user, and the controller of the local apparatus receives and responds to the information, that is, starts the hangup process and closes the call interface.

A video call application (APP) can be preset in the controller. In this APP, the creation and transformation of the UI interface for initiating and answering a video call, inviting, hanging up at the counterpart end, and hanging up at the local end can be realized, the user's operation on the UI interface is supported, and the process of, such as, controlling the streaming state of each channel of the call. Other functions of the video call can also be realized by the APP, which will not be repeated here. It should be noted that the interface layout template of the multi-channel video call and the UI display of the related process are not limited to those shown in the drawings, and the process when the user operates based on the UI and related controls can be adaptively changed.

Figure 16:
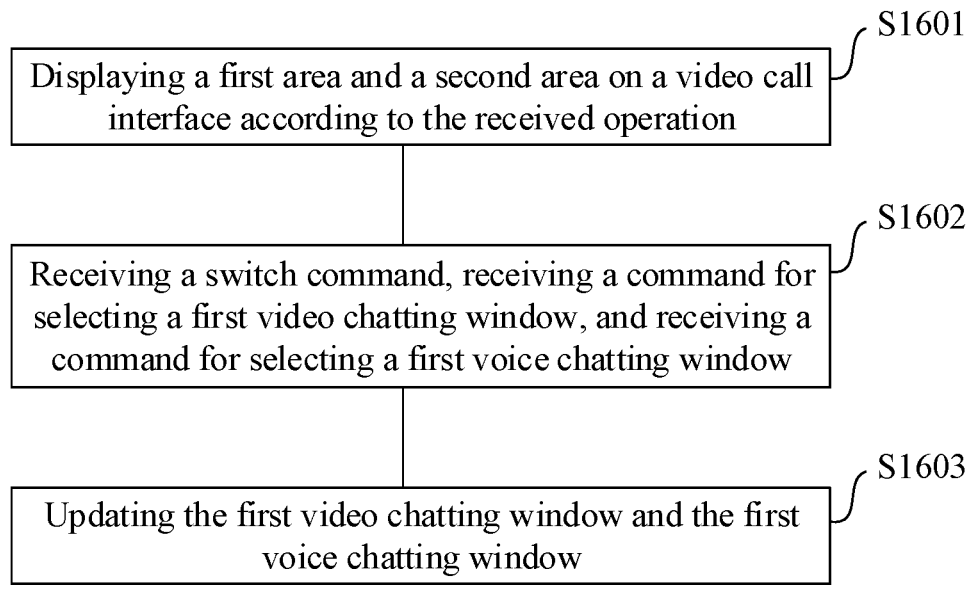
FIG. 16 shows a diagram of a multi-channel video call method.

As shown in FIG. 16, some embodiments of the disclosure further provide a method for processing a multi-channel video call, including the following steps.

S1601: displaying a first area and a second area on a video call interface according to an operation command, where the first area includes at least two windows for video chatting, and the second area includes at least one window for voice chatting.

S1602: receiving a switch command, receiving a command for selecting a first video chatting window; and receiving a command for selecting a first voice chatting window; where the first video chatting window is a window for video chatting that displays video data of a first terminal in the first area, the first voice chatting window is a window for voice chatting in the second area and indicates that a second terminal accesses the video call, the first terminal and the second terminal are terminals accessing the video call, and the video data of the second terminal is not displayed in the call interface.

S1603: updating the first video chatting window and the first voice chatting window; to cause the updated first video chatting window display the video data of the second terminal accessing the video call, the updated voice chatting window to indicate that the first terminal accesses the video call, and the video data of the first terminal is not displayed in the updated call interface.

In some embodiments, the updating the first video chatting window and the first voice chatting window includes: stopping parsing the video data in the audio-video stream of the first terminal according to a mapping relation between the first video chatting window and the audio-video stream of the first terminal: establishing a mapping relation between the first video chatting window and the audio-video stream of the second terminal based on the second terminal corresponding to the first voice chatting window: parsing the video data in the audio-video stream of the second terminal according to the mapping relation between the first video chatting window and the audio-video stream of the second terminal, and displaying the parsed video data in the audio-video stream of the second terminal in the first video chatting window: removing the mapping relation between the first voice chatting window and the audio-video stream of the second terminal; and establishing the mapping relation between the first voice chatting window and the audio-video stream of the first terminal.

Moreover, in practical applications, limited by the configuration and model of the display apparatus itself, more display apparatuses are not equipped with image collectors and sound collectors, so that such display apparatus cannot collect and upload the audio and video data of the local user to the server, and thus the counterpart user cannot obtain the audio and video data of the local user from the server. When a video call is started, the local user can see the video image of the counterpart user and hear the voice of the counterpart user, but the counterpart user cannot see the video image of the local user and hear the voice of the local user, so that the two parties in the call cannot carry out the effective chat interaction. In view of this, the embodiments further provide a cast method that uses a terminal device as the sound collector and image collector of the display apparatus and casts the video call of the terminal to the display apparatus for playback. In an embodiment of the disclosure, the terminal device may be a mobile terminal 300 such as a smart phone or a tablet computer, or may be a device equipped with a camera and a microphone, such as a notebook computer, and the display apparatus may be a large-screen display apparatus, such as a television without a camera and a microphone. The process of casting the video call of the terminal to the display apparatus and the UI change will be firstly illustrated below in detail from the perspective of UI change and application.

It should be noted that both the terminal device and the target device for content cast need to install a video call application. In the disclosure, the video call application in the terminal device is denoted as a first application, and the video call application in the target device is denoted as a second application.

Figure 17:
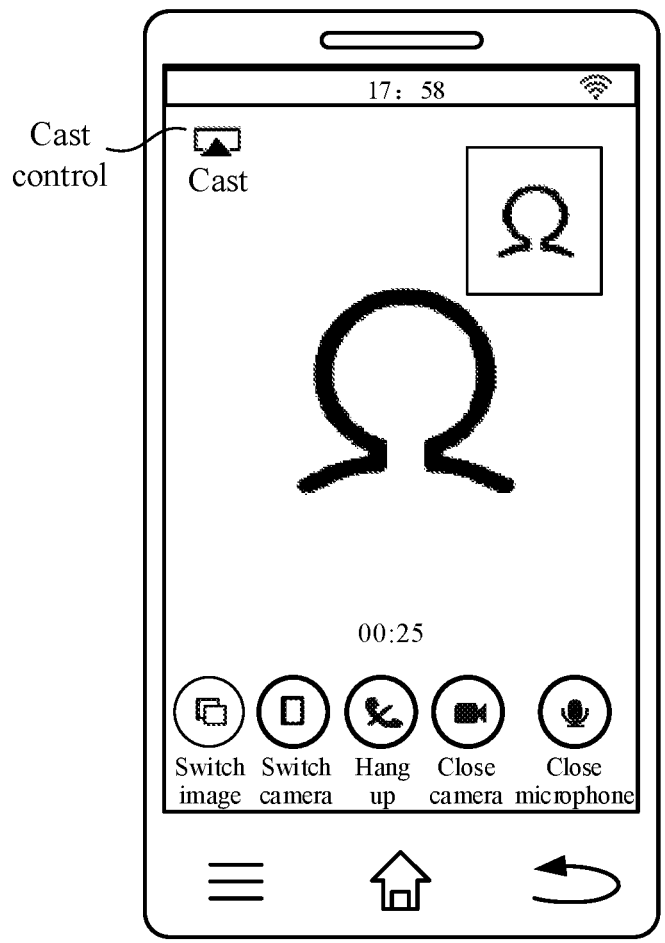
FIG. 17 shows a schematic diagram of an interface when the terminal device starts a video call.

After launching the first application installed in the terminal device, the user can initiate a video call, or can answer a video call on the incoming call interface to thereby accept the initiator's video call invitation. When the video call starts, the user will join a virtual session room, which can include at least two call members. The video call can be in the one-to-one or many-to-many form. FIG. 17 is a video call interface displayed by one-to-one as an example. The full-screen window in the interface displays the video image of the call user at the counterpart end, and the video image of the local user is displayed in a small window mode. The audio player in the terminal can play the audio data of the call user at the counterpart end. There are several operation controls on the video call interface, such as conventional screen switching control, camera switching control, first hangup control, camera state control, and microphone state control, etc. Here, the screen switching control can switch the video images of the counterpart user and the local user. When the user clicks the screen switching control, the video image of the local user can be switched to the full-screen mode, and the video image of the counterpart user can be switched to be in the small window mode. The camera switching control can control the switch between the front camera and the rear camera on the mobile phone. For example, in FIG. 17, the user video is currently collected by the front camera. When the camera switching control is clicked, the video is switched to be collected by the rear camera. The first hangup control is used to hang up the current video call when selected, and then the local user exits the virtual room; the camera state control is used to turn on or off the camera that currently collects the video; and the microphone state control is used to turn on or off the microphone. On this basis, the disclosure adds a cast control at a designated position on the video call interface. For example, the cast control is displayed at the upper left corner of the interface in FIG. 17. When the user clicks the cast control, the cast processing of the video call is started. The operation controls set on the video call interface are not limited to those shown in the embodiment of the disclosure.

When a video call is made, both the camera and the microphone are turned on, and then the terminal can collect the audio and video data of the local user and upload it to the virtual room of the server, so that other call user in the virtual room can subscribe and receive the audio and video data of the local user in the virtual room, to thereby see the video image of the local user on the display apparatus/terminal device of the call user and hear the voice of the local user.

Figure 18:
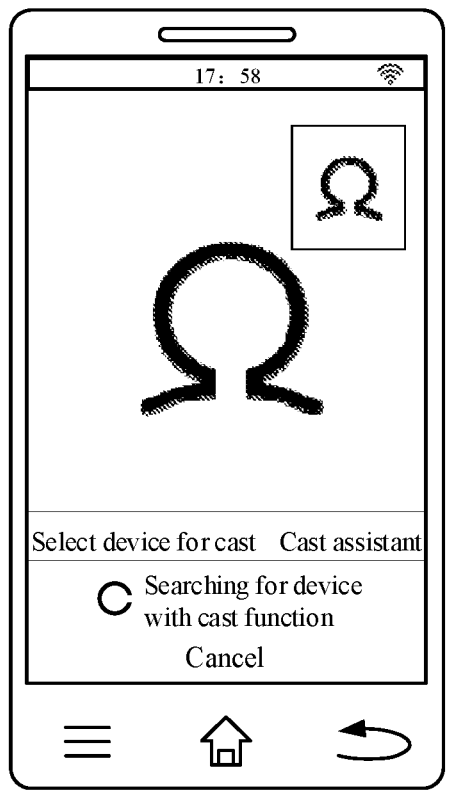
FIG. 18 shows a schematic diagram of a device search interface.

After the user clicks the cast control, the terminal device will search for a display apparatus that can be used as a cast device in the local area network. In this case, the device search interface as shown in FIG. 18 can be displayed, where the device search interface may show the prompt that the user is searching for a device, and the device search interface can also be provided with a cancel control. The user can stop searching for a device by clicking "Cancel" icon in FIG. 18, and the cast initiated this time will be invalid. The conditions for a display apparatus that can be used as a cast device are: 1) the display apparatus is in the same local area network as the terminal. 2) the display apparatus supports cast function, 3) the same video call application is also installed in the display apparatus. When these conditions are met, the display apparatuses can be searched by the terminal and served as a candidate in a device list. The device list includes device IDs of all display apparatuses that can be used as cast devices.

Figure 19:
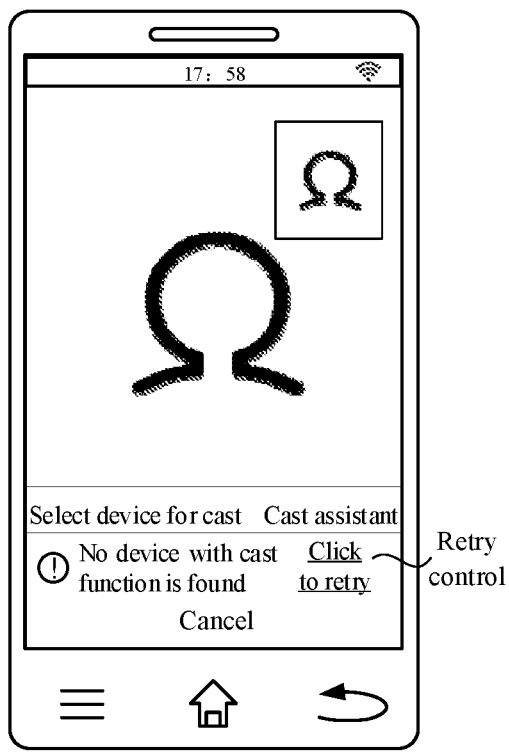
FIG. 19 shows a schematic diagram of a display interface in a scenario where opening of the device list is overtime.

In some embodiments, after the user clicks the cast control, some abnormal situations may occur when the terminal searches for a display apparatus with cast function: 1) No display apparatus with cast function is found within a threshold time (such as 10 seconds), that is, the device list is timeout, and then the interface as shown in FIG. 19 can be displayed to prompt the user that no device with cast function is found. A retry control and a cancel control can be set in the interface of FIG. 19, where the user clicks the retry control to start the device search once again, and the user clicks the cancel control in FIG. 19 to cancel the retry, and the cast initiated this time will be invalid. 2) The number of retries in the above first case exceeds the threshold, and then the terminal determines that there is no display apparatus with cast function in the local area network. In this case, the corresponding interface can be displayed according to the terminal. For example, for a terminal with the ios system. AirPlay can be displayed in the device list, where AirPlay (play in air) is a wireless cast technology suitable for a device working in the ios system, and can transmit the video or screen of the terminal with ios system to a display apparatus that supports AirPlay in the mirror mode: for another example, for a terminal with the Android system, after determining that there is no display apparatus capable of cast in the local area network, the terminal can automatically go back to the video call interface or skip to some preset interfaces, such as "Cast Assistant" interface in which the operation guide for cast of the video call or some FAQ help or other content can be displayed, specifically based on needs.

Figure 20:
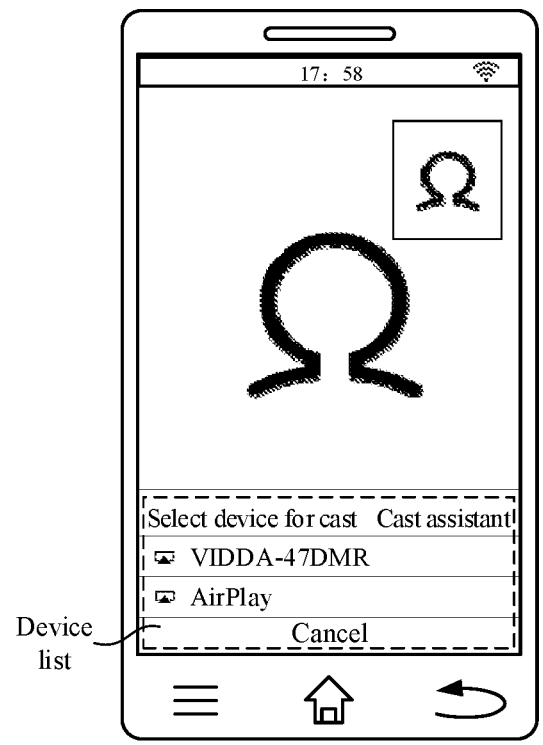
FIG. 20 shows a schematic diagram of an interface of the device list.

Taking WiFi search as an example, a mobile phone that initiates cast and a television as the device for cast need to connect via WiFi. For example. WiFi is MERCURY_6ABC. The mobile phone can search for televisions in the same WiFi network, and list the searched television devices that can establish a cast connection in the interface. When searching for devices, there is no abnormality, that is, when the devices with cast function can be found in the LAN, as shown in FIG. 20, a device list can be shown on the upper layer of the video call interface. The relative display position of the device list can be at the bottom of the video call interface, and the prompt information such as "Select a device for cast" can be shown at the top of the interface of the device list to guide the user's operation. In FIG. 20, two display apparatuses which is able to accept cast are found, and the device IDs are VIDDA-47DMR and AirPlay respectively. The user selects one of them as the device for cast according to needs. For example, the user selects the display apparatus VIDDA-47DMR, and then the display apparatus VIDDA-47DMR becomes the target device for cast. A cancel control can be set at the bottom of the device list. When the user clicks "Cancel", no target device is selected and the cast is cancelled. In some embodiments, the cast assistant control can also be set on the interface of the device list, and the user can click the "cast assistant" to skip to the corresponding interface in which the operation guide for cast of the video call or some FAQ help or other content can be displayed.

Figure 21:
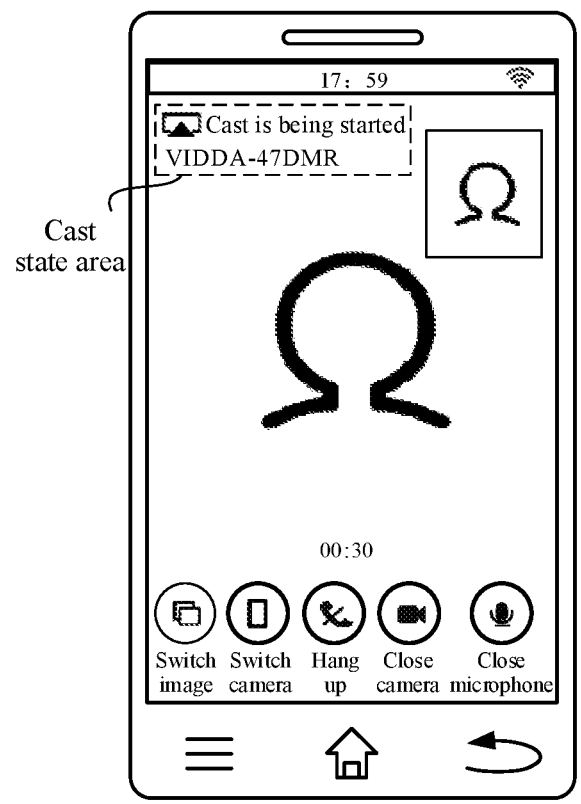
FIG. 21 shows a schematic diagram of a video call interface after the terminal device sends a cast request.

For example, the user selects the apparatus VIDDA-47DMR, the display apparatus VIDDA-47DMR becomes the target device for cast, and the terminal sends a cast request to the display apparatus VIDDA-47DMR, where the cast request carries the call ID, and the device ID and device type of each call user in the virtual room, etc. As shown in FIG. 21, after sending the cast request and before receiving the cast success information sent from the television, the cast state area starts to be displayed on the video call interface, and the cast state area may show the cast control, the device ID of the target device and a control for indicating the cast state information. In the cast state area in FIG. 21, the device ID is shown as VIDDA-47DMR, and a control for indicating that the cast is being started is shown to prompt the user that the current cast state information is "cast is being started", meaning that the cast request has been sent to the target device, and the corresponding video call will be processed after the target device responds to the cast request.

After receiving and responding to the cast request, the display apparatus VIDDA-47DMR parses the cast request to obtain information such as the call ID (i.e., the ID of the virtual room) and the device ID corresponding to each call user in the virtual room, and accesses the corresponding virtual room after determining the ID of the virtual room, to thereby join the virtual room for video call. Since the terminal has already accessed the video call, the target device does not need to display the incoming call interface but directly answers and displays the video call interface by default when taking the target device as cast device. The target device pulls the audio and video streams of each call user from the server according to the device ID of each call user in the virtual room, so that the target device displays the video image of each call user and plays the voice of each call user. Meanwhile, the server sends the audio and video data uploaded by the local user through the mobile phone to each call user, so as to realize the effective video call between the local user and each call user. When making a one-to-one video call, the target device can display the video image of the counterpart call user in full screen: if the number of call users is greater than or equal to 2, the video image of each call party can be displayed according to the preset layout. For example, when there are 6 call users, 6 windows for video chatting can be shown in an array layout of 2 rows and 3 columns, and each video chatting window has a video image of one call user, specifically based on needs.

It should be noted that the local user in the disclosure is a user who uses the local terminal device for cast, and the call user is other call member than the local user in the virtual room.

Figure 22:
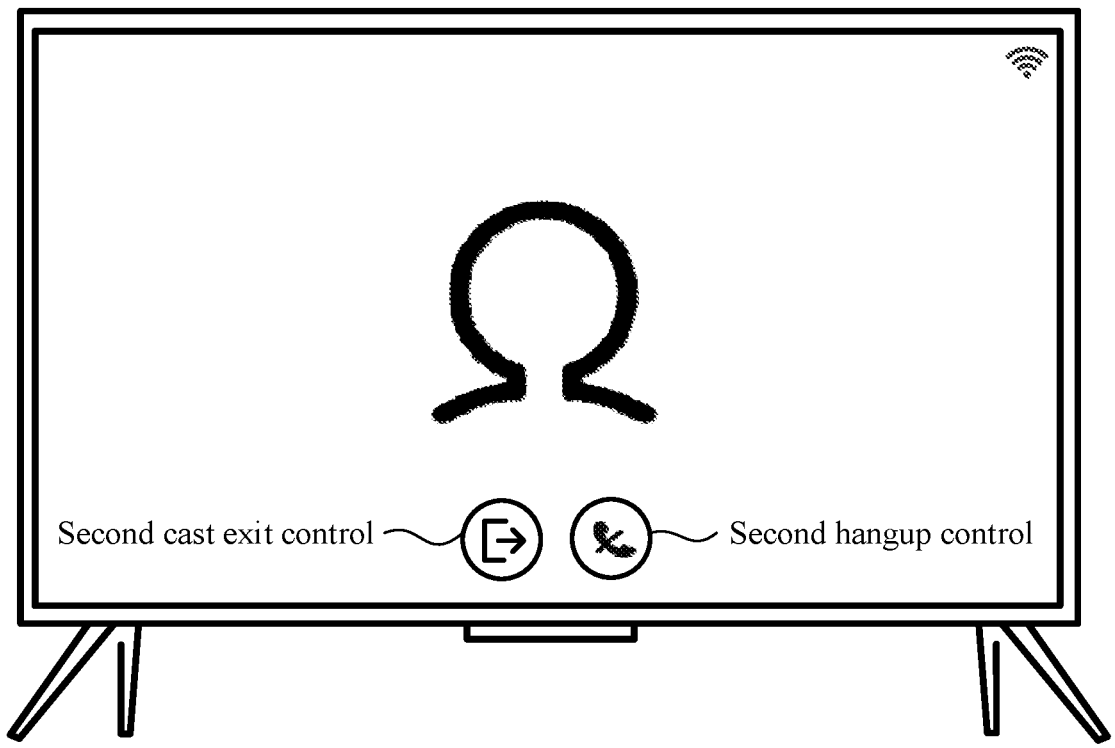
FIG. 22 shows a schematic diagram of a video call interface of the target device after the screen is casted to the display apparatus.

As shown in FIG. 22, after responding to the cast request, the target device only receives the audio and video data of each call user sent from the server, and only the video image of each call user is displayed on the video call interface. When only one call user has the video chat with the local user, the target device can display the video image of the call user in the full screen mode. Since the target device is not equipped with a camera and a microphone but the mobile phone is used as a device for collecting the audio and video data of the local user on the target device side, the states of the camera and microphone are both adjusted on the terminal, and there is no operation control related to the camera and microphone on the video call interface of the target device. In FIG. 22, the second cast exit control and the second hangup control can be set on the video call interface of the target device.

Figure 23:
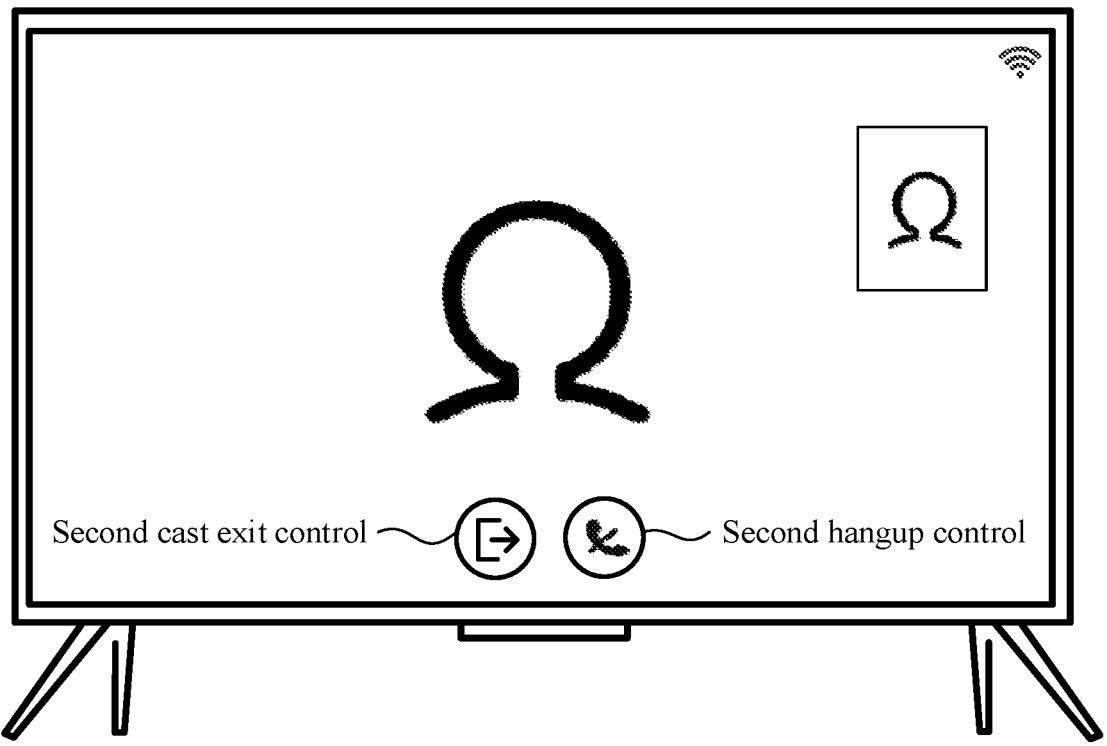
FIG. 23 shows a schematic diagram of another video call interface of the target device after the screen is casted to the display apparatus.

In some embodiments, the display apparatus can also request the server to obtain the audio and video data of the local user uploaded by the terminal device according to the ID of the terminal device, as shown in FIG. 23, so that the video call interface of the target device can not only present the video image of each call user but also present the video image of the local user, and the voice of the local user can be played by the audio player of the target device. In FIG. 23, taking a one-to-one video call as an example, the target device can display the video image of the counterpart call user in the full screen mode, and display the video image of the local user in the small window mode. The target device successfully pulls the audio and video streams of each call user, or successfully pulls the audio and video streams of each call user and the local user. After the corresponding video call interface is presented on the display, that is, it is determined that the cast on the target device side is successful, the target device sends the cast success information to the terminal.

Figure 24:
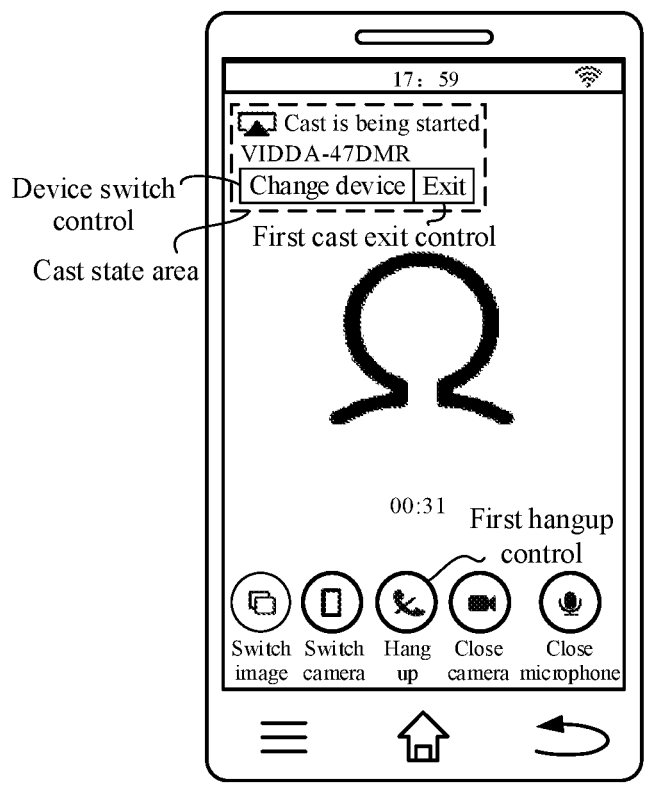
FIG. 24 shows a schematic diagram of a video call interface after the terminal device receives the cast success information.

When the terminal displays the interface of FIG. 21 and after receiving the cast success information sent from the target device, the terminal can switch to the interface shown in FIG. 24 in some embodiments. Meanwhile, a control for indicating that the cast is being performed is shown in the cast state area, so as to update the current cast state information to "Cast is being performed" to inform the user that the video call has been successfully casted from the terminal to the target device. And in this case, a device switch control and a first full-screen exit control can be newly added and displayed in the cast state area.

In some embodiments, after the cast succeeds, the local user can click the device switch control, to indicate that the user wants to cancel the video call cast on the display apparatus VIDDA-47DMR and initiate a cast connection again on other display apparatus. Meanwhile, the device list as shown in FIG. 20 may be used, and the device list is shown in the upper layer of the current video call interface of the terminal, where the relative position may be at the bottom of the current video call interface for the user to select a new device (denoted as the first device in the disclosure). After the selection of the first device is completed, the terminal can send a cast request to the newly switched first device. Then the terminal and the first device can implement the cast of the video call from the terminal to the first device for playback according to the built-in cast process, and the UI changes are adaptively shown. For details, reference may be made to the cast process for the target device, which will not be repeated here. When switching the cast device, the original target device for cast is replaced by the first device, so the target device needs to cancel the cast. In a specific implementation, the mobile phone can send the first indication information to the target device, and the target device receives and responds to the first indication information, and then may control the second application to stop receiving the audio and video data of each call user from the server, that is, stop pulling the audio and video streams of each call user, and exit the current video call. Then the target device will no longer display the video call interface, and the cast connection is canceled.

In some embodiments, after the cast succeeds, the local user can click the first cast exit control, that is, cancel the cast of the video call to the target device at the terminal side. Meanwhile, the second indication information is sent to the target device: the target device receives and responds to the second indication information, and then needs to control the second application to stop obtaining the audio and video data of each call user from the server, that is, stop pulling the audio and video streams of each call user, and exit the current video call. Then the target device will no longer display the video call interface, and sends the first cast screen exit information to the terminal when the cast connection is successfully canceled; and the terminal receives and responds to the first cast exit information, controls the first application to start receiving the audio and video data of each call user from the server, and then displays the video images of the local user and each call user and plays the audio data of each call user according to the received audio and video data, so that the terminal returns to the video call state before the cast shown in FIG. 17, and the local user can continue the video call on the terminal.

In some embodiments, after the cast succeeds, the user can also click the first hangup control, that is, hang up the current video call at the terminal side. Since the terminal has stopped receiving the audio and video data of each call user from the server before, it is only necessary to control the first application to exit the current video call directly. Meanwhile, the display apparatus also needs to hang up the current video call synchronously. In a specific implementation, the terminal sends third indication information to the target device; and the target device receives and responds to the third indication information, controls the second application to stop receiving the audio and video data of each call user from the server, and exit the current video call synchronously with the terminal, so that one end hangs up and the other end hangs up synchronously.

In some embodiments, after the cast succeeds, the local user can click the second cast exit control through a control device such as a remote control, that is, cancel the cast of the video call from the target device side, control the second application to stop receiving the audio and video data of each call user from the server, that is, stop pulling the audio and video streams of each call user, and exit the current video call. Then the target device will no longer display the video call interface, and sends second cast screen exit information to the terminal when the cast connection is successfully canceled; and the terminal receives and responds to the second cast exit information, controls the first application to start receiving the audio and video data of each call user from the server, and then displays the video images of the local user and each call user and plays the audio data of each call user according to the received audio and video data, so that the terminal returns to the video call state before the cast shown in FIG. 17, and the local user can continue the video call on the terminal.

In some embodiments, after the cast succeeds, the local user can also click the second hangup control on the target device, that is, hang up the current video call at the target device side, and then the target device controls the second application to stop receiving the audio and video data of each call user from the server, and hangs up the current video call. The terminal also needs to hang up the video call synchronously, so the target device may send the hangup information to the terminal; and the terminal receives and responds to the hangup information, and controls the first application to exit the current video call, so that one end hangs up and the other end hangs up synchronously. When the local user clicks the device switch control, the first cast exit control or the first hangup control on the terminal or clicks the second cast exit control or the second hangup control on the target device, the target device will close the video call interface and restore to the playing interface before cast.

Figure 25:
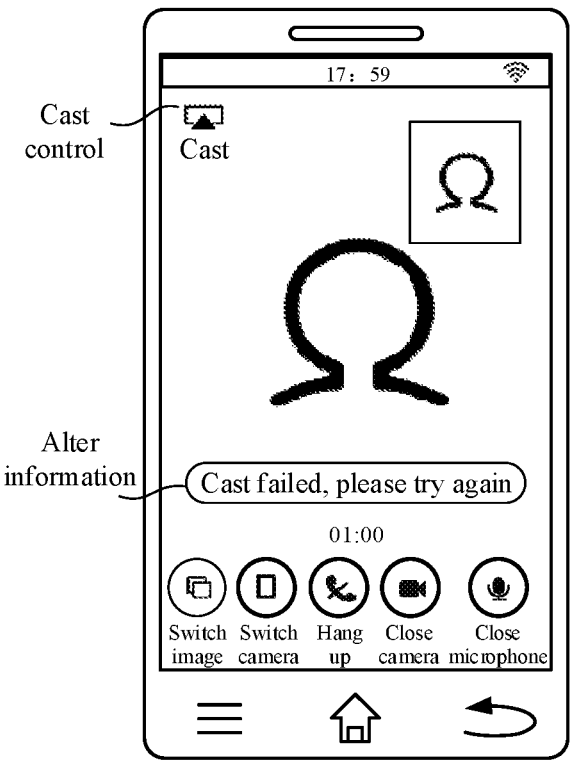
FIG. 25 shows a schematic diagram of an interface displayed on the terminal device when the cast fails.

In some embodiments, after the terminal sends a cast request to the target device, there may be some abnormal conditions on the target device that cause the cast to fail. For example, the network in the target device is disconnected, so that the target device cannot receive the cast request. For another example, the network is disconnected after the target device receives the cast request, so that the target device cannot receive the audio and video data of each call user from the server, resulting in a failure to pull streams, and the display apparatus cannot start the cast video call. For another example, the network of the target device is in the connected state, but the cast is impossible due to other factors of the device, etc. If the terminal does not receive the cast success message sent from the target device within a preset time or the terminal receives the cast failure message sent from the target device, as shown in FIG. 25, the terminal returns to the video call state before clicking the cast control, and displays the prompt information on the video call interface. The prompt information is, for example, "cast failed, please try again". After learning the prompt information, the user can click the cast control again, and then repeat the above cast screen process, until the terminal receives the cast success information from the target device. Then the cast succeeds, the terminal controls the first application to stop receiving the audio and video data of each call user from the virtual room of the server, and the terminal only displays the video image of the local user and can display the video image of the local user separately in the full screen mode.

Figure 26:
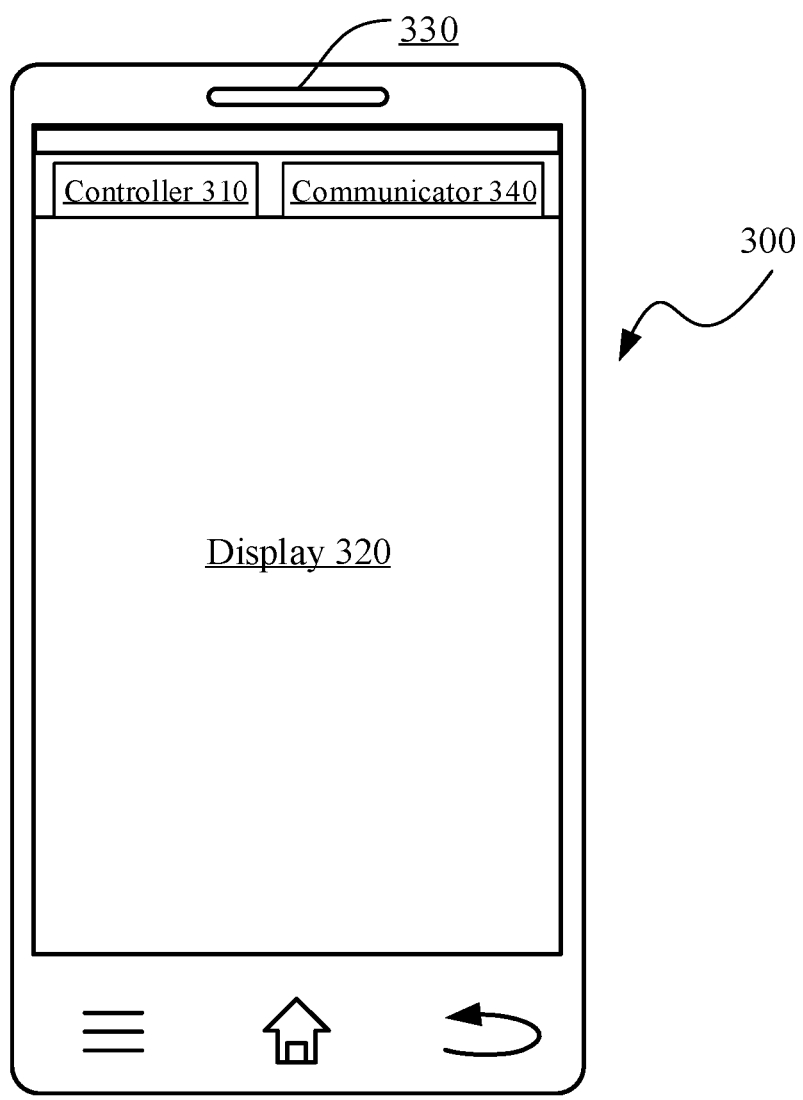
FIG. 26 shows a schematic structural diagram of a terminal device.

In some embodiments, a terminal device according to the disclosure below: as shown in FIG. 26, includes a controller 310, a display 320, an audio player 330, and a communicator 340, where the controller 310 is connected with the display 320, the audio player 330 and the communicator 340) respectively. In FIG. 26, the terminal device is a smart phone as an example, and the components in the figure are only for illustration and do not limit the actual installation positions and structures in the terminal device. Here, the display 320 is used to present a video call interface: the audio player 330 is used to play the voice of each call user, such as a speaker: the communicator 340 is used to establish communication between the terminal device with the display apparatus 200 and the server 400, and the communicator may include a WiFi module, a bluetooth module, etc. For a terminal device that support touch screen, the user can operate the screen through manual touch or stylus, to make the terminal device sense, receive and respond to user input operations: for a terminal device that do not support touch screen, the user can performs an input operation through an input device such as a keyboard, a mouse, etc.

Figure 27:
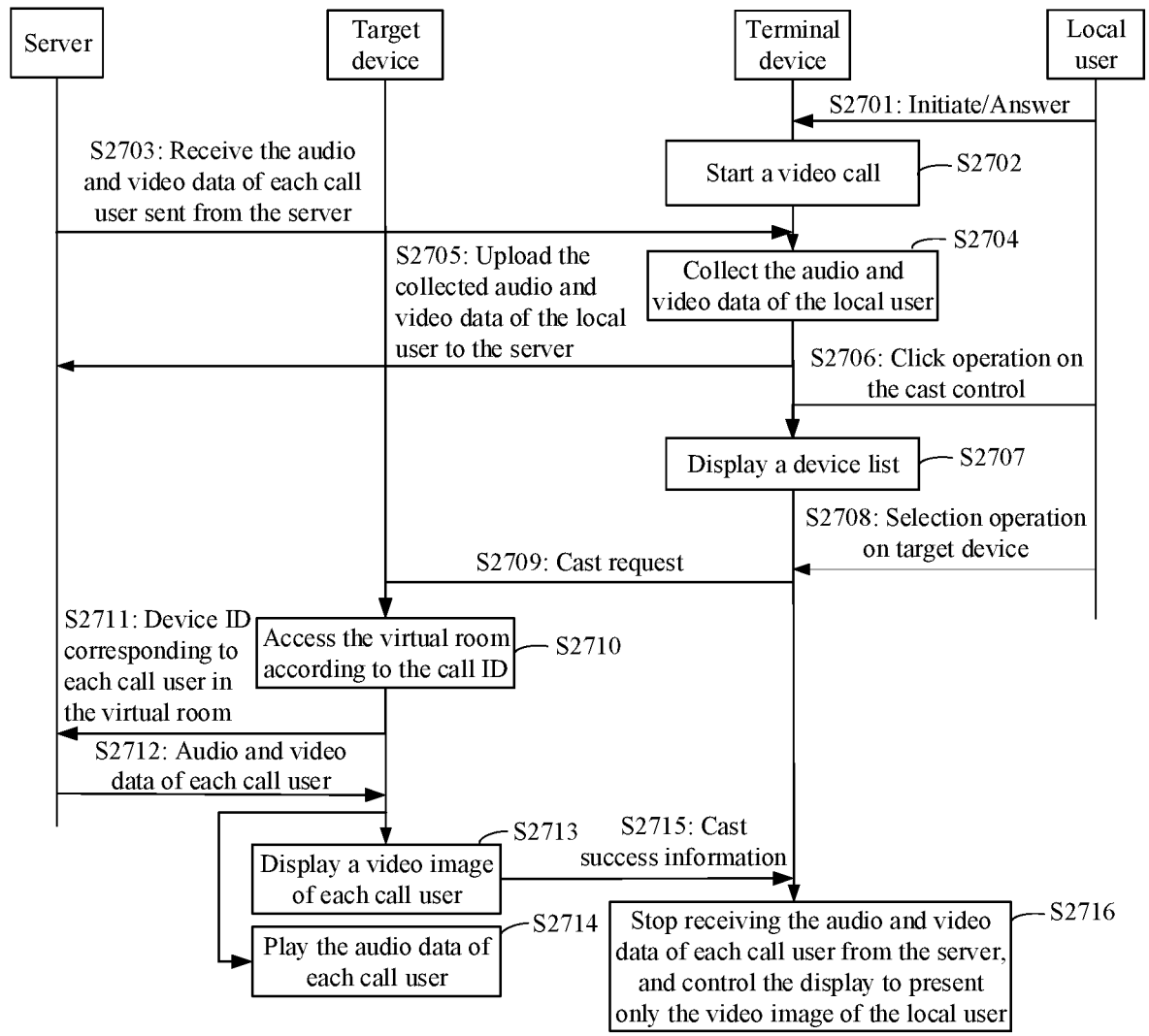
FIG. 27 shows a first interaction flowchart of cast of a video call.

As shown in FIG. 27, the local user initiates or answers a video call to/from the terminal device (S2701). The controller 310 of the terminal device is configured to: start a video call (S2702): receive the audio and video data of each call user sent from the server (S2703): collect the audio and video data of the local user (S2704): upload the collected audio and video data of the local user to the server (S2705): in response to a click operation on the cast control from a local user (S2706), control the display 320 to present a device list (S2707): in response to a selection operation on a target device in the device list from the local user (S2708), send a cast request to the target device (S2709), where the cast request carries a call ID and a device ID corresponding to each call user in the virtual room. The target device accesses the virtual room according to the call ID in the cast request (S2710), and sends the device ID corresponding to each call user in the virtual room to the server (S2711). The server sends the audio and video data of each call user to the target device according to the device ID (S2712). The target device displays a video image of each call user (S2713), plays the audio data of each call user (S2714), and sends the cast success information to the controller 310 (S2715). In response to the cast success information sent from the target device, the controller 310 stops receiving the audio and video data of each call user from the server, and controls the display 320 to present only the video image of the local user (S2716), where the cast success information is sent from the target device after accessing the virtual room according to the call ID, receiving the audio and video data of each call user from the server according to the device ID and displaying the video image of each call user in response to the cast request.

In the disclosure, the two-way communication between the terminal device and the target device for cast can be carried out through the LAN Socket, and the cast request, cast success/failure information, and related information when hanging up and exiting the cast can be transmitted in this way. The cast request can be in the form of JSON (JavaScript Object Notation), and carry the call ID of the terminal's current video call, and the device ID and device type corresponding to each call user in the virtual room, etc., where the device type is used to identify whether the device used by each call user is a mobile phone or a television. It should be noted that the terminal device, after receiving the cast success information sent from the target device, controls the first application to stop pulling the audio and video streams of each call user in the virtual room, but still collects and uploads the audio and video data of the local user to the server in real time, so that each call user can pull the audio and video streams of the local user from the server.

Figure 28:
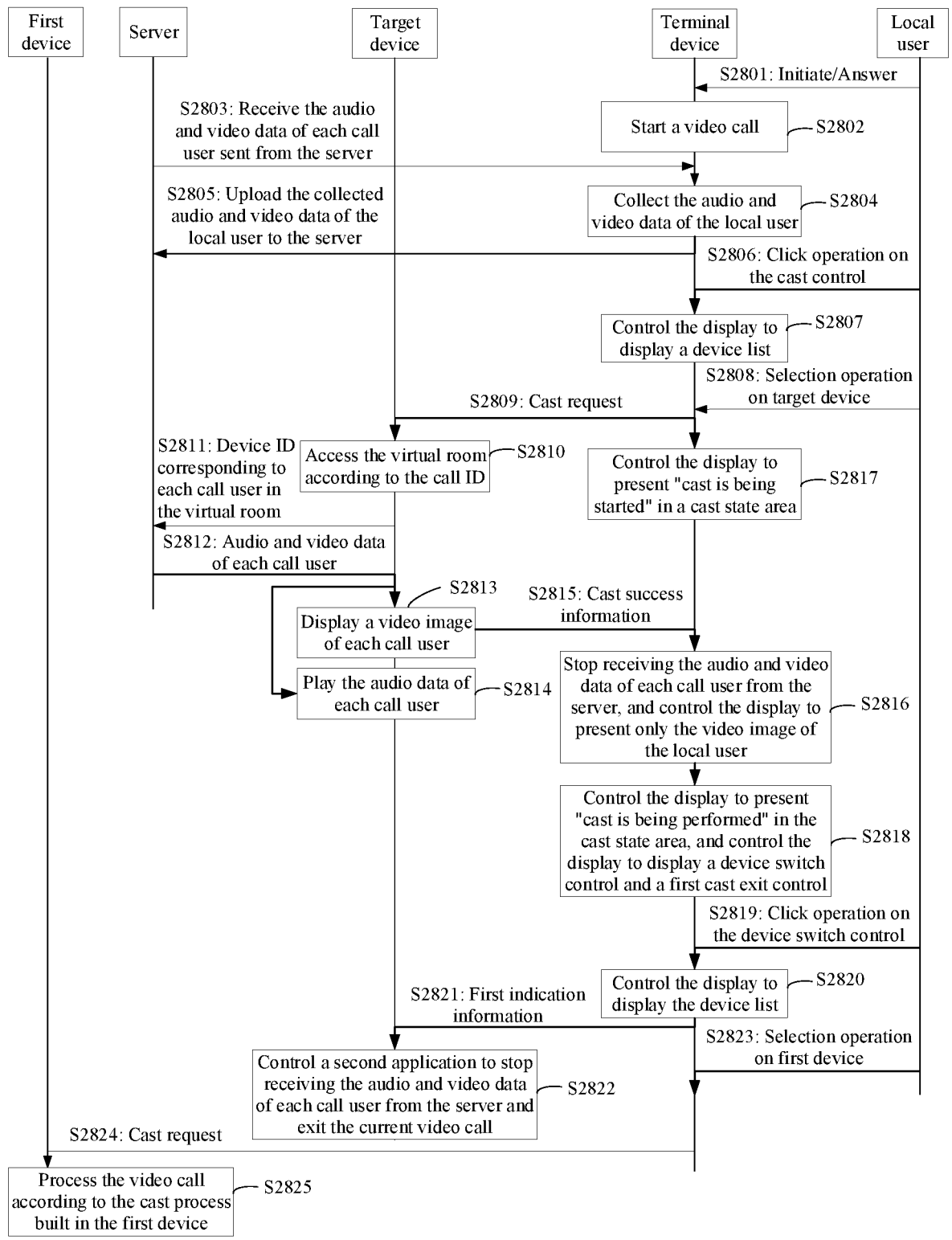
FIG. 28 shows a second interaction flowchart of cast of a video call.

Referring to the relevant description above and FIGS. 21 and 24, in some embodiments, as shown in FIG. 28, the controller 310 is further configured to: control the display 320 to present a control for indicating "cast is being started" in a cast state area (S2817), after sending the cast request and before receiving the cast success information; and control the display 320 to present a control for indicating "cast is being performed" in the cast state area, and control the display 320 to present a device switch control and a first cast exit control (S2818), after receiving the cast success information. After the cast succeeds, the cast state information in the cast state area is changed from "cast is being started" to "cast is being performed", and two new operation controls are added in the cast state area, which are a device switch control and a first cast exit control, respectively. Moreover, for S2801-S2816 in FIG. 28, reference may be made to S2701-S2716 in FIG. 27, which will not be repeated here.

In some embodiments, referring to FIG. 28, the controller 310 is further configured to: in response to a click operation on the device switch control, control the display 320 to present the device list (S2819: S2820), and send first indication information to the target device (S2821), where the first indication information is used to indicate the target device to control a second application to stop receiving the audio and video data of each call user from the server and exit the current video call (S2822); and in response to a selection operation on a first device in the device list, send a cast request to the first device (S2823: S2824), where the device list includes device IDs of display apparatuses that can be used as cast devices. After receiving and responding to the cast request, the first device processes the video call according to the cast process built in the first device (S2825). The cast process of the first device and the target device are the same.

Figure 29:
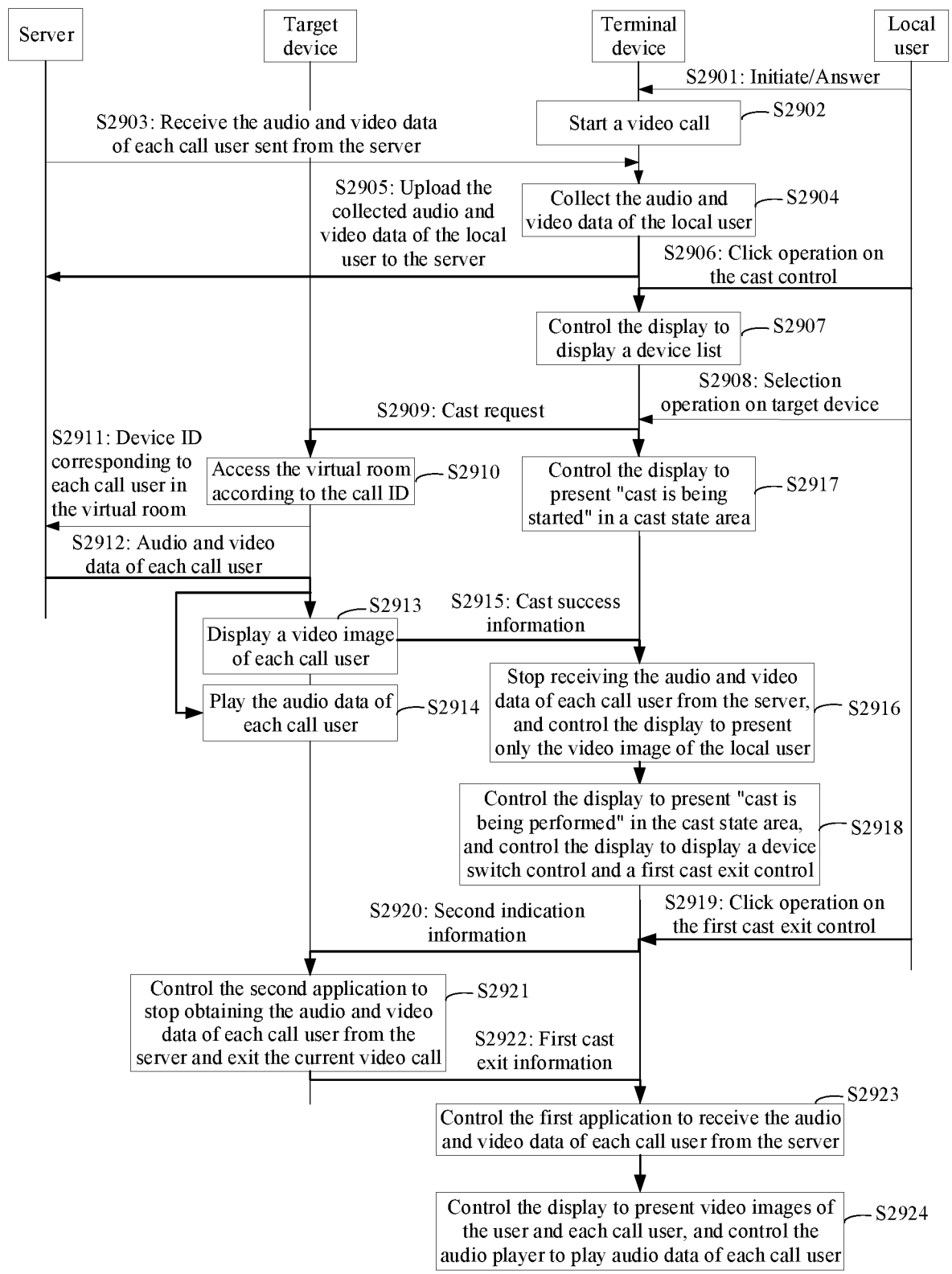
FIG. 29 shows a third interaction flowchart of cast of a video call.

In some embodiments, as shown in FIG. 29, the controller 310 is further configured to: in response to a click operation on the first cast exit control, send the second indication information to the target device (S2919: S2920), where the second indication information is used to indicate the target device to control the second application to stop obtaining the audio and video data of each call user from the server, exit the current video call and send the first cast exit information to the terminal device (S2921: S2922); and in response to the first cast exit information, control the first application to receive the audio and video data of each call user from the server (S2923), control the display 320 to present video images of the user and each call user, and control the audio player 330 to play audio data of each call user (S2924). Moreover, for S2901-S2918 in FIG. 29, reference may be made to S2801-S2818 in FIG. 28, which will not be repeated here.

Figure 30:
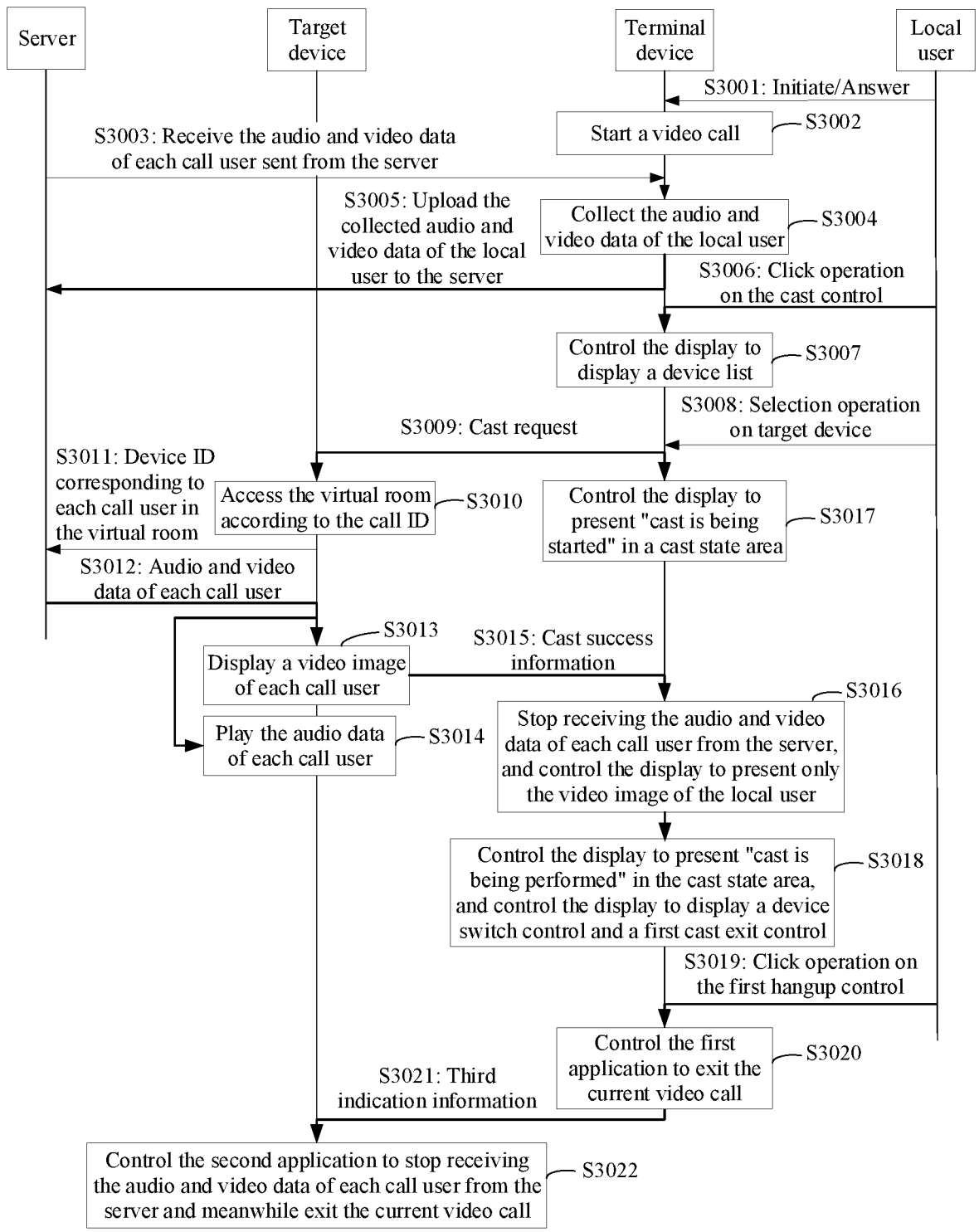
FIG. 30 shows a fourth interaction flowchart of cast of a video call.

In some embodiments, as shown in FIG. 30, the controller 310 is further configured to: in response to a click operation on the first hangup control, control the first application to exit the current video call (S3019: S3020), and send the third indication information to the target device (S3021), where the third indication information is used to indicate the target device to control the second application to stop receiving the audio and video data of each call user from the server and meanwhile exit the current video call (S3022). When the current video call is hung up at the terminal device side, the target device hang up and exit the video call synchronously through the third indication information. Moreover, for S3001-S3018 in FIG. 30, reference may be made to S2801-S2818 in FIG. 28, which will not be repeated here.

Figure 31:
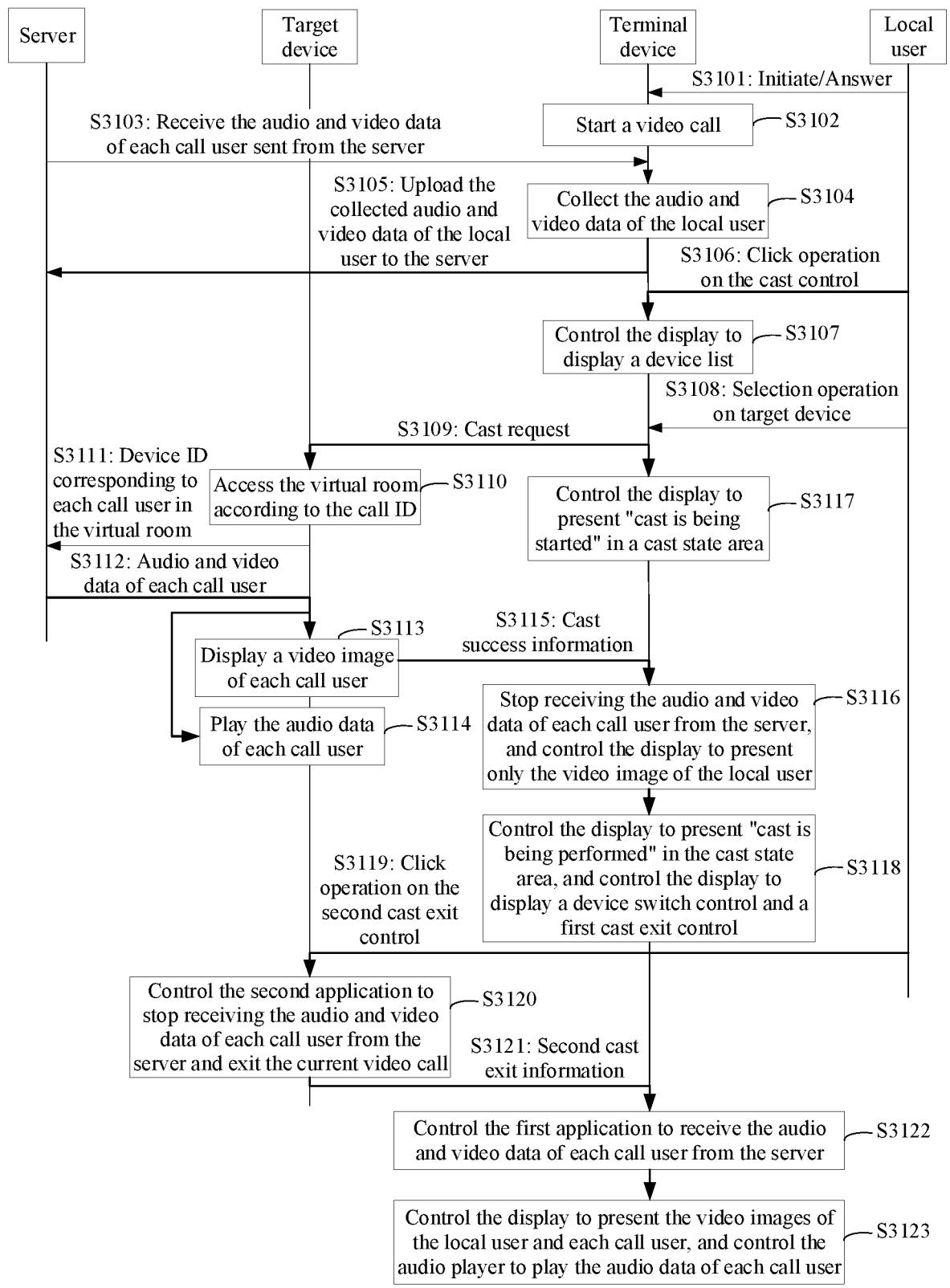
FIG. 31 shows a fifth interaction flowchart of cast of a video call.

In some embodiments, as shown in FIG. 31, the controller 310 is further configured to: in response to the second cast exit information sent from the target device (S3121), control the first application to receive the audio and video data of each call user from the server (S3122), control the display 320 to present the video images of the local user and each call user, and control the audio player 330 to play the audio data of each call user (S3123): where the second cast exit information is sent from the target device after controlling the second application to stop receiving the audio and video data of each call user from the server and exit the current video call in response to a click operation on the second cast exit control (S3119: S3120). Moreover, for S3101-S3118 in FIG. 31, reference may be made to S2801-S2818 in FIG. 28, which will not be repeated here.

Figure 32:
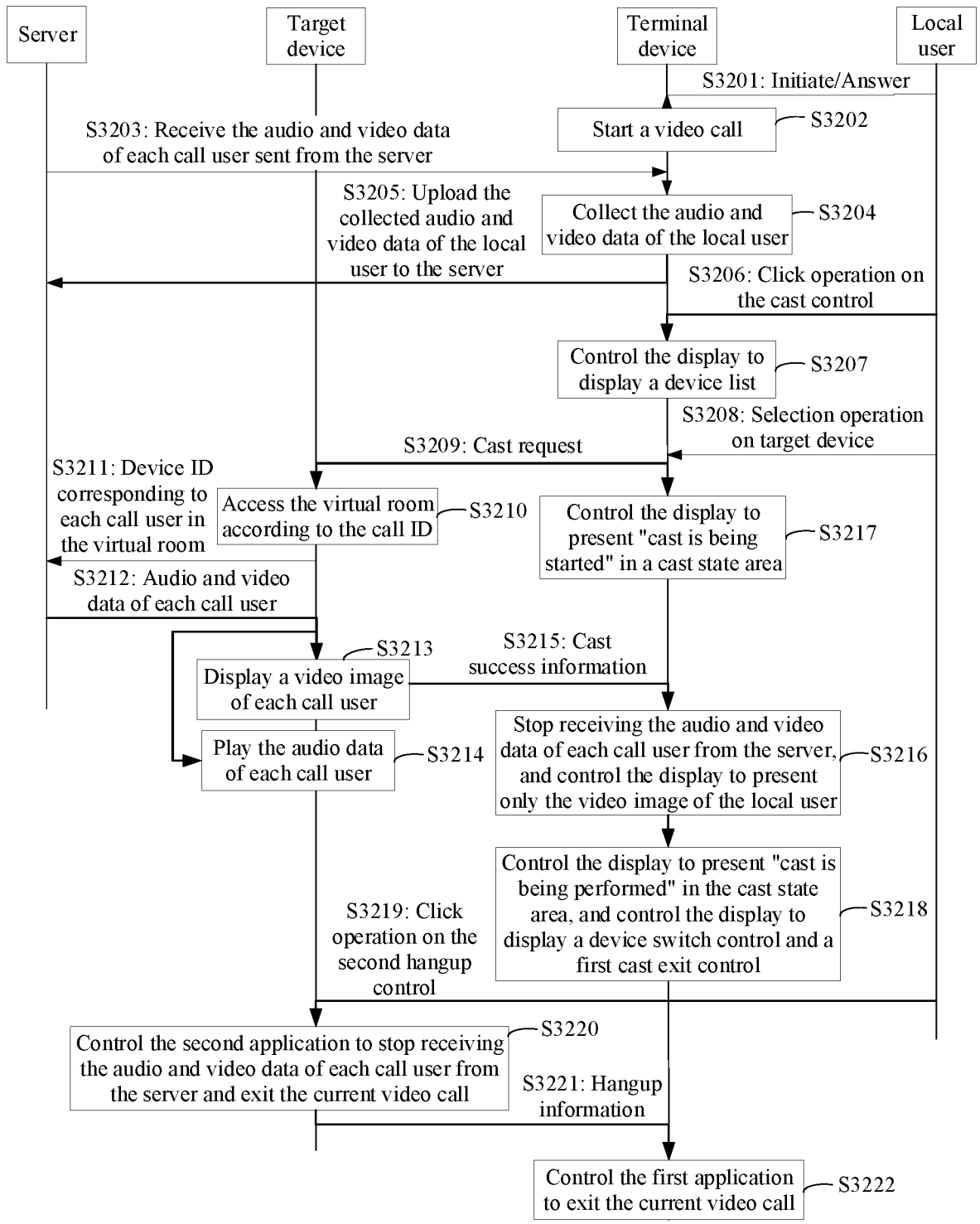
FIG. 32 shows a sixth interaction flowchart of cast of a video call.

In some embodiments, as shown in FIG. 32, the controller 310 is further configured to: in response to the hangup information sent from the target device (S3221), control the first application to exit the current video call (S3222): where the hangup information is sent from the target device after controlling the second application to stop receiving the audio and video data of each call user from the server and exit the current video call in response to a click operation on the second hangup control (S3219: S3220). Moreover, for S3201-S3218 in FIG. 32, reference may be made to S2801-S2818 in FIG. 28, which will not be repeated here.

Figure 33:
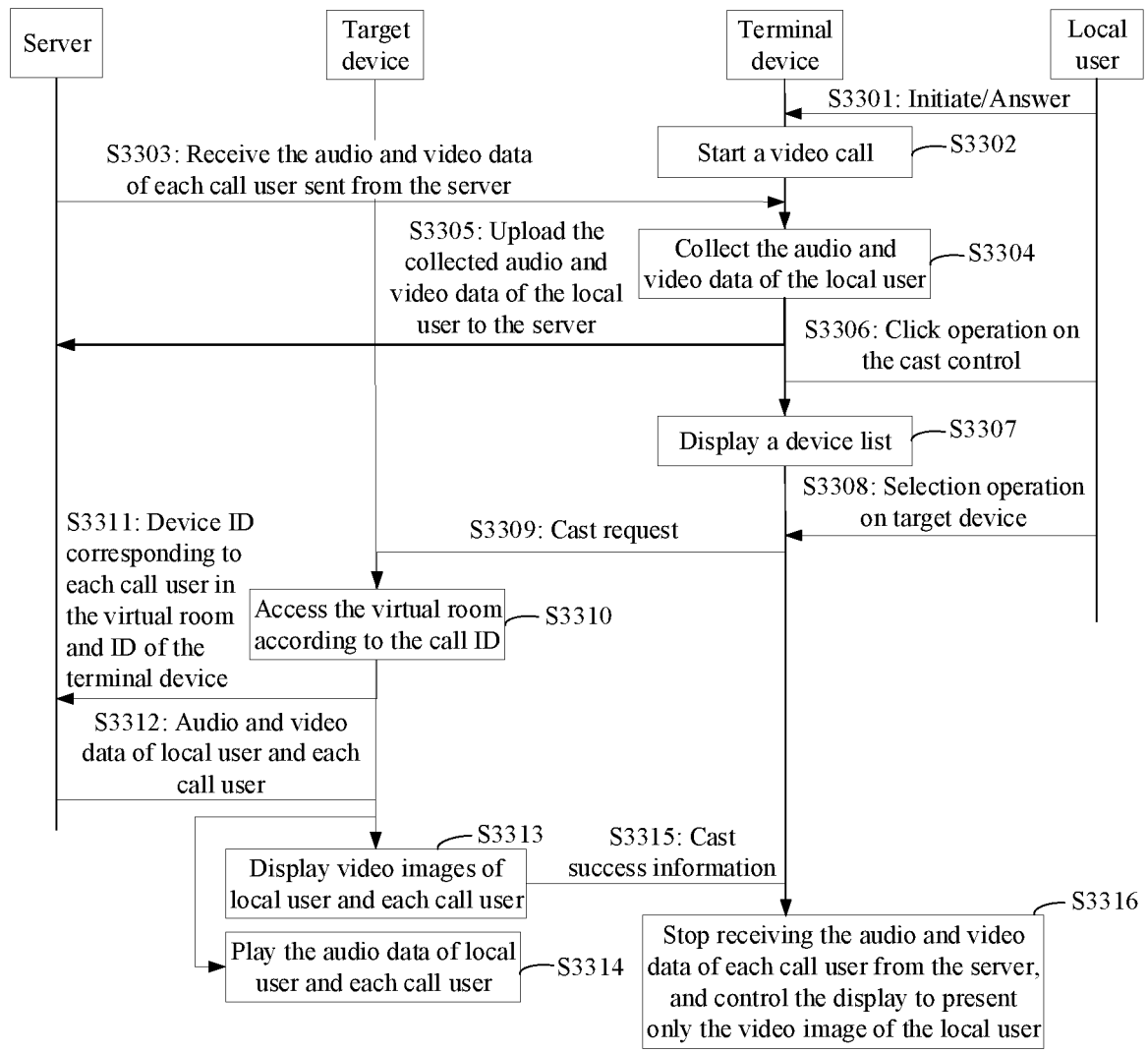
FIG. 33 shows a seventh interaction flowchart of cast of a video call.

In some embodiments, as shown in FIG. 33, the cast request also carries an ID of the terminal device (S3311), where the ID of the terminal device is used to cause the target device to further receive the audio and video data of the local user from the server according to the ID of the terminal device (S3312) in response to the cast request, to simultaneously present the video images of each call user and the local user (S3313) and play the audio data of each call user and the local user (S3314). Moreover, for S3315 and S3316 in FIG. 33, reference may be made to S2715 and S2716 in FIG. 27; and for S3301-S3310 in FIG. 33, reference may be made to S2701-S2710 in FIG. 27, which will not be repeated here.

When the target device joins the virtual room of the video call, the target device can send the device ID corresponding to each call user in the virtual room and the ID of the terminal device to the server at the same time, and then the server sends the audio and video data of the local user uploaded by the terminal device to the target device and sends the audio and video data of each call user to the target device, so that the target device can simultaneously display the video images of the local user and each call user and hear the audio of the local user and each call user. It should be noted that, in the embodiments, if the target device exits the cast or hangs up the video call, or the terminal device switches the cast device, exits the cast or hangs up the video call, then the target device not only stops receiving the audio and video data of each call user from the server, but also stops receiving the audio and video data of the local user from the server, so as to ensure that the pull stream of each-channel video call is completely stopped.

In some embodiments, the display apparatus should at least include a display 275, an audio player, a communicator 220, a user input interface 265, and a controller 250) that is connected with the display 275, the audio player, the communicator 220 and the user input interface 265, respectively, where the audio player may be a speaker 286 or an external audio device, etc., and the user input interface 265 is used to receive a user input operation and forward it to the controller 250 for response.

Corresponding to the cast process of the video call executed on the terminal device, the controller 250 is configured to: receive a cast request sent from the terminal device, where the cast request is sent from the terminal device after uploading the collected audio and video data of the local user to the server after the video call is started, displaying the device list in response to an operation on the cast control, and receiving the selection operation on the target device in the device list, and the cast request carries a call ID and a device ID corresponding to each call user in the virtual room: access the virtual room according to the call ID: receive the audio and video data of each call user from the server according to the device ID, control the display 275 to present the video image of each call user, and control the audio player to play the audio data of each call user; and send the cast success information to the terminal device, where the cast success information is used to instruct the terminal device to stop receiving the audio and video data of each call user from the server and only display the video image of the local user.

In some embodiments, the display apparatus has determined the ID of the local terminal device in the local area network according to the communication with the terminal device, so the ID of the local terminal device can be excluded from the accepted device IDs. The ID of the counterpart device is determined, and the stream is pulled according to the ID of the counterpart device after accessing the virtual room.

In some embodiments, the display apparatus pulls only the audio and video data of the counterpart device, and does not pull the audio and video data uploaded by the local terminal device from the server.

In some embodiments, after the cast succeeds, the local terminal device uploads the collected audio and video data, and no longer pulls the audio and video data of the counterpart device from the server, nor sends the locally collected audio and video data to the display apparatus.

In some embodiments, the controller 250 is further configured to: in response to the first indication information sent from the terminal device, control the second application to stop receiving the audio and video data of each call user from the server, and exit the current video call: where the first indication information is sent from the terminal device in response to an operation on the device switch control.

In some embodiments, the controller 250 is further configured to: in response to the second indication information sent from the terminal device, control the second application to stop obtaining the audio and video data of each call user from the server, and exit the current video call, where the second indication information is sent from the terminal device in response to an operation on the first cast exit control; and send the first cast exit information to the terminal device, where the first cast exit information is used to indicate the terminal device to control the first application to receive the audio and video data of each call user from the server, display the video images of the local user and each call user, and play the audio data of each call user.

In some embodiments, the controller 250 is further configured to: in response to an operation on the second cast exit control, control the second application to stop receiving the audio and video data of each call user from the server, and exit the current video call; and send the second cast exit information to the terminal device, where the second cast exit information is used to indicate the terminal device to control the first application to receive the audio and video data of each call user from the server, display the video images of the local user and each call user, and play the audio data of each call user.

In some embodiments, the controller 250 is further configured to: in response to third indication information sent from the terminal device, control the second application to stop receiving the audio and video data of each call user from the server, and exit the current video call synchronously: where the third indication information is sent from the terminal device when controlling the first application to exit the current video call in response to an operation on the first hangup control.

In some embodiments, the controller 250 is further configured to: in response to an operation on the second hangup control, control the second application to stop receiving the audio and video data of each call user from the server, and exit the current video call; and send the hangup information to the terminal device, where the hangup information is used to instruct the terminal device to control the first application to exit the current video call.

In some embodiments, after responding to the cast request, the audio and video data of the local user is further received from the server according to the ID of the terminal device: the display 275 is controlled to simultaneously display the audio and video data of each call user and the local user, and the audio player is controlled to play the audio data of each call user and the local user.

In some embodiments, a cast method for a video call is provided, which is performed by a terminal device. This method includes the following steps.

Step A: uploading the collected audio and video data of the local user to the server after the video call is started.

Step B: displaying a device list in response to an operation on the cast control.

Step C: sending a cast request to a target device in response to a selection operation on the target device in the device list: where the cast request carries a call ID and a device ID corresponding to each call user in the virtual room.

Step D: in response to the cast success information sent from the display apparatus, stopping receiving the audio and video data of each call user from the server, and only displaying the video image of the local user: where the cast success information is sent from the target device after accessing the virtual room according to the call ID, receiving the audio and video data of each call user from the server according to the device ID and displaying the video image of each call user in response to the cast request.

The method may also include other steps executed or configured by the controller 250 in the embodiments of the terminal device described above, which will not be repeated here.

In some embodiments, another cast method for a video call is provided and it is applied to a display apparatus (for example, the target device selected as the cast object) which is able to accept a video call cast from a terminal device. This method includes the following steps.

Step E: receiving a cast request sent from the terminal device, where the cast request is sent from the terminal device after uploading the collected audio and video data of the local user to the server after the video call is started, displaying the device list in response to an operation on the cast control, and receiving the selection operation on the target device in the device list; and the cast request carries a call ID and a device ID corresponding to each call user in the virtual room.

Step F: accessing the virtual room according to the call ID, receiving the audio and video data of each call user from the server according to the device ID, displaying the video image of each call user, and playing the audio data of each call user.

Step G: sending the cast success information to the terminal device, where the cast success information is used to indicate the terminal device to stop receiving the audio and video data of each call user from the server and only display the video image of the local user.

The method may also include other steps executed or configured by the controller 250 in the embodiments of the terminal device described above, which will not be repeated here.

In the disclosure, the terminal is used as the audio and video collection device for the display apparatus, and the video call started by the terminal is casted to the application of the display apparatus to play. Even if the display apparatus is not equipped with a camera and a microphone, the application of the display apparatus can also realize the effective video call between the local user and the called user, improving the experience of the user's video call. The disclosure only requires the display apparatus to support the cast function, without changing the configuration of the display apparatus. The display apparatus is no longer limited by its own configuration when making a video call, and the scope of application is wider.

In the disclosure, the server 400 mainly involves establishing a virtual room when initiating a video call, and receiving and forwarding the audio and video data of each call member in the virtual room. The functional configuration of the server side during the video call is not limited to that described in the embodiments of the disclosure. On the basis of the foregoing embodiments, those skilled in the art can adaptively adjust the process and the settings of the UI and related operation controls, so as to adapt to other application scenarios/use requirements. In the disclosure, the drawings of the UI of the terminal device are drawn with the smartphone as an example. The UIs of other types of terminal devices are basically similar to the interface display of the smartphone. The drawings of the UI in the disclosure are only exemplary, and specifically depend on practical needs.

Currently, a user can make a multi-party video call with other users while performing entertainment activities (such as watching a video or playing a game) through a display apparatus. In this case, the corresponding entertainment content will be displayed on the display interface of the display apparatus, and a plurality of video call windows may be displayed on the upper layer of the displayed entertainment content and near an edge of the display interface, where each video call window presents the video data of one user. In this way, the user can talk with others during the entertainment activity. However, due to the limitation of the screen size of the display apparatus, the number of video call windows that can be presented on the edge of the display interface is limited. In this case, if the number of users participating in the call is relatively large, the video data of the users cannot be completely displayed.

Figure 34:
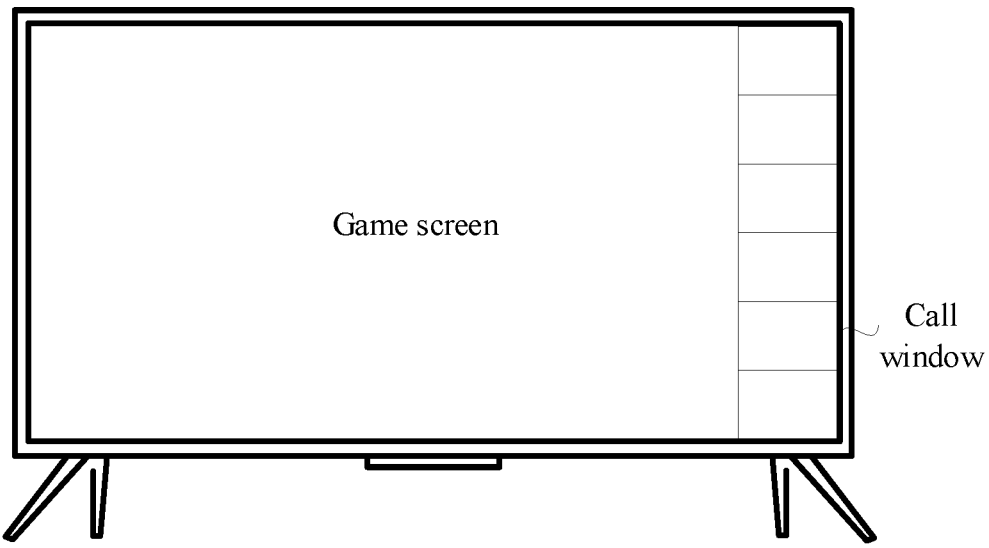
FIG. 34 is a schematic diagram of a display interface of a display apparatus according to an embodiment.

Exemplarily, as shown in FIG. 34, a game screen is presented on the display interface of the display apparatus, and the user performs the corresponding game operations through the control device. Meanwhile, the user can also make a multi-party video call with other users, but the focus of the display interface is on the game screen.

In some embodiments, the user can make a video call through the display apparatus. After the video call is established, it is necessary to display the image data of each video through the call window on the call interface. In some embodiments, in the design of the call interface, the number (for example, 4, 6, 9, etc.) of call windows presented on the call interface is set in order to ensure the visual effect. However, the number of call channels supported by the call application may be greater than the set number of call windows. For example, the call application supports 12-channel calls. When the number of persons actually participating in the call is less than the preset number of call windows, the call of each channel can be displayed on the call window of the call interface. When the number of persons actually participating in the call is greater than the preset number of call windows, the video data of only some channels can be displayed on the call interface, and the video data of some channels will not be displayed on the call interface.

In some embodiments, as shown in FIG. 34, due to the limitation of the screen size of the display apparatus, at most 6 call windows can be displayed on the right edge of the display interface where the game screen is displayed. If the number of call windows increases, the size of the call windows will be reduced accordingly, and the user will not be able to see the content shown in the windows. Assuming that there are 8 users (including the user of the display apparatus) in the call, then the video data of only 6 out of the 8 user can be displayed in 6 call windows of the current interface, while the video data of the remaining 2 users cannot be displayed. The video data display method according to the embodiments of the disclosure is used in this scenario to ensure that the video data of the user who currently speaks can be displayed.

In some embodiments, when the number of channels participating in the video call is less than 6, all users can be displayed through the call windows, so there is no need to adjust the order of the windows for video chatting according to the audio.

Next, the video data display method according to the embodiments of the disclosure will be discussed in detail.

Figure 35:
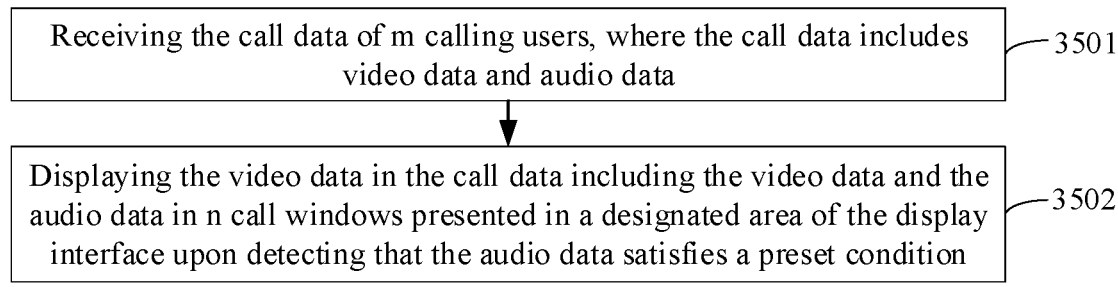
FIG. 35 is a flowchart of a method for displaying video data according to an embodiment.

FIG. 35 is a flowchart of a video data display method according to an embodiment of the disclosure. This method can be applied to the display apparatus described above, and of course, can also be applied to other display apparatuses such as smartphone, tablet computer, etc. Referring to FIG. 35, the method includes the following steps.

In response to a call request initiated from a calling terminal, the server sends a call invitation to a called terminal according to a counterpart ID in the call request. After receiving the call invitation, the called terminal establishes a call connection, and the server establishes a virtual room. Both the calling terminal and the called terminal can communicate with the virtual room to pull the audio and video data of the counterpart end. In this case, the virtual room sends the audio and video data sent from other devices than this device to this device according to the unique identifier carried in the pull request.

After the video call is established, each terminal device can invite a new device to join the call according to the authorization/system settings, or a certain terminal device can send a call exit command to the server, and the server deletes the unique identifier corresponding to this terminal from the virtual room, to no longer receive the upload from this terminal and meanwhile notify other terminal devices that this device have been offline.

For a device that has joined the video call, the process also includes the following steps.

Step 3501: receiving the call data of m calling users, where the call data includes video data and audio data, m is an integer number greater than or equal to 3.

In the embodiments of the disclosure, the user can make a multi-party video call with multiple users while playing on the display apparatus, where m users participating in the call, including the user of the display apparatus, are the m call users, where m is greater than or equal to 3.

It should be noted that the display apparatus is connected with an image collection device and an audio collection device, or the display apparatus itself is configured with an image collection device and an audio collection device, where the image collection device is a device capable of collecting user images, such as a camera. The audio collection device is a device capable of collecting user's sound, such as a microphone.

For the user who uses the display apparatus to make a call, the display apparatus collects the call data of this call user through the image collection device and the audio collection device. For other call users who make the call with this call user, the display apparatus receives the call data collected by their corresponding display apparatuses, where the call data of each call user includes video data and audio data.

Step 3502: displaying the video data in the call data including the video data and the audio data in n call windows presented in a designated area of the display interface upon detecting that the audio data satisfies a preset condition, where n is less than m.

In some embodiments of the disclosure, the display interface of the display apparatus displays entertainment content, for example, a game screen or a picture of a video application that the user is watching.

In some embodiments, when the display apparatus establishes a call connection with the display apparatuses of multiple other call users and receives the call data of the multiple call users for the first time, the display apparatus draws n call windows in the designated area of the display interface if the number of call channels is greater than the maximum number of windows supported by the call interface which can be presented on the display apparatus. The n call windows is disposed on the upper layer of the entertainment content displayed in the display interface. In some embodiments, the designated area may be an edge area of the display interface. For example, the designated area is a top area, bottom area, right edge area or left edge area on the display interface. The designated area is designed to shield the entertainment content in the display interface minimally.

In some embodiments, the display apparatus displays the video call windows through the full-screen call interface. The maximum number of call windows supported in the call interface is n. If the number of call channels is greater than the maximum number of windows supported by the call interface, the display apparatus draws n call windows in the call interface.

In some embodiments, the determination of the number of call channels and the maximum number of windows supported by the call interface is triggered when the display apparatus establishes a video call or when a new terminal joins or exits during the video call.

In some embodiments, after n call windows are displayed on the display interface, the display apparatus detects whether the audio data satisfying the preset condition is contained in the received call data of m channels corresponding to m call users. The first call data of k channels is determined from the received call data of m channels according to the detected audio data satisfying the preset condition, where the first call data refers to the call data containing the audio data satisfying the preset condition: the video data included in the first call data of k channels is decoded to obtain the decoded video data corresponding to the first call data of k channels; and the decoded video data corresponding to the first call data of k channels is displayed in k first call windows among n call windows, where k is not greater than n. When k is less than n, the display apparatus may further determine the second call data of (n-k) channels from the remaining call data except the first call data: the video data included in the second call data of (n-k) channels is decoded to obtain the decoded video data corresponding to the second call data of n-k channels; and the decoded video data corresponding to the second call data of n-k channels is presented in the remaining n-k second call windows among the n call windows except the k first call windows.

It should be noted that, in the embodiments of the disclosure, when the display apparatus detects that all the m call users have accessed, the corresponding call windows may be assigned to the first n call users among the m call users according to the access sequence of the m call users in the initial state. For other call users than the n call users, no corresponding call windows are assigned to them because the number of call windows is insufficient. Here, for a call user who is allocated with a call window; the display apparatus may establish a mapping relationship between the call data of the call user and the corresponding call window; and store the above relationship in a mapping relationship table, where the call data of the call user may be identified by the user ID of the corresponding call user, that is, a mapping relationship between the user ID of the call user and the window ID of the corresponding call window is established. Of course, the call data of the call user can also be identified in other ways, for example, the call data of the call user is identified by the call line identifier corresponding to the call user, and thus the above mapping relationship is established, which is not limited in the embodiments of the disclosure. In the following embodiments, the call data of the call user is identified by the user ID of the corresponding call user as an example for illustration, that is, the mapping relationship table contains the user ID of the call user and the window ID of the call window as an example for illustration.

In some embodiments, the call windows presented on the display are arranged in sequence according to window IDs.

In some embodiments, n call windows are arranged in a first order within the designated area. In this case, according to the access sequence, the call user who accesses earlier will be assigned a call window closer to the front. For example, when n call windows are located in the right edge area or left edge area of the display interface, the n call windows are arranged in the order from top to bottom, so that the call user who accesses earlier will be assigned a call window closer to the top. For another example, when n call windows are located in the top area or bottom area of the display interface, the n call windows are arranged in the order from left to right, so that the call user who accesses earlier will be assigned a call window closer to the left.

In some embodiments, the call windows are marked sequentially according to their positions, and for example, may be marked as the first call window; the second call window; the third call window . . . , etc.

In the initial state, after the corresponding call windows are assigned to n call users among the m call users, for the call data of the m call users received during the video call, the display apparatus detects whether the call data of each of the m channels contains the audio data satisfying the preset condition, where the preset condition includes: the volume value of the audio data is not 0.

If it is detected that each channel of call data does not contain the audio data satisfying the preset condition, the call data corresponding to each call window ID stored in the above mapping relationship table is decoded to obtain the decoded video data corresponding to each channel of call data, and then the decoded video data corresponding to each channel of call data is displayed in the call window corresponding to the call data. For a user ID that does not exist in the mapping relationship table, that is, for a call user who is not assigned a call window; it is not necessary to decode the call data of this user, so as to reduce the resource overhead of the display apparatus.

In some embodiments, a control can be set on the floating layer to indicate other users displayed in the call interface, for example, the set area can be used for displaying the corresponding user name or user avatar according to which channel of video data is not displayed in the call interface.

Optionally, if there is audio data satisfying the preset condition in the call data of m channels, the display apparatus obtains the first call data of k channels containing the audio data. Afterwards, the display apparatus determines whether the user IDs of k call users corresponding to the first call data of k channels exist in the mapping relationship table, where k is a positive integer greater than or equal to 1.

In an embodiment, if the user IDs of k call users all exist in the mapping relationship table, the display apparatus decodes the call data of k channels of k call users existing in the mapping relationship table among the received call data of m channels and the video data contained in the call data of (n-k) channels of the remaining (n-k) call users in the mapping relationship table according to the call window IDs corresponding to the user IDs stored in the mapping relationship table, and displays the decoded video data in the corresponding call windows.

Exemplarily, the display apparatus detects the audio data in the call data of m channels, and maintains the first video data to be displayed in the corresponding call window when detecting that a first audio data in the first-channel call data satisfies the preset condition (that is, k=1) and there is a call window for displaying the first video data in the first-channel call data in n call windows of the display interface.

For example, assuming that the call window for displaying the first video data among the n call windows is a first window; first video data is maintained to be continuously displayed in the first window.

In some embodiments, the window for displaying the first video data may be adjusted according to the timing when the detected audio data satisfies the preset condition. For example, when detecting that the first audio data in the first-channel call data satisfies the preset condition, a mapping between the first audio and video data and the first call window needs to be established to display the first video data in the first video call window, regardless of whether the first audio and video data is displayed in the call window on the display. Before the mapping relation is established, if there is a mapping relation between the first audio and video data and other call window; the mapping relation between the first audio and video data and other call window needs to be removed at first: otherwise, there is no removal step.

In some embodiments, if the first video data has been displayed in a call window; the mapping relationship between the first audio and video data and the call window is not adjusted when detecting that the first audio data in the first call data satisfies the preset condition.

In another embodiment, if the user IDs of k call users all exist in the mapping relationship table, the display apparatus determines whether there is a user ID of a call user whose call data contain no audio data satisfying the preset condition before the user IDs of k call users. If so, the display apparatus updates the call window IDs corresponding to the user IDs in the mapping relationship table. Here, the first k call windows among the n call windows are assigned to the k call users, that is, the user IDs of the k call users are in one-to-one correspondence with the window IDs of the first k call windows, and the window IDs of the remaining call windows are in one-to-one correspondence with the remaining user IDs in the mapping relationship table. Afterwards, the display apparatus decodes the corresponding call data according to the user ID in the mapping relationship table, and displays the decoded video data in the corresponding call window according to the call window ID corresponding to the user ID. In this way, k pieces of video data included in the call data of k channels will be displayed in the front call windows, that is, the video data of the call user who is currently speaking among the m call users will be displayed before the video data of other users who are currently not speaking.

Further, when k is greater than 1, for the above k call users, when the first k call windows among the n call windows are assigned to the k call users, the corresponding call windows may be assigned to the k call users according to access time order when the k call users establish the call connection. That is, among the k call users, the call user who accesses earlier is assigned a call window closer to the front.

Optionally, for other call users than the above k call users in the mapping relationship table, the corresponding call windows are also assigned according to the access time sequence when the call connection is established, which will not be repeated in the embodiments of the disclosure.

In another embodiment, if there is a user ID that does not exist in the mapping relationship table among the user IDs of the k call users corresponding to the first call data of k channels, the display apparatus updates the mapping relationship table according to the user IDs of the k call users. Exemplarily, the display apparatus re-assigns the call windows, assigns the first k call windows among the n call windows to the k call users, and assigns the remaining (n-k) call windows to (n-k) call users among other call users than the k call users.

Here, the implementation of assigning the first k call windows among the n call windows to the k call users refer to the relevant implementation discussed above.

Furthermore, when assigning the remaining (n-k) call windows to (n-k) call users among other call users than the k call users, the display apparatus assigns the corresponding windows to the first n-k users successively in the access time order of m-k calling users among the m call users except the k call users. Here, the earlier the access order is, the closer the assigned window is to the front.

After re-assigning the windows, the display apparatus updates the mapping relationship table according to the re-assigned windows. Afterwards, the display apparatus decodes the call data of the call user corresponding to the user ID existing in the mapping relationship table to obtain the decoded video data corresponding to the corresponding call data, and displays the decoded video data corresponding to the call data of the corresponding call user in the corresponding window according to the call window ID corresponding to each user ID.

Exemplarily, k is equal to 1 as an example for illustration. The display apparatus detects the audio data in the call data of m channels. When detecting that the first audio data in the call data of the first channel satisfies the preset condition and there is no call window for displaying the video data in the call data of the first channel in n call windows in the display interface, the first video data is displayed in one of the n call windows.

Here, the display apparatus controls the first call window to stop displaying the second video data in the second-channel call data, where the first call window refers to a call window in the first place among the call windows on the display; and controls the first call window to display the first video data. That is, for the call window in the first place in the display interface, the display apparatus stops displaying the second video data of the call user that is currently being displayed in this call window; but displays the first video data in this call window: Here, during implementation, the display apparatus removes the mapping relationship between the second-channel call data corresponding to the second video data and the first call window; and establishes a mapping relationship between the first call window and the first-channel call data, that is, modifies the user ID corresponding to the window ID of the first call window in the mapping relationship table to the user ID of the call user corresponding to the first-channel call data, and then realizes the display of the first video data in the first call window according to the mapping relationship.

Correspondingly, after the first video data is displayed in the first call window; for the remaining call windows, the display apparatus controls the $i^{th}$ call window to stop displaying the $(i+1)^{th}$ video data in the $(i+1)^{th}$-channel call data, and controls the $i^{th}$ call window to display the $i^{th}$ video data in the $i^{th}$-channel call data, where the $i^{th}$ video data is video data displayed in a previous call window of the $i^{th}$ call window before change, and i is greater than 1 and not greater than n.

That is to say, after the first video data is displayed in the first call window; the display apparatus controls the second call window to stop displaying the third video data in the third-channel call data, and controls the second call window to display the second video data previously displayed in the first call window. Similarly, for the third call window; the display apparatus stops displaying the fourth video data in the third call window; but displays the third video data previously displayed in the second call window in the third call window: Similarly, the $n^{th}$ call window will stop displaying the $(n+1)^{th}$ video data, but display the $n^{th}$ video data previously displayed in the $n-1^{th}$ call window. In this way, the $(n+1)^{th}$ video data can no longer be displayed, and in this case, the call data of the call user corresponding to the $(n+1)^{th}$ video data can no longer be decoded to save the resource consumption.

It should be noted that the adjustment of the video data displayed in each call window is also realized by adjusting the mapping relationship between each call window and the corresponding call data.

The above discusses the implementation process of displaying the video data in the call data in the first call window in the display interface in a scenario where there is one channel of call data that contains the audio data satisfying the preset condition in all channels of call data. When there are two or more channels of call data that contains the audio data satisfying the preset condition in all channels of call data, the mapping relationship between the call window and the call data is adjusted, referring to the above implementation, so that the video data in the call data that contains the audio data satisfying the preset condition is displayed in the front call window; and the video data in the call data that contains no audio data satisfying the preset condition is displayed in the back call window:

Considering that a call user may speak at any time in the process of the multi-party video call, that is, the audio data contained in the call data of a channel obtained by the display apparatus may change at any time. In this case, if the video data displayed in each window is changed frequently through the above method, the case of flash confusion may occur. Based on this, in an embodiment, the foregoing preset condition further includes: the duration of the audio data is not less than a reference threshold. That is to say, when detecting that the duration of the audio signal in a channel of call data is greater than or equal to the reference threshold, the display apparatus can adjust the display order of the video data contained in the call data. For the call data containing the audio data of which the duration is not greater than the reference threshold, the display apparatus may not adjust the display sequence of the video data in the call data, where the reference threshold may be 3 seconds. 4 seconds or other values.

In another embodiment, after determining the first call data that contains the audio data satisfying the preset condition, the display apparatus may also adjust the display order of the video data in the first call data after a first time interval. For example, after determining the first call data, the display apparatus may adjust the display order of the video data according to the above method after one second. Alternatively, after an adjustment of the display order of the video data, the display apparatus may perform a next adjustment after continuously displaying the video data in the adjusted order for more than a certain period of time. For example, after adjusting the display order of the video data, the display apparatus may perform the next adjustment after displaying in this order for at least 2 seconds.

It should be noted that the time lengths used above are only an example given in the embodiments of the disclosure. According to different actual scenarios, the numerical values of the time lengths can be adjusted accordingly, which are not limited in the embodiments of the disclosure.

Figure 36:
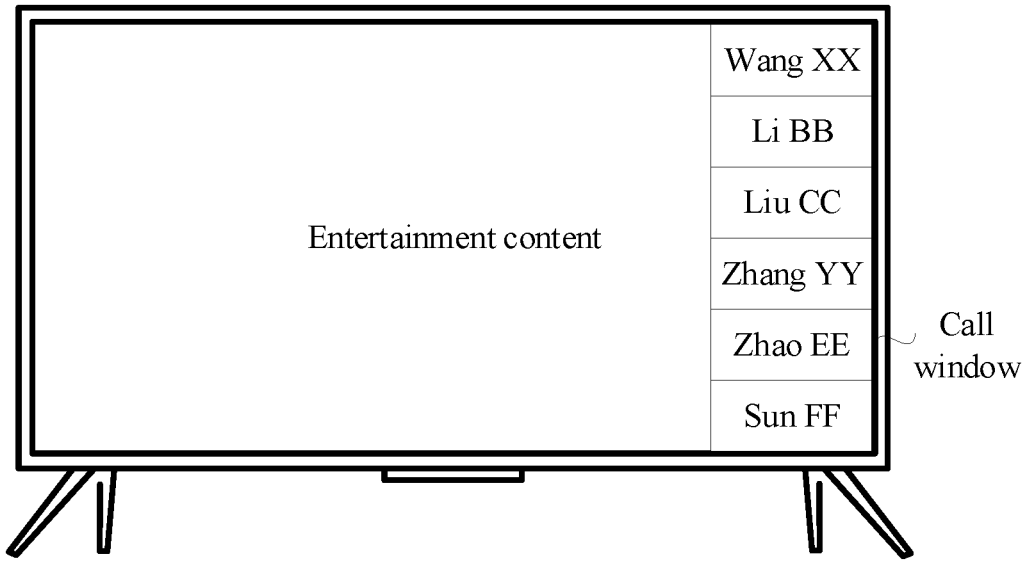
FIG. 36 is a schematic diagram of displaying the video data in the initial state according to an embodiment.
Figure 37:
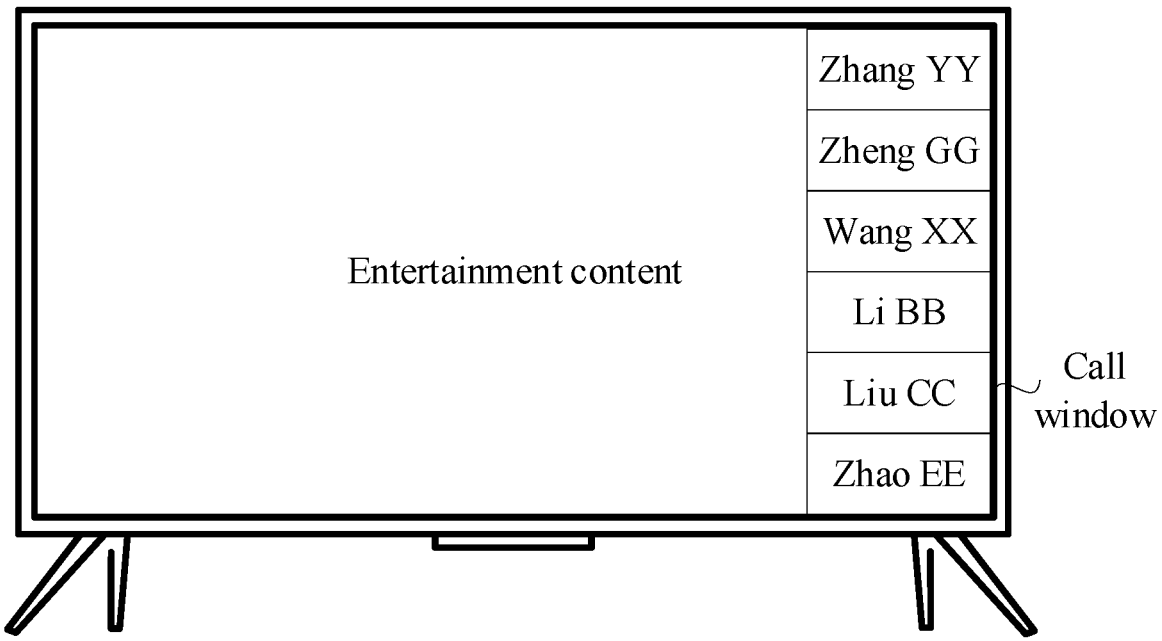
FIG. 37 is a schematic diagram of displaying the adjusted video data according to an embodiment.

FIG. 36 is a schematic diagram of displaying the video data in the initial state according to an embodiment of the disclosure. As shown in FIG. 37, there are 8 call users in the call, that is, m=8, and the right edge of the display interface of the display apparatus can show at most 6 call windows, that is, n=6. In the initial state, the display apparatus assigns the corresponding call windows to the first 6 accessed call users according to the access time sequence of the call users, and displays the video data of the first 6 accessed call users sequentially in 6 call windows according to the access sequence. As shown in FIG. 36, the user IDs of the first 6 accessed call users are Wang AA, Li BB, Liu CC, Zhang DD, Zhao EE and Sun FF in sequence, and the video data displayed sequentially from top to bottom according to the access sequence is as shown in FIG. 36. For two remaining call users Zheng GG and Yang HH who cannot be assigned the call windows, their corresponding video data cannot be displayed on the display interface.

Assuming that the call data of Zhang DD and Zheng GG among the call data of m channels received subsequently contains audio data satisfying the preset condition after the display apparatus displays the image in FIG. 36, then the display apparatus re-adjusts the display order, assigns the first and second call windows from top to bottom to Zhang DD and Zheng GG respectively, and assigns the remaining 4 call windows to 4 call users sequentially according to the access sequence of the remaining call users, so that Sun FF and Yang HH cannot be assigned the corresponding call windows. Afterwards, as shown in FIG. 37, the display apparatus displays the video data in the call data of each call user in the corresponding call window sequentially according to the re-assigned windows.

An embodiment of the disclosure provides a display apparatus, including: a display and a controller.

The display is configured to present a plurality of call windows in a video call, where a call window presents a real-time video of one-channel call data, and the display can present at most n call windows.

The controller is configured to: establish a video call, and control the display to present n call windows to show the video data of n call users when the number of call users participating in the video call is m, where n is less than m; detect the audio data in the call data of channels during the video call: in response to the first audio data in the first-channel call data among the call data of channels satisfying a preset condition and the first video data in the first-channel call data is not displayed in a call window of the display, display the first video data in a call window of the display: in response to detecting that the first audio data satisfies the preset condition and the first video data is displayed in a call window of the display, maintain the first video data to be displayed in the corresponding call window:

In some embodiments, the controller is further configured to: control a first call window to stop displaying the second video data from the second-channel call data, where the first call window refers to a call window ranked first among the call windows on the display; and control the first call window to display the first video data.

In some embodiments, the controller is further configured to: control an $i^{th}$ call window to stop displaying the $(i+1)^{th}$ video data from the $(i+1)^{th}$-channel call data, and control the $i^{th}$ call window to display the $i^{th}$ video data from the $i^{th}$-channel call data, where the $i^{th}$ video data is video data displayed in a previous call window of the $i^{th}$ call window before change, the $i^{th}$ call window refers to a call window in the $i^{th}$ place among the call windows on the display, i is an integer greater than 1 and not greater than n, and n is a positive integer and same as the number of call windows on the display.

In some embodiments, the controller controls the first call window to stop displaying the second video data in the second-channel call data, including: the controller removes a mapping relationship between the first call window and the second-channel call data; and stops displaying the second video data in the first call window:

In some embodiments, the controller is further configured to: establish a mapping relationship between the first call window and the first-channel call data, and display the first video data in the first call window.

In some embodiments, the controller is further configured to: decode the first video data in the first-channel call data; and display the decoded first video data in the first call window according to the mapping relationship between the first call window and the first-channel call data.

An embodiment of the disclosure also provides another display apparatus, including a display and a controller.

The controller is configured to: receive call data of m call users, where the call data includes video data and audio data; and display the video data in the call data containing the audio data in n call windows presented in a designated area of a display interface in response to detecting that the audio data satisfies a preset condition, where n is less than m.

In some embodiments, the controller is configured to: determine k pieces of first call data from the call data of the m call users according to the detected audio data satisfying the preset condition, where the first call data refers to call data that includes the audio data satisfying preset condition: decode the video data in the k pieces of first call data to obtain the decoded video data corresponding to the k pieces of first call data; and control the display to display the decoded video data corresponding to the k pieces of first call data in k first call windows among the n call windows, where k is not greater than n.

In some embodiments, the controller is further configured to: when k is less than n, determine (n-k) pieces of second call data from the remaining call data except the first call data: decode the video data in the (n-k) pieces of second call data to obtain the decoded video data corresponding to the (n-k) pieces of second call data; and control the display to display the decoded video data corresponding to the n-k pieces of second call data in remaining (n-k) second call windows except the k first call windows among the n call windows.

In some embodiments, the n call windows are arranged in a first order, and the k first call windows are ranked before the remaining n-k second call windows.

Based on the above, an embodiment of the disclosure provides a method for displaying video data, including: detecting the audio data in the call data of channels during a video call: in response to the first audio data in the first-channel call data satisfying a preset condition and there is no call window for displaying the first video data in the first-channel call data in call windows of the display, displaying the first video data in a call window of the display; and in response to the first audio data satisfying the preset condition and there is a call window for displaying the first video data in call windows of the display, maintaining the first video data to be displayed in the corresponding call window: where the number of call windows on the display is less than the number of call data channels participating in the video call.

In some embodiments, the displaying the first video data in a call window of the display, includes: controlling a first call window to stop displaying second video data in the second-channel call data, where the first call window refers to a call window ranked first among the call windows on the display; and controlling the first call window to display the first video data.

In some embodiments, the method further includes: controlling an $i^{th}$ call window to stop displaying the $(i+1)^{th}$ video data in the $(i+1)^{th}$-channel call data, and controlling the $i^{th}$ call window to display the $i^{th}$ video data in the $i^{th}$-channel call data, where the $i^{th}$ video data is video data displayed in a previous call window of the $i^{th}$ call window before change, the $i^{th}$ call window refers to a call window in the $i^{th}$ place among the call windows on the display, i is an integer greater than 1 and not greater than n, and n is an integer and same as the number of call windows on the display.

An embodiment of the disclosure provides a method for displaying video data, including: receiving call data of m call users, where the call data includes video data and audio data; and displaying the video data in the call data containing the audio data in n call windows displayed in a designated area of a display interface in response to the audio data satisfying a preset condition, where n is less than m.

In some embodiments, the displaying the video data in the call data containing the audio data in n call windows displayed in the designated area of the display interface, includes: determining k pieces of first call data from the call data of the m call users according to the detected audio data satisfying the preset condition, where the first call data refers to call data that includes the audio data satisfying preset condition: decoding the video data in the k pieces of first call data to obtain the decoded video data corresponding to the k pieces of first call data; and displaying the decoded video data corresponding to the k pieces of first call data in k first call windows among the n call windows, where k is not greater than n.

In some embodiments, the method further includes: when k is less than n, determining (n-k) pieces of second call data from the remaining call data except the first call data: decoding the video data in the (n-k) pieces of second call data to obtain the decoded video data corresponding to the (n-k) pieces of second call data; and controlling the display to display the decoded video data corresponding to the (n-k) pieces of second call data in remaining (n-k) second call windows except the k first call windows among the n call windows.

In an embodiment of the disclosure, when the number m of calling users in a multi-party video call exceeds the maximum number n of calling windows that the display apparatus supports display, the display apparatus displays the video data in the call data that contains the audio data satisfying the preset condition among the received call data of m channels in the n call windows. In this way, the video data of the call user who currently speaks can be preferentially displayed to the greatest extent, which helps to quickly locate the user who currently speaks and improve the user experience.

In some embodiments, the user participating in the video call can control the call interface to display a hangup control, and then exit the video call process through an operation on the hangup control. In this case, the user directly exits the video call application locally and cancels the display of the call interface. Meanwhile, on other terminal, after receiving a notification message that a certain terminal exits forwarded from the server, the other terminal determines whether the video data of the certain terminal is displayed on the call window of the call interface: if not displayed, the other terminal stops pulling the audio and video data of the certain terminal from the server and/or displays the exit prompt of the certain terminal: if displayed, during the above operation, it is also necessary to remove the mapping between the identifier of the certain terminal and the corresponding video chatting window; and move the video chatting windows ranked behind the corresponding video chatting window to forward successively. The video chatting windows ranked before the corresponding video chatting window is not changed even someone exits. The order change process may refer to the steps described in the foregoing embodiments.

Figure 38:
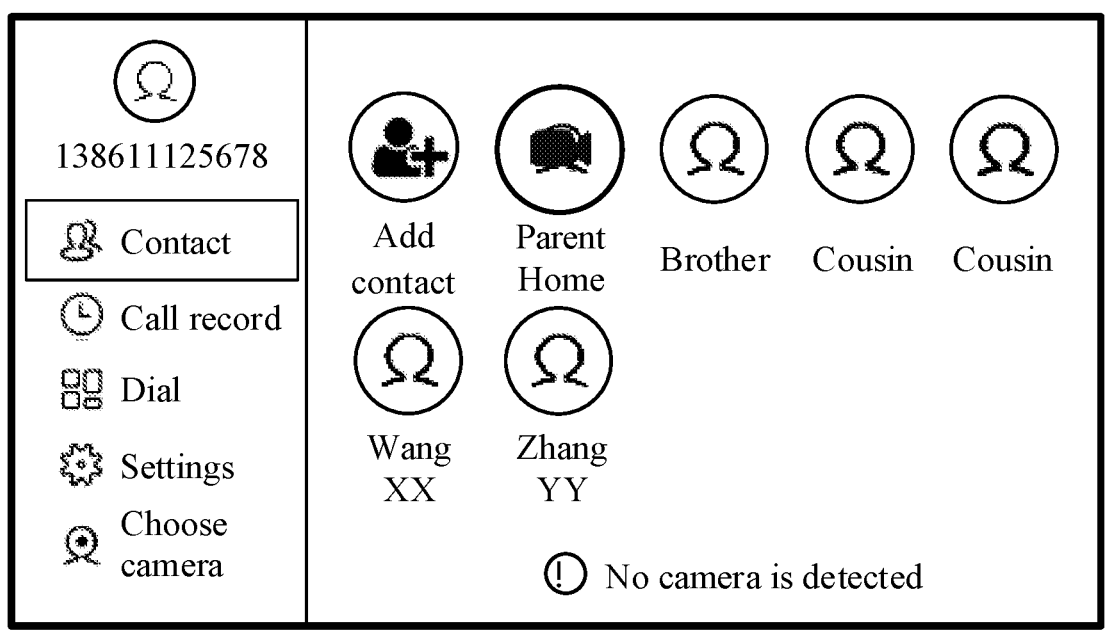
FIG. 38 shows a schematic diagram of a user interface in the display apparatus 200 according to an embodiment.

FIG. 38 shows a schematic diagram of a user interface in the display apparatus 200 according to an exemplary embodiment. The user interface in FIG. 38 includes a navigation bar and a dial bar, where the navigation bar includes multiple dialing mode controls, specifically including any one or combination of "Contact" control, "Call record" control, "Dial" control, etc., and also includes other controls not related to dialing mode, such as "Settings" control, "Choose camera", etc. The dialing mode controls correspond to different dial bars, and the display apparatus loads the corresponding dial bar on the user interface according to the dialing mode control where the focus (that is, selector) is located. The focus position in FIG. 38 is on the "Contact" control, and the display apparatus loads a contact list bar on the user interface. Exemplarily, the contact list bar includes a plurality of contact controls and an add contact control.

Figure 39:
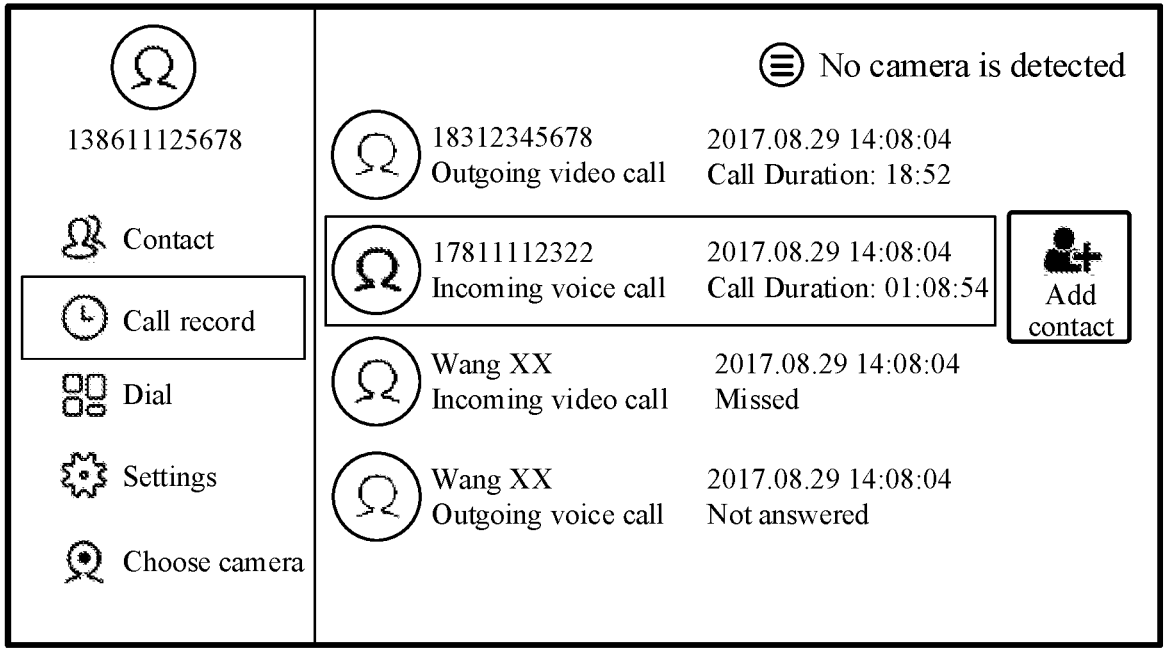
FIG. 39 shows a schematic diagram of a user interface according to an embodiment.

In some embodiments, the user can move the focus from the "Contact" control shown in FIG. 38 to the "Call record" control through the control device 100 or touch screen, and as shown in FIG. 39, the display apparatus cancels the loading of the contact list bar on the user interface and loads the call record list bar on the user interface. Exemplarily, the call record list bar includes a plurality of call record controls.

Figure 40:
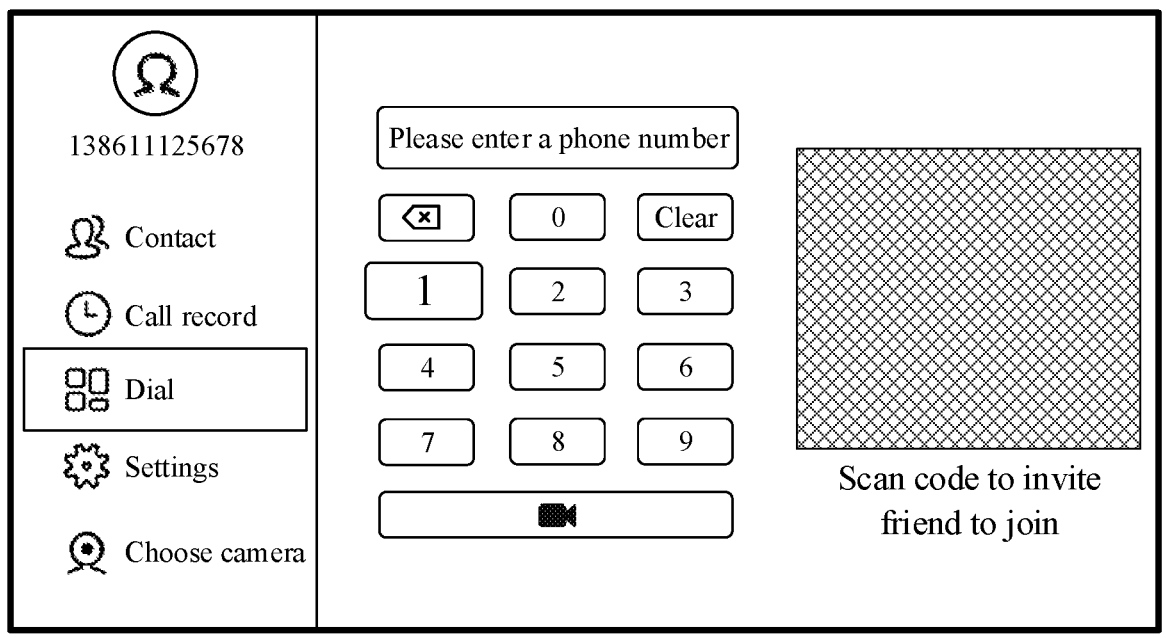
FIG. 40 shows a schematic diagram of another user interface according to an embodiment.
Figure 45:
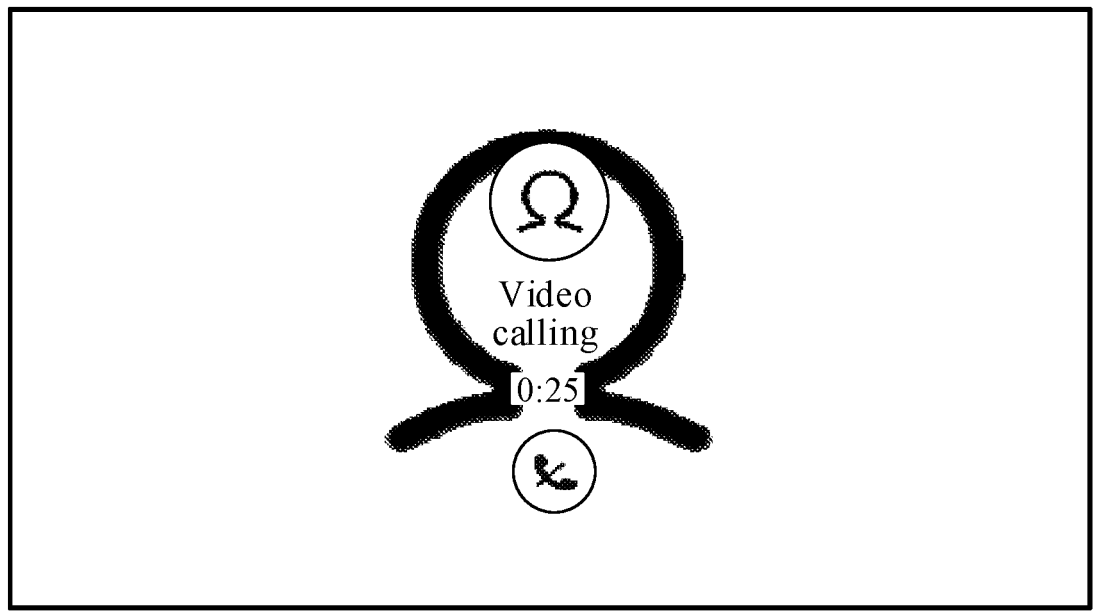
FIG. 45 shows a schematic diagram of another user interface according to an embodiment.

An embodiment of the disclosure provides a display apparatus, including: a user input interface configured to receive an input command from a user: a display configured to present a user interface that includes a navigation bar and a selector, where the navigation bar includes a plurality of dialing mode controls, and the selector is configured to move according to a command for selecting different dialing mode controls, and exemplary, as shown in FIG. 38, the user interface includes a navigation bar that includes "Contact" control. "Call record" control. "Dial" control, etc.: a communicator configured to perform data communication with a server; and a controller configured to: as shown in FIG. 38, receive a command from the user to select the "Contact" control, and report an operation corresponding to the command to the account server: where the operation is for selecting a dialing mode control. The selecting a dialing mode control means that the focus on a certain dialing mode control is moved from other dialing mode control. Exemplarily, as shown in FIG. 40, the user may move the focus from the "Contact" control to the "Dial" control, and the operation in this case is selecting the "Dial" control. The display apparatus obtains a command for selecting the "Dial" control from a user, and displays a dial bar corresponding to the "Dial" control on the user interface. After obtaining a dialing command through the dial bar from the user, the controller displays a dialing combination corresponding to the dialing command on the user interface. The controller obtains an account ID mapped to the dialing combination according to the dialing combination, and initiates a call request to the display apparatus corresponding to the account ID. Exemplarily, as shown in FIG. 45, a call bar is displayed on the user interface, where the call bar includes an associated user avatar of the called account ID, the prompt "video calling", the duration of the call that has been made, and a call termination control. Here, the controller terminates sending the call request to the display apparatus corresponding to the account ID after receiving the user's selection of the call termination control.

In some embodiments, as shown in FIG. 40, when the focus is on the "Dial" control, the dial bar displayed on the user interface is a dial pad, which includes an input bar, a numeric keyboard or an alphabetic keyboard, and a keyboard icon is configured on one side of the input bar. As shown in FIG. 40, an alphabetic keyboard icon is configured on one side of the input bar, and the current dial pad is a numeric keyboard, which can be used for the user to input a dialed digit command. In some embodiments, the user can also use a microphone to input a dialed digit command through voice input. In the user interface shown in FIG. 40, the controller receives the dialed number commands input from the user by selecting a plurality of numeric icons in the numeric keypad, reports the operation corresponding to the command to the account server, and displays a number combination to which the dialed digit commands map in the input bar. The operation here is selecting a numeric icon in the numeric keyboard. The operation of selecting a numeric icon in the numeric keyboard means that the user selects the numeric icon by pressing a button corresponding to the selected function on the control device or directly by confirming after the focus moves to the numeric icon. Exemplary, after the focus moves onto the numeric icon of "1", the user presses the OK key on the control device or directly confirms the numeric icon of "1", and the controller displays the digit 1 in the input bar after receiving the command to select the numeric icon of "1".

Figure 42:
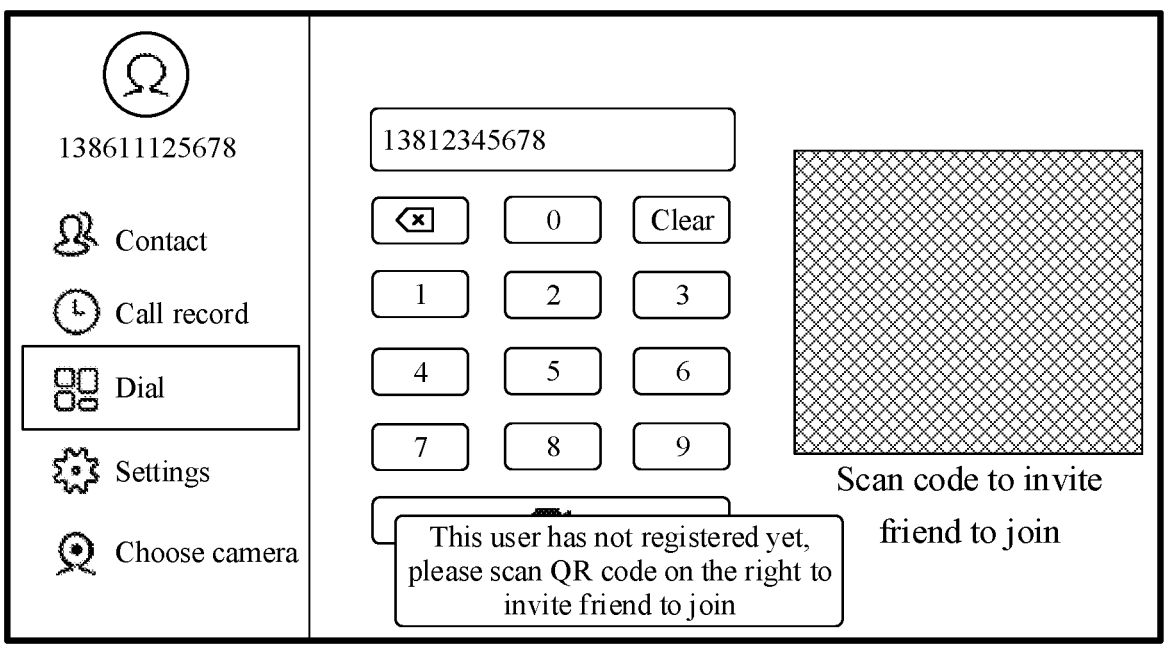
FIG. 42 shows a schematic diagram of another user interface according to an embodiment.

In some embodiments, if the dialed digits through the numeric keyboard from a user are a complete phone number, for example, as shown in FIG. 42, the user inputs the dialed digit commands by successively selecting a plurality of numeric icons "1", "3", "8", "1", "2", "3", "4", "5", "6", "7" and "8" in the numeric keyboard, the digit combination "13812345678" is displayed in the input bar, where the digit combination is a complete phone number. Then, the account ID mapped to the digit combination is searched from the account server according to the phone number "13812345678", and finally a call request is sent to the display apparatus corresponding to the account ID. Exemplarily, as shown in FIG. 45, a call bar is displayed on the user interface.

Figure 43:
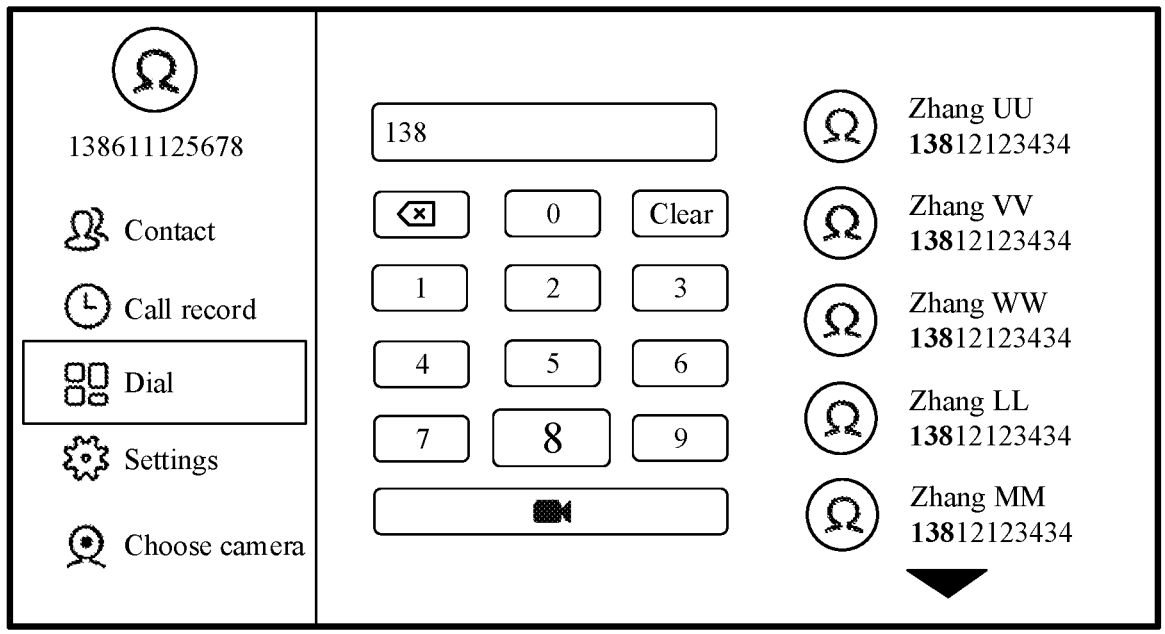
FIG. 43 shows a schematic diagram of another user interface according to an embodiment.

In some embodiments, if the dialed digits input through the numeric keyboard from the user are not a complete phone number, for example, as shown in FIG. 43, the user inputs the digit commands by successively selecting a plurality of numeric icons "1", "3" and "8" in the numeric keyboard, the digits "138" are displayed in the input bar, where the digit combination is not a complete phone number. Then, the phone numbers containing the pure digit combination "138" (exemplarily, the phone numbers "13812123434", "13812124545", etc., as shown in FIG. 43) are searched from the account server according to the digit combination "138", and a phone number list is displayed on the user interface, where the phone number list includes controls of all phone number that contain the digit combination "138". The user can input a command to select a certain phone number control by moving the selector as needed, and exemplarily select the phone number control with the phone number "13812123434". The controller obtains the account ID mapped to "13812123434" from the account server according to the mapping relationship between the pre-stored account ID and the selected phone number, and finally sends a call request to the display apparatus corresponding to the account ID. Exemplarily, as shown in FIG. 45, a call bar is displayed on the user interface.

In some embodiments, if the dialed digits input through the numeric keyboard from the user are not a complete phone number, then the phone numbers containing the digit combination "138" (exemplarily, the phone numbers "13812123434", "13812124545", etc., as shown in FIG. 43) are searched from the account server according to the digit combination "138", and a phone number list is displayed on the user interface, where the phone number list includes controls of all phone number that contain the digit combination "138". In the phone number list, if the account ID corresponding to the phone number has a preset contact relationship with the account ID of the current user, the account nickname control mapped to the account ID is displayed in the phone number list: if the account ID corresponding to the phone number has no preset contact relationship with the account ID of the current user, the phone number control mapped to the account ID is displayed in the phone number list. Through the display in the above manner, the user can easily distinguish which accounts have been added with a preset contact relationship and which accounts have not been added with a preset contact relationship.

In some embodiments, when the account ID mapped to the phone number has no preset contact relationship with the account ID of the current user, the phone number control mapped to the account ID is displayed in the phone number list, and meanwhile, the add contact control is displayed on one side of the phone number control. The controller receives a command for selecting the add contact control, obtains the account ID according to the mapping relationship between the pre-stored account ID and the selected phone number, and establishes a preset contact relationship between the account ID and the account ID of the current user, so as to realize the operation of adding a contact.

In some embodiments, if the user inputs dialed digit commands through the numeric keyboard, for example, as shown in FIG. 42, the user inputs the dialed digit commands by successively selecting a plurality of numeric icons "1", "3", "8", "1", "2", "3". "4", "5", "6", "7" and "8" in the numeric keyboard, the digits "13812345678" are displayed in the input bar, or as shown in FIG. 43, the user inputs the dialed digit commands by successively selecting a plurality of numeric icons "1", "3" and "8" in the numeric keyboard, the digits "138" are displayed in the input bar. After searching in the account server, if there is no account ID mapped to the phone number 13812345678 in the account server or there is no account ID mapped to the phone number containing the digit combination "138" in the account server, then a graphic code is displayed at the top of the user interface. The user can use the terminal device to scan the graphic code, and a page for creating an account ID in the account server is displayed on the terminal device after scanning the code with the terminal device.

In some embodiments, the call system includes a current display apparatus and an account server. The current display apparatus may store account IDs of all contacts (users who have been mutually authenticated or one-way authenticated with the current user), and the account server stores account IDs mapped to all phone numbers registered with the calling application. When the user inputs a digit command through the numeric keypad, for example, as shown in FIG. 42, the user inputs the digit commands by successively selecting a plurality of numeric icons "1". "3". "8". "1". "2". "3". "4". "5". "6". "7" and "8" in the numeric keyboard, the digits "13812345678" are displayed in the input bar, and the controller can firstly search for the account ID mapped to the digit combination "13812345678" on the current device. If the current device stores an account ID mapped to the digit combination "13812345678", the account ID is obtained, and a call request is sent to the display apparatus corresponding to the account ID. Exemplarily, as shown in FIG. 45, a call bar is displayed on the user interface. If the current device does not store the account ID mapped to the digit combination "13812345678", the controller uploads the digit combination "13812345678" to the account server, so as to check whether there is an account ID mapped to the digit combination "13812345678" stored in the account server. If the account server stores the account ID mapped to the digit combination "13812345678", then the account server will issue the account ID and send a call request to the display apparatus corresponding to the account ID. Exemplarily, as shown in FIG. 45, a call bar is displayed on the user interface. If the account server does not store the account ID mapped to the digit combination "13812345678", meaning that the phone number "13812345678" is not registered with the call application, then a graphic code is displayed on the user interface, to cause the terminal to display a page for registering with the call application (that is, creating an account ID in the account server) after scanning the code. Here, a prompt can also be displayed around the graphic code, as shown in FIG. 42, the prompt "This user has not registered yet, please scan QR code on the right to invite friend to join" is displayed to prompt the user to scan the code.

Figure 41:
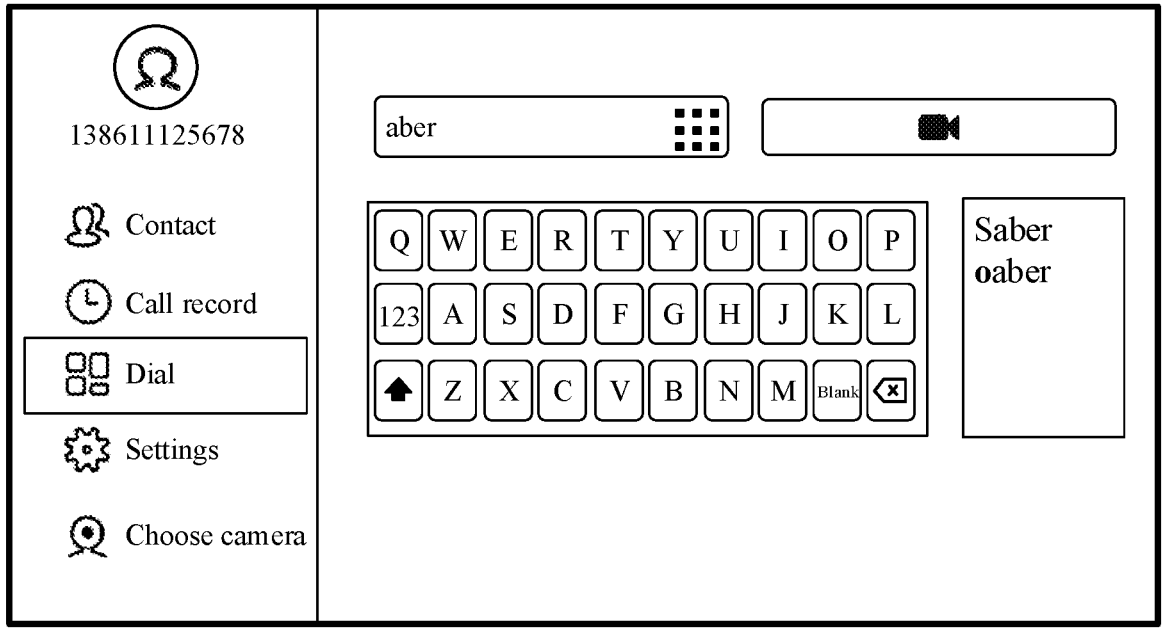
FIG. 41 shows a schematic diagram of another user interface according to an embodiment.

As shown in FIG. 40, an alphabetic keyboard icon is provided on one side of the input bar, and the dial pad in this case is a numeric keyboard, which can be used for the user to input a digit command. In the user interface shown in FIG. 40, when the controller receives a command from the user to select the alphabetic keyboard icon, as shown in FIG. 41, the dial pad is updated as an alphabetic keyboard on the user interface, while the keyboard icon on one side of the input bar is updated as the alphabetic keyboard icon. In this case, the user can input an alphabetic command through the alphabetic keyboard. In the user interface shown in FIG. 41, the controller can also continue to receive a command from the user to select the numeric keyboard icon, and the dial pad is updated as a numeric keyboard on the user interface, while the keyboard icon on one side of the input bar is updated as an alphabetic keyboard icon. The user can input a numeric command again through the numeric keypad. Through the above method of switching the dial pad between the digit pad and the letter pad, the controller can receive a alphabetic-only command or a combination of the alphabetic command and the digit command input from the user, and display a non-digit-only combination, i.e., a letter-only combination or a combination of digits and letters, mapped to the command on the user interface according to the received command. The controller automatically recognize the letter-only combination or the combination of digits and letters as a non-digit-only combination, and displays nickname controls of all nicknames containing the non-digit-only combination on the user interface. Exemplarily, in the user interface shown in FIG. 41, the controller receives alphabetic commands by selecting a plurality of letter icons in the alphabetic keyboard, reports the operation corresponding to the commands to the account server, and displays a letter-only combination mapped to the alphabetic commands in the input bar. The operation here is selecting a letter icon in the alphabetic keyboard. The operation of selecting a letter icon in the alphabetic keyboard means that the user selects the letter icon by pressing a button corresponding to the selected function on the control device or by confirming after the focus moves onto the letter icon. Exemplarily, after the focus moves onto the letter icon of the letter "a", the user presses the OK key on the control device or directly confirms the letter icon of the letter "a", and the controller receives a command to select the letter icon of the letter "a", and displays the letter "a" in the input bar after receiving the command to select the letter icon of the letter "a".

Figure 44:
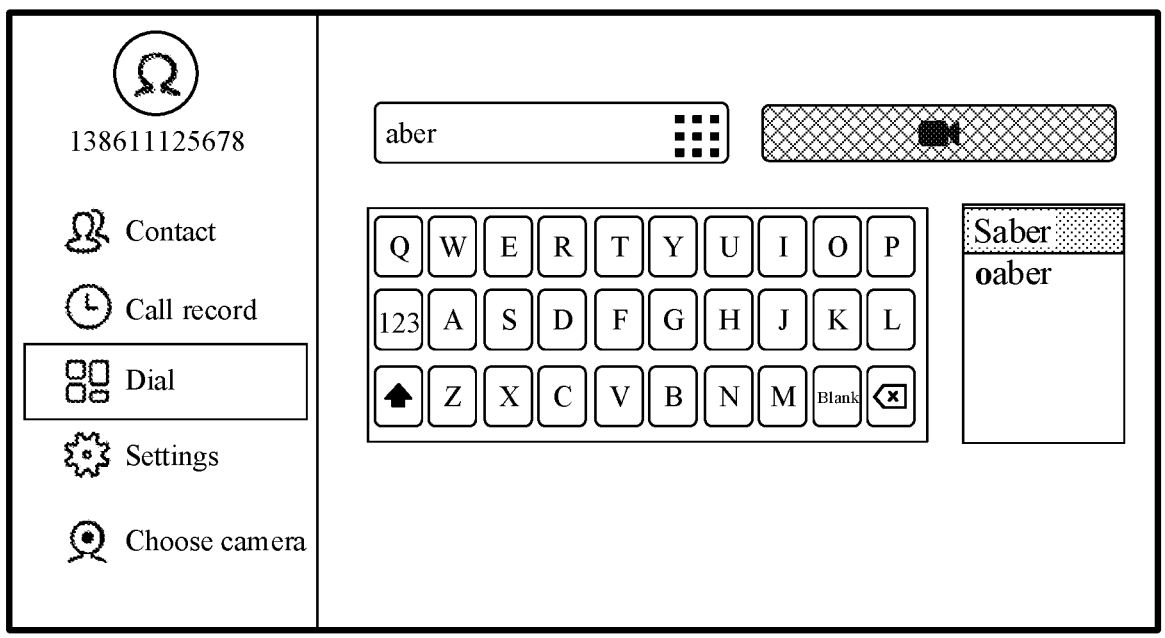
FIG. 44 shows a schematic diagram of another user interface according to an embodiment.

In some embodiments, the user inputs a alphabetic-only command through the alphabetic keyboard. Exemplarily, as shown in FIG. 41, the user inputs the alphabetic commands by successively selecting a plurality of letter icons "a", "b", "e" and "r" in the alphabetic keyboard, the letter combination "aber" is displayed in the input bar, and then the user nicknames containing the letter combination "aber" are searched for in the account server, and all nickname controls containing the letter combination "aber" are displayed on the user interface. Exemplarily, the nicknames "saber" and "oaber" are shown in FIG. 41. The user can input a command to select a certain nickname control by moving the selector as needed. Exemplarily, as shown in FIG. 44, the nickname control with nickname "saber" is selected. The controller obtains an account ID mapped to the nickname "saber" according to this command, and finally sends a call request to the display apparatus corresponding to the account ID. Exemplarily, as shown in FIG. 45, a call bar is displayed on the user interface.

Figure 46:
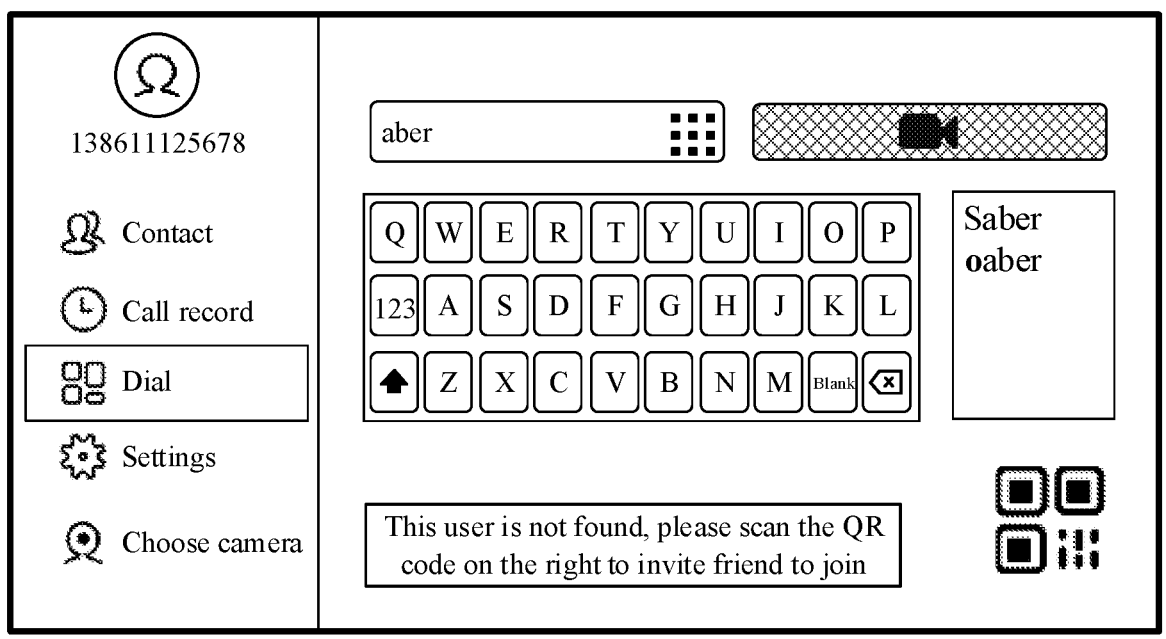
FIG. 46 shows a schematic diagram of another user interface according to an embodiment.

In some embodiments, the user inputs an alphabetic-only command through the alphabetic keyboard. Exemplarily, as shown in FIG. 41, the user inputs the alphabetic commands by successively selecting a plurality of letter icons "a". "b". "e" and "r" in the alphabetic keyboard, and the letter combination "aber" is displayed in the input bar. The controller firstly searches the current device for the account ID mapped to the nickname containing the letter combination "aber". If the current device stores an account ID mapped to the nickname containing the letter combination "aber", the account ID is obtained, and a call request is sent to the display apparatus corresponding to the account ID. Exemplarily, as shown in FIG. 45, a call bar is displayed on the user interface. If the current device does not store the account ID mapped to the nickname containing the letter combination "aber", the controller uploads the letter combination "aber" to the account server, so as to check whether there is an account ID mapped to the nickname containing the letter combination "aber" stored in the account server. If the account server stores the account ID mapped to the nickname containing the letter combination "aber", then the account server will issue the account ID and send a call request to the display apparatus corresponding to the account ID. Exemplarily, as shown in FIG. 45, a call bar is displayed on the user interface. If the account server does not store the account ID mapped to the nickname containing the letter combination "aber", as shown in FIG. 46, a graphic code is displayed on the user interface, to cause the terminal to display a page for creating an account ID in the account server after scanning the code.

In some embodiments, as shown in FIG. 38, when the focus is on the "Contact" control, the display apparatus displays a contact list bar on the user interface. Exemplarily, the contact list bar includes a plurality of contact controls and an add contact control. The contact here refers to a user who has created an account ID in the account server and is mutually authenticated or one-way authenticated with the current user based on the account. When receiving a command for selecting a certain contact control, the controller obtains an account ID mapped to the contact of the selected contact control, and sends the call information to the display apparatus corresponding to the account ID. As shown in FIG. 38, upon receiving a command for selecting the "Parent Home" control, the controller obtains the account ID mapped to "Parent Home", and sends the call information to the display apparatus corresponding to the account ID. Meanwhile, a call bar is displayed on the user interface.

In some embodiments, when receiving a command for selecting the add contact control from the user, the controller displays a page for the user to input the target phone number on the user interface, and obtains an account ID mapped to the target phone number by inputting the target phone number, so as to add the user corresponding to the account ID as a contact.

In some embodiments, as shown in FIG. 39, when the focus is on the "Call record" control, the display apparatus displays a call record list bar on the user interface, where the call record list bar includes a plurality of call record controls. Exemplarily, the phone numbers of the call record controls in the call record list bar shown in FIG. 39 include phone numbers that have been added as contacts, and phone numbers that have not been added as contacts. When the phone number of the call record control where the focus is located is a phone number that has been added as a contact, the account ID mapped to the phone number is directly obtained, and a call request is sent to the display apparatus corresponding to the account ID. When the phone number of the call record where the focus is located is a phone number that has not been added as a contact, the add contact control is displayed on one side of the call record control. The controller receives a command for selecting the add contact control from the user, obtains the account ID mapped to the phone number, and adds the account ID mapped to the phone number as the contact Zhang Hua ID. Here, the user may also directly obtain the account ID mapped to the phone number without performing the operation of adding a contact, that is, without a command to select a contact control, and send a call request to the display apparatus corresponding to the account ID.

Figure 47:
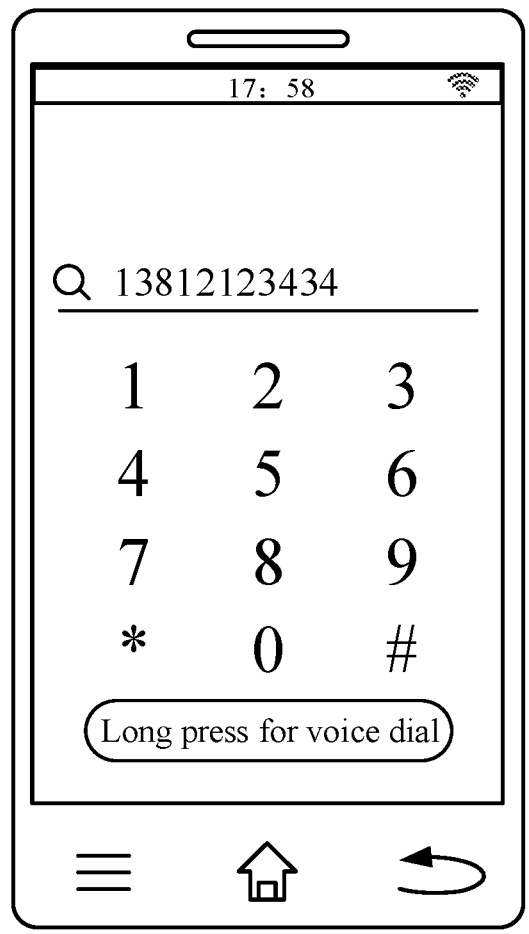
FIG. 47 shows a schematic diagram of a user interface in a mobile terminal according to an embodiment.

An embodiment of the disclosure provides a mobile terminal, including: a display configured to display a user interface: a communicator configured to perform data communication with an account server; and a controller configured to receive a command for input dialing phone number. Exemplarily. FIG. 47 is a schematic diagram of the user interface in the mobile terminal according to an embodiment. After receiving a phone number command input through the shown dial pad or a phone number command input through voice, the controller controls the user interface to display the phone number "13812123434".

When the current foreground application is not the first application, a call request is initiated to the device corresponding to the phone number through a mobile communication operator server according to the dialed phone number; and exemplarily, when the current foreground application is not the dial application based on the account server, a call request is directly initiated to the device corresponding to the phone number "13812123434" through the mobile communication operator server according to the dialed phone number "13812123434".

When the current foreground application is the first application, an account ID mapped to the dialed phone number is obtained from the account server, and the first application initiates a call request to the device corresponding to the account ID through the server of the first application according to the account ID. Exemplarily, when the current foreground application is the dial application based on the account server, the account ID mapped to the phone number "13812123434" is obtained from the account server, and a call request is initiated to the device corresponding to the account ID through the dial application, thereby realizing the purpose of free switching between the call dialing mode based on the operator and the call dialing mode based on network, and improving the dialing experience of the user.

In some embodiments, after the controller controls the user interface to display the phone number "13812123434" after receiving a phone number command input through the shown dial pad or a phone number command input through voice, and when the current foreground application is the first application, it is determined whether there is an account ID mapped to the phone number "13812123434" in the account server: if there is an account ID mapped to the phone number "13812123434" in the account server, the account ID is obtained, and a call request is initiated to the device corresponding to the account ID according to the account ID: if there is no account ID mapped to the phone number "13812123434" in the account server, a graphic code is displayed on the user interface, and other user can operate on the page corresponding to the graphic code after scanning the code, so as to create an account ID in the account server.

Figure 48:
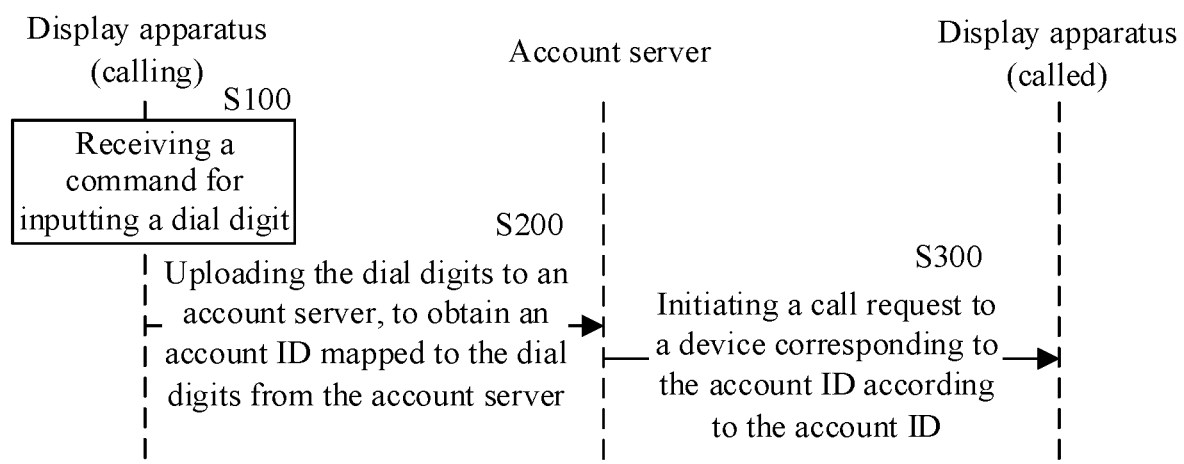
FIG. 48 shows a flowchart of a call interaction according to an embodiment.

An embodiment of the disclosure provides a call dialing method for a display apparatus, as shown in FIG. 48, including the following steps.

S100: receiving a command for inputting a dial digit. Exemplarily, as shown in FIG. 40, an alphabetic keyboard icon is provided on one side of the input bar, and the current dial pad is a numeric keyboard, which can be used for the user to input a dial digit. In some embodiments, the user can also use a microphone to input one or more dial digits through voice. In the user interface shown in FIG. 40, the controller receives the dial digit command via operation on the plurality of numeric icons on the numeric keypad, reports the operation corresponding to the command to the server, and displays a pure digit combination to which the dial digits command map in the input bar.

S200: uploading the dial digits to an account server, to obtain an account ID mapped to the dial digits from the account server.

S300: initiating a call request to a device corresponding to the account ID according to the account ID.

As shown in FIG. 42, the user inputs the dial digits by successively selecting a plurality of numeric icons "1", "3", "8", "1", "2", "3", "4", "5", "6", "7" and "8" in the numeric keyboard, and the digit combination "13812345678" is displayed in the input bar, where the digit-only combination is a complete phone number. Then, the account ID mapped to the digit combination is searched from the account server according to the phone number "13812345678", and finally a call request is sent to the display apparatus corresponding to the account ID. Exemplarily, as shown in FIG. 45, a call bar is displayed on the user interface. Here, the display apparatus corresponding to the account ID may refer to the display apparatus currently logged in with the account ID. The account ID is created by the user in the account server (specifically, the user registers the call application with a phone number, and generates a unique corresponding account ID in the account server according to the phone number), and the account ID is related to the user's basic information (mobile phone number, account, nickname). The calling display apparatus sends a call request to the called display apparatus corresponding to the account ID according to the account ID.

Figure 49:
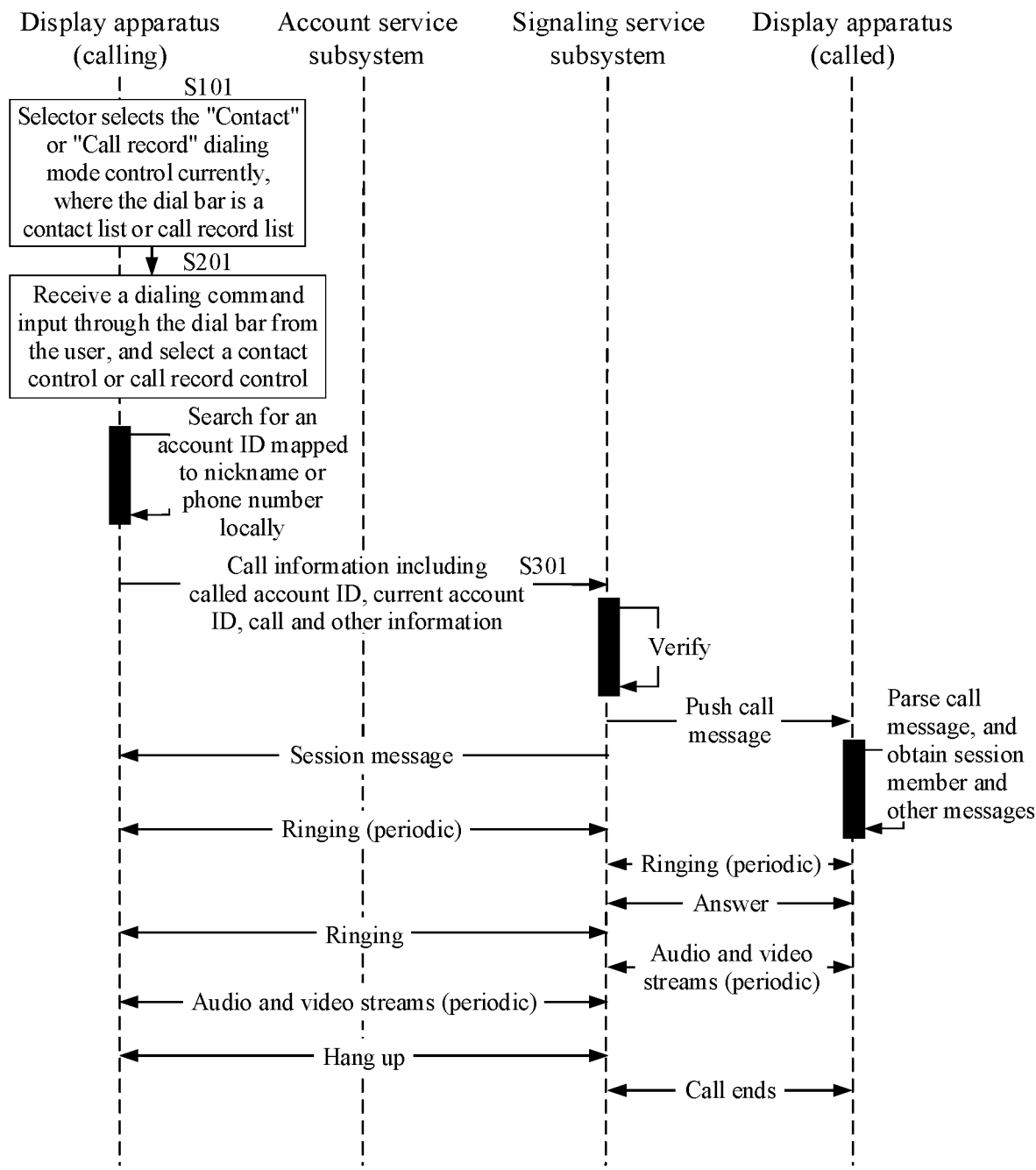
FIG. 49 shows a flowchart of another call interaction according to an embodiment.
Figure 51:
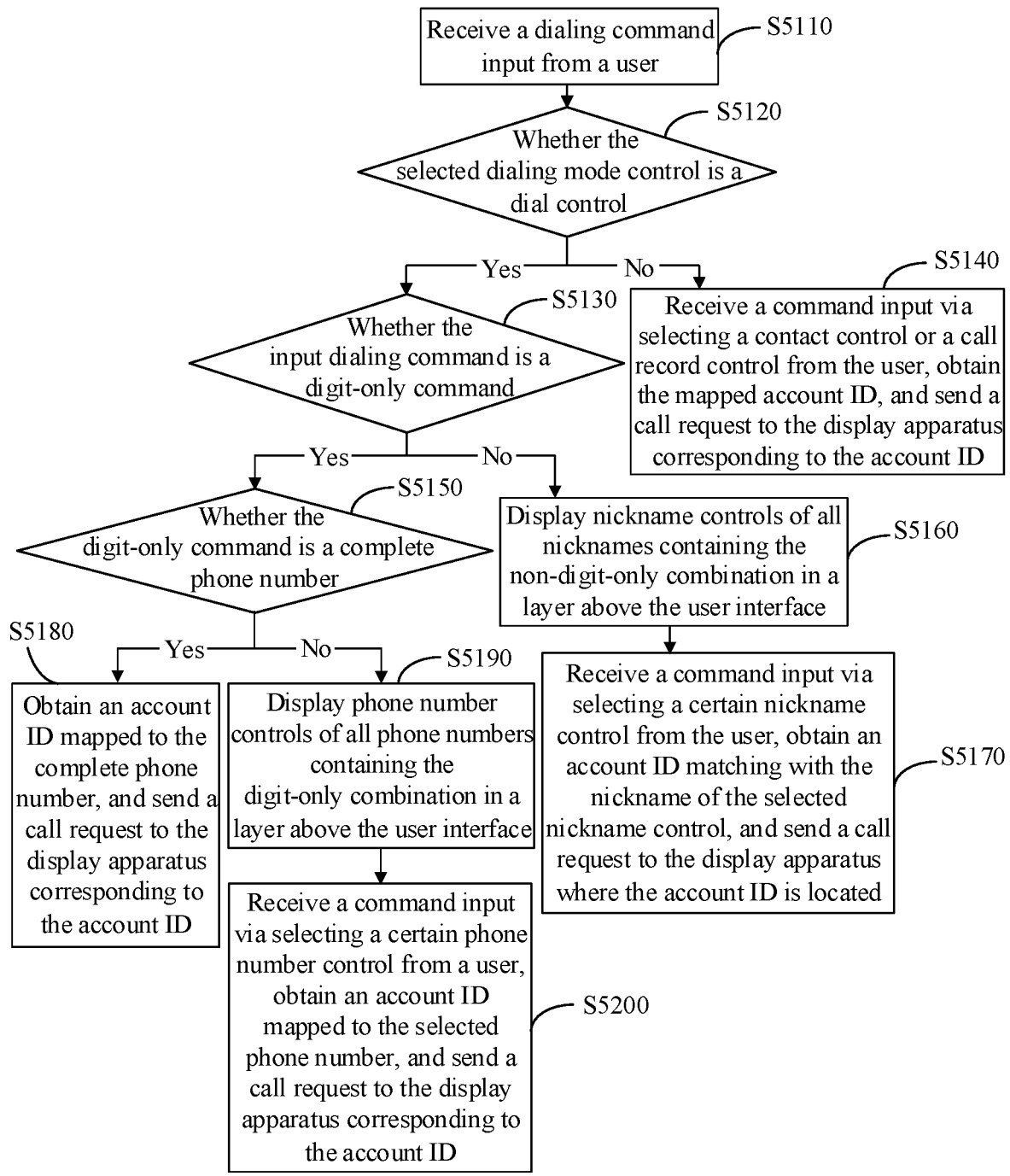
FIG. 51 shows a flowchart of a call dialing method according to an embodiment.

An embodiment of the disclosure provides a call dialing method for a display apparatus, as shown in FIG. 49 and FIG. 51, including the following steps.

S101: displaying a dial bar corresponding to the dialing mode control currently selected by the selector on the user interface.

Exemplarily, as shown in FIG. 38, when the focus is on the "Contact" control, the dial bar presented on the display apparatus on the user interface is a contact list bar. The contact list bar includes a plurality of contact controls and an add contact control. The contact here refers to a user who has registered with the call application and is mutually authenticated or one-way authenticated with the current user based on the account. Alternatively, when the focus is on the "Call record" control, the dial bar presented on the display apparatus on the user interface is a call record list bar, which includes a plurality of call record controls. Exemplarily, the phone numbers of the call record controls in the call record list bar shown in FIG. 39 include phone numbers that have been added as contacts, and phone numbers that have not been added as contacts.

S201: receiving a dialing command input through the dial bar from the user, and displaying a dialing combination mapped to the dialing command on the user interface. For example, a contact control or a call record control is selected in response to the dialing command.

S301: obtaining an account ID mapped to the dial combination, and sending the call information to a display apparatus corresponding to the account ID. The call information may include called account ID, current account ID, call and other information. An embodiment of the disclosure also provides an account server, which includes an account service subsystem and a signaling service subsystem.

The account service subsystem is configured to receive account information of a user uploaded through a display apparatus. Here, the account service subsystem stores the account information (including nickname, phone number, account number, account ID, etc., where the nicknames, phone numbers, account numbers and account IDs of all users are associated with each other, and all information is unique) of all users who have registered with the abovementioned calling application only).

The signaling service subsystem is configured to: receive a call signaling sent from a calling display apparatus, verify the call signaling, and send a call request to a called display apparatus according to the call signaling: receive a session message returned from the called display apparatus, and send the session message to the calling device: receive an answering instruction sent from the called display apparatus, and send the answering instruction to the calling display apparatus: receive the audio and video streams periodically sent from the calling display apparatus, and periodically send the audio and video streams received from the calling display apparatus to the called display apparatus: receive the audio and video streams periodically sent from the called display apparatus, and periodically send the audio and video streams received from the called display apparatus to the calling display apparatus.

On the user interface of the display apparatus (caller), when the focus is on the "Call record" control or the "Contact" control, the dialing is made through a call record or contact. When dialing through a call record or contact, the account ID mapped to the phone number of the call record or the account ID mapped to the phone number of the contact is searched for locally (that is, from the current display apparatus). Here the called account ID is obtained, and then a call signaling is sent to the signaling service subsystem, where the call signaling includes the called account ID, current account ID, call and other messages. The signaling service subsystem receives the call signaling, and sends a call request to the display apparatus (called) corresponding to the called account ID after verifying the call signaling. After sending the call request to the called display apparatus, the signaling service subsystem sends a session message to the calling display apparatus, and meanwhile, the calling display apparatus rings periodically to remind the user that the dialing succeeds.

After receiving the call request, the called display apparatus parses the call request and obtains the session message. After obtaining the session message, the called display apparatus rings periodically to remind the user to answer the call. After receiving the user's answering command, the called display apparatus sends an answering instruction to the signaling service subsystem, and the signaling service subsystem sends the answering instruction to the calling display apparatus. The calling display apparatus receives an instruction for indicating that the called display apparatus has answered, stops the periodic call ringing, and sends a short talk ringing to remind the user that the call is started. Here, in order to distinguish the call ringing from the talk ringing, the call ringing can be set to be louder or vibrate more violently than the talk ringing. After the call is established, the calling display apparatus and the called display apparatus start talking. The calling display apparatus periodically sends audio and video streams to the signaling service subsystem, and the signaling service subsystem periodically sends the audio and video streams received from the calling display apparatus to the called display apparatus. Meanwhile, the called display apparatus periodically sends audio and video streams to the signaling service subsystem, and the signaling service subsystem periodically sends the audio and video streams sent from the called display apparatus to the calling display apparatus. When the call ends, either the calling display apparatus or the called display apparatus sends a hangup instruction to the signaling service subsystem, and the signaling service subsystem sends the hangup instruction to the other party's device. Both the user interfaces of the calling display apparatus and the called display apparatus display the call end page.

In some embodiments, the calling display apparatus can create a virtual room and call a plurality of called display apparatuses at one time. Exemplarily, as shown in FIG. 38, a plurality of contact controls are selected, and then a plurality of call signalings are sent to the signaling service subsystem. After verification, the signaling service subsystem sends a plurality of call requests containing account IDs respectively to the called display apparatuses corresponding to the account IDs, so as to send the call requests to a plurality of called display apparatuses. After the plurality of called display apparatuses receive the corresponding call requests, the called display apparatus that obtains an answering command from the user accesses the virtual room. According to the account IDs, the virtual room periodically receives the audio and video streams of the calling and called display apparatuses from the signaling service subsystem, and also distributes the audio and video streams of the calling and called display apparatuses to the calling and called display apparatuses, realizing the multi-terminal call.

Figure 50:
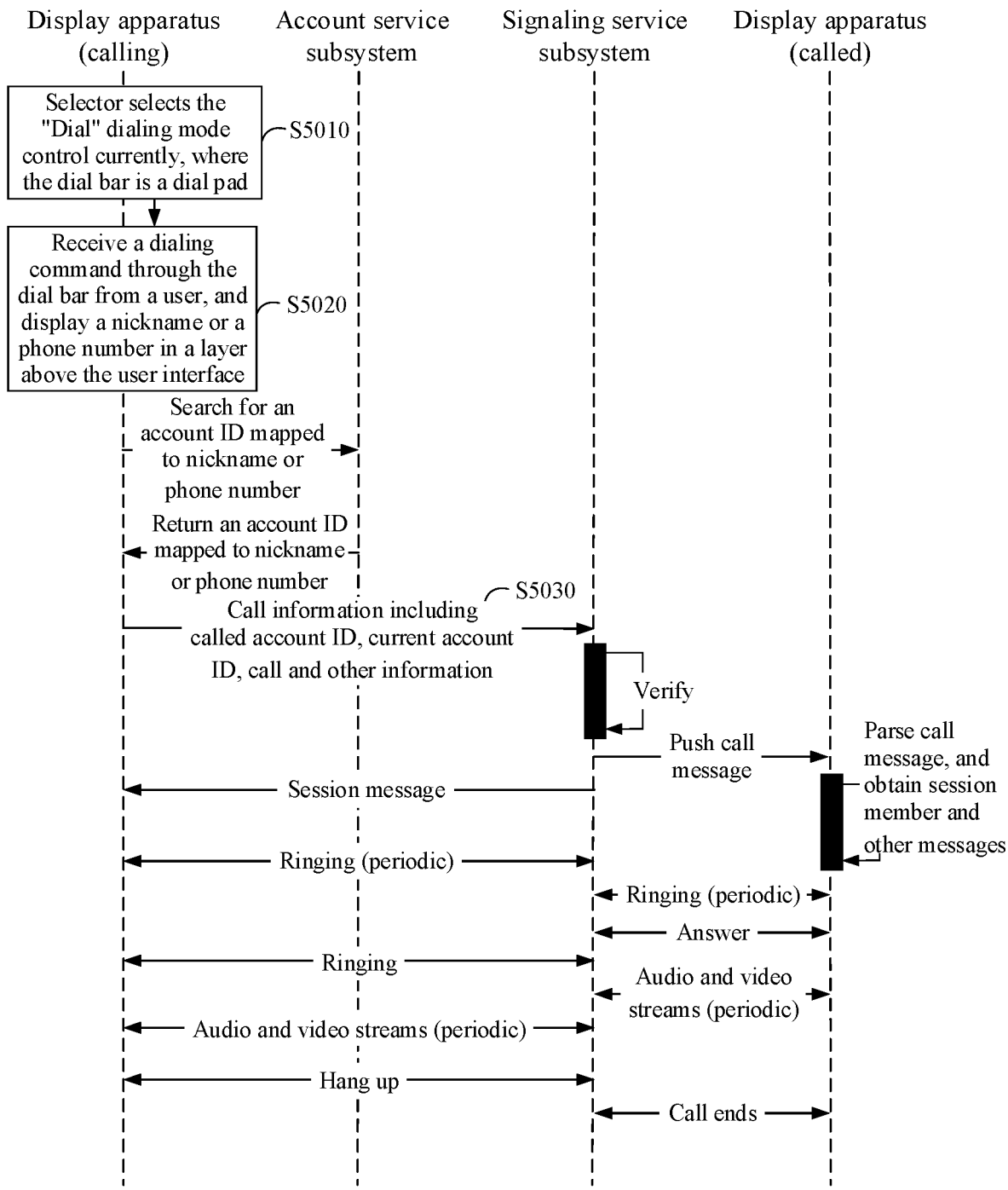
FIG. 50 shows a flowchart of another call interaction according to an embodiment.

In some embodiments, when the focus is on the "Dial" control, the dial bar displayed on the user interface is a dial pad, which includes an input bar, a numeric keyboard or an alphabetic keyboard, and a keyboard icon is provided on one side of the input bar. As shown in FIG. 50, an embodiment of the disclosure further provides a call dialing method for a display apparatus. This call dialing method is similar to the method described in FIG. 49. Referring to FIG. 50, the method at least includes the following steps.

S5010: displaying the "Dial" control currently selected by the selector on the user interface, where the dial bar is a dial pad.

S5020: receiving a dialing command input through the dial bar from a user, and displaying a nickname or a phone number in a layer above the user interface.

S5030: sending a call signaling to the signaling service subsystem. The call signaling includes called account ID, current account ID, call and other information.

Referring to FIG. 51, an embodiment of the disclosure further provides a call dialing method for a display apparatus. The method includes the following steps.

S5110: receiving a dialing command input from a user.

S5120: determining whether the selected dialing mode control is a dial control.

S5130: in response to a selected dialing mode control being a dial control, determining whether the input dialing command is a digit-only command.

S5140: in response to the selected dialing mode control being not a dial control, receiving a command input via selecting a contact control or a call record control from the user, obtaining the mapped account ID, and sending a call request to the display apparatus corresponding to the account ID.

S5150: in response to the input dialing command being a digit-only command, determining whether the digit-only command is a complete phone number.

S5160: in response to the input dialing command being not a digit-only command, display nickname controls of all nicknames containing the non-digit-only combination in a layer above the user interface.

S5170: receiving a command input via selecting a certain nickname control from the user, obtaining an account ID matching with the nickname of the selected nickname control, and sending a call request to the display apparatus where the account ID is located.

S5180: in response to the digit-only command being a complete phone number, obtaining an account ID mapped to the complete phone number, and sending a call request to the display apparatus corresponding to the account ID.

S5190: in response to the digit-only command being not a complete phone number, display phone number controls of all phone numbers containing the digit-only combination in a layer above the user interface.

S5200: receiving a command input via selecting a certain phone number control from a user, obtaining an account ID mapped to the selected phone number, and sending a call request to the display apparatus corresponding to the account ID.

As shown in FIG. 40, an alphabetic keyboard icon is provided on one side of the input bar, and the current dial pad is a numeric keyboard, which can be used for the user to input a digit command. Alternatively, in the user interface shown in FIG. 40, when the controller receives a command via selecting the alphabetic keyboard icon from the user, as shown in FIG. 41, the dial pad is updated as an alphabetic keyboard on the user interface, while the keyboard icon on one side of the input bar is updated as the alphabetic keyboard icon. In this case, the user can input an alphabetic command through the alphabetic keyboard. When the user enters an alphabetic command or a combination of a digit command and an alphabetic command, the controller automatically recognize the letter-only combination or the combination of digits and letters as a non-digit-only combination, and displays nickname controls of all nicknames containing the non-digit-only combination on the user interface. When the user inputs a dial digit command through the digit keypad, all phone number controls including all digit combinations are displayed on the user interface. When dialing through the above method, it is necessary to find the account ID mapped to the nickname or phone number from the account service subsystem. Here the called account ID is obtained, and then a call signaling is sent to the signaling service subsystem, where the call signaling includes the called account ID, current account ID, call and other messages. The signaling service subsystem receives the call signaling, and sends a call request to the display apparatus (called) corresponding to the called account ID after verifying the call signaling. After sending the call request to the called display apparatus, the signaling service subsystem returns a session message to the calling display apparatus, and meanwhile, the calling display apparatus rings periodically to remind the user that the dialing succeeds.

After receiving the call request, the called display apparatus parses the call request and obtains the session message.

After obtaining the session message, the called display apparatus rings periodically to remind the user to answer the call. After receiving the user's answering command, the called display apparatus sends an answering instruction to the signaling service subsystem, and the signaling service subsystem sends the answering instruction to the calling display apparatus. The calling display apparatus receives an instruction that the called display apparatus has answered, stops the periodic call ringing, and outputs a short talk ringing to remind the user that the call is started. Here, in order to distinguish the call ringing from the talk ringing, the call ringing can be set to be louder or vibrate more violently than the talk ringing. After the call is connected, the calling display apparatus and the called display apparatus start talking. The calling display apparatus periodically sends audio and video streams to the signaling service subsystem, and the signaling service subsystem periodically sends the audio and video streams received from the calling display apparatus to the called display apparatus. Meanwhile, the called display apparatus periodically sends audio and video streams to the signaling service subsystem, and the signaling service subsystem periodically sends the audio and video streams sent from the called display apparatus to the calling display apparatus. When the call ends, either the calling display apparatus or the called display apparatus sends a hangup instruction to the signaling service subsystem, and the signaling service subsystem sends the hangup instruction to the other party's device. Both the user interfaces of the calling display apparatus and the called display apparatus display the call end page.

In some embodiments, the user can set in the called display apparatus whether the account ID mapped to the nickname or the phone number can be retrieved through the nickname or the phone number in the calling application. The user can also set a privacy item in the called device. After receiving the call information, the called device determines whether the user mapped to the account ID of the calling device included in the call information is a contact of the user mapped to the account ID of the called device: if so, sends an answer instruction to the signaling server; and if not, sends no answer instruction to the signaling server. If the signaling server does not receive the answer instruction sent from the called display apparatus after a period of time, the signaling server will send a rejection message to the calling display apparatus, or the called display apparatus sends a rejection message directly to the signaling server, and then the signaling server sends the rejection message received from the called display apparatus to the calling display apparatus.

Figure 52:
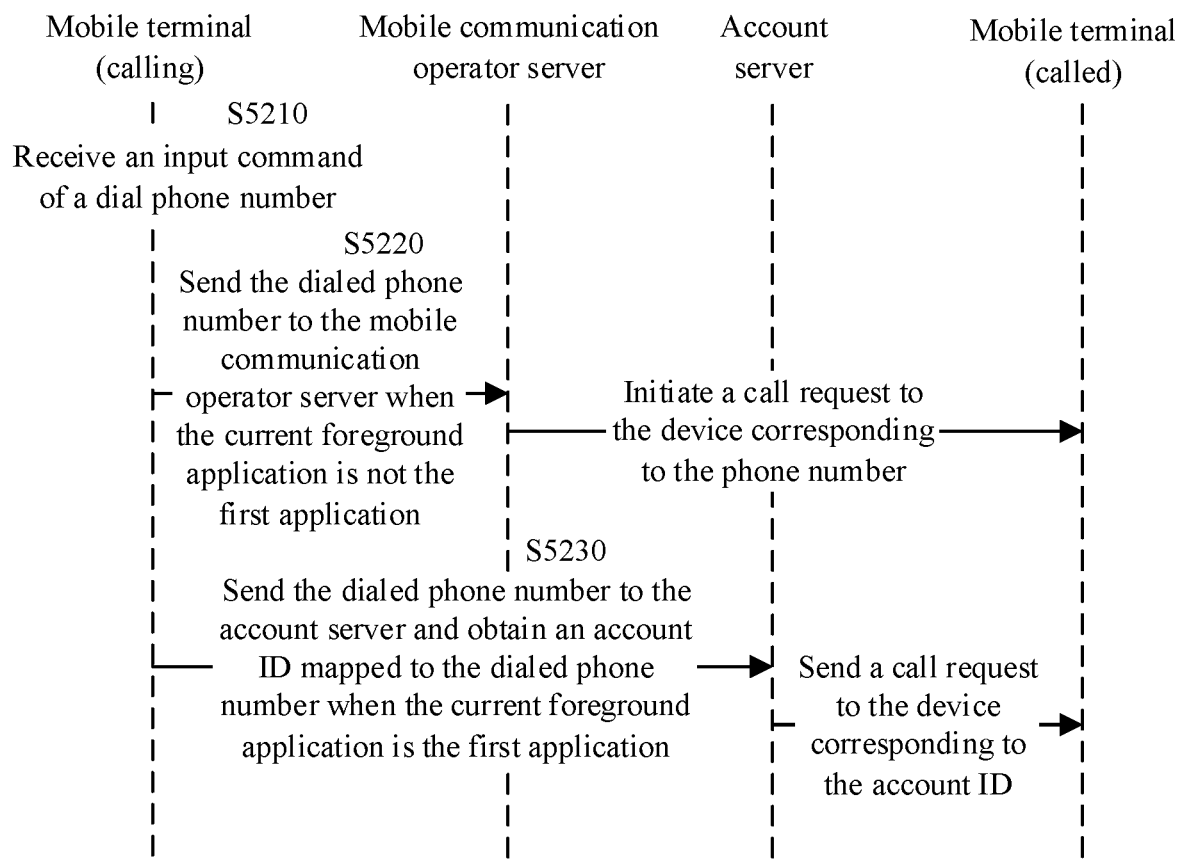
FIG. 52 shows a flowchart of another call interaction according to an embodiment.

An embodiment of the disclosure provides a call dialing method for a mobile terminal, as shown in FIG. 52, including the following steps.

S5210: receiving an input command of a dial phone number; and exemplarily. FIG. 47 shows a schematic diagram of a user interface in the mobile terminal 300 according to an embodiment. After receiving a phone number command input through the shown dial pad or a phone number command input through voice, the controller controls the user interface to display the phone number "13812123434".

S5220: initiating a call request to the device corresponding to the phone number through a mobile communication operator server according to the dial phone number when the current foreground application is not the first application; and exemplarily, sending a call request directly to the device corresponding to the phone number "13812123434" through the mobile communication operator server according to the dial phone number "13812123434" when the current foreground application is not the dial application based on the account server.

S5230: obtaining an account ID mapped to the dialed phone number from the account server when the current foreground application is the first application, so that the first application sends a call request to the device corresponding to the account ID through the server of the first application according to the account ID. Exemplarily, when the current foreground application is the dial application based on the account server, the account ID mapped to the phone number "13812123434" is obtained from the account server, and a call request is sent to the device corresponding to the account ID through the dial application, thereby realizing the purpose of free switching between the call dialing mode based on the operator and the call dialing mode based on network, and improving the dialing experience of the user.

For the convenience of explanation, the above description has been made in conjunction with specific embodiments. However, the above exemplary discussions are not intended to be exhaustive or to limit implementations to the specific forms disclosed above. Numerous modifications and variations can be obtained in light of the above teachings. The above embodiments are chosen and described in order to better explain the principles and practical applications, so as to enable those skilled in the art to better utilize the described embodiments and various variant embodiments suitable for specific use considerations.

What is claimed is:

1. A display apparatus, comprising:
a display configured to display an image from a broadcast system or network and/or a user interface;
an audio player configured to output audio;
a communicator configured to establish communication with a server via network or an external device in a local area network;
a user input interface configured to receive an operation input from a user; and
a controller connected with the display, the audio player, the communicator and the user interface respectively, wherein the controller is configured to:
control the display to present a first area and a second area on a call interface for a video call, wherein the first area is used to present one or more video chatting windows, and a video chatting window is for presenting video and audio data of a first party in the video call, and the second area is used to present one or more voice chatting windows, and a voice chatting window is for outputting audio data of a second party in the video call without outputting video data of the second party;
obtain a quantity Y for indicating number of parties currently participating in the video call from the sever; and
in response to the quantity Y being greater than a preset quantity X of channels that the display apparatus is able to support, control the display to present X video chatting windows in the first area, and control the display to present (Y-X) voice chatting windows in the second area, wherein Y is a positive integer, and X is an integer greater than or equal to 2.

2. The display apparatus of claim 1, wherein the controller is further configured to:
while both the first area with one or more video chatting windows and the second area with one or more voice chatting windows are presenting on the call interface, in response to a switch operation for switching between a video chatting window and a voice chatting window from the user,
determine a target voice chatting window corresponding to a third party in the second area, and determine a target video chatting window corresponding to a fourth party in the first area;
associate audio data and video data of the third party to the target video chatting window, and play the audio data and video data of the third party in the target video chatting window, and
associate audio data of the fourth party to the target voice chatting window; and play the audio data of the fourth party in the target voice chatting window without outputting the video data of the fourth party.

3. The display apparatus of claim 1, wherein the controller is configured to:
in response to a selection operation on a cast control on the call interface, control the display to show a device list with one or more devices which are capable of accepting content cast from the display apparatus;
in response to a selection operation on a target device in the device list, send a cast request to the target device, wherein the cast request carries a call ID and a device ID corresponding to each party in a virtual room corresponding to the video call;
in response to cast success information sent from the target device based on the cast request, stop receiving audio data and video data of each party from the server, and control the display to display only a video image of the local display apparatus.

4. The display apparatus of claim 1, wherein the display is configured to present at most n call windows which comprise the one or more video chatting windows in the first area and the one or more voice chatting windows in the second area, and the controller is configured to:
in response to the quantity Y being greater than n, control the display to play call data of n call users among Y call users, wherein the call data comprises video data and audio data, and n is an integer greater than or equal to 2;
detect audio data in call data of channels of the Y parties during call;
in response to first audio data in first-channel call data among the call data of channels of the Y parties satisfying a preset condition and the first-channel call data being not among the one or more video chatting windows presented on the first area and the one or more voice chatting windows presented on the second area, control a first call window to stop displaying call data, and control the first call window to output the first audio data, wherein the first call window is a call window ranked first among the one or more video chatting windows or the one or more voice chatting windows.

5. The display apparatus of claim 2, wherein the controller is further configured to:
in response to a selection operation on a first control, control the display to present a control list associated with the first control on a floating layer above the call interface, wherein the control list comprises a control associated with switching between a video chatting window and a voice chatting window; and
in response to a selection operation on the control associated with switching between the video chatting window and the voice chatting window;

determine the target voice chatting window in the second area;
control the display to present a pop-up window for selecting a fourth party on the floating layer, wherein user IDs of the X video chatting windows in the first area are displayed in the pop-up window;
select a target video chatting window corresponding to the fourth party in the pop-up window.

6. The display apparatus of claim 5, wherein the control list further comprises an invitation control, and the controller is configured to:
in response to a selection operation on the invitation control, send invitation information to a display apparatus of a fifth party invited by the user through the server;
in response to invitation success information sent from the display apparatus of the fifth party based on the invitation information, control the display to present a newly added window for voice chatting in the second area, obtain audio data of the fifth party from the server, and play the audio data of the fifth party in the newly added voice chatting window.

7. The display apparatus of claim 1, wherein the controller is configured to:
display the one or more video chatting windows in the first area according to a time sequence in which call parties join a virtual room corresponding to the video call after the video call is started;
in response the total quantity of video chatting windows in the first area reaching the preset number X of channels, switch subsequent call parties accessing the virtual room to voice access, and present voice chatting windows in sequence in the second area according to a time sequence of the subsequent call parties joining the virtual room.

8. The display apparatus of claim 3, wherein the controller is configured to:
control the display to present a control for indicating that cast is being started in a cast state area, after sending the cast request and before receiving the cast success information; and
control the display to present a control for indicating that the cast is being performed in the cast state area, and control the display to present a device switch control for switching a cast device and a cast exit control, after receiving the cast success information.

9. The display apparatus of claim 8, wherein the controller is configured to:
in response to a selection operation on the device switch control, control the display to present a device list which is able to accept content cast from the local display apparatus, and send first indication information to the target device, wherein the first indication information is used to indicate the target device to control a second application installed in the target device to stop receiving call data of each call party from the server and exit from current video call; and in response to a selection operation on a first device in the device list, send a cast request to the first device; and
in response to a selection operation on the cast exit control, send second indication information to the target device, wherein the second indication information is used to indicate the target device to control the second application installed in the target device to stop obtaining call data of each call party from the server, exit the current video call and send cast exit information to the display apparatus.

10. The display apparatus of claim 9, wherein the controller is further configured to:
in response to the cast exit information sent from the target device, control a first application installed in the display apparatus to resume receiving call data of each call party from the server, control the display to display video images of a local call party and each call party, and control the audio player to play audio data of each call party, wherein the first application is a video call application in the display apparatus.

11. A method for a display apparatus, comprising:
controlling a display of the display apparatus to present a first area and a second area on a call interface for a video call, wherein the first area is used to present one or more video chatting windows, and a video chatting window is for presenting video and audio data of a first party in the video call, and the second area is used to present one or more voice chatting windows, and a voice chatting window is for outputting audio data of a second party in the video call without outputting video data of the second party, wherein the display apparatus comprise the display configured to display an image from a broadcast system or network and/or a user interface, an audio player configured to output audio, a communicator configured to establish communication with a server via network or an external device in a local area network, and a user input interface configured to receive an operation input from a user;
obtaining a quantity Y for indicating number of parties currently participating in the video call from the sever; and
in response to the quantity Y being greater than a preset quantity X of channels that the display apparatus is able to support, controlling the display to present X video chatting windows in the first area, and control the display to present (Y-X) voice chatting windows in the second area, wherein Y is a positive integer, and X is an integer greater than or equal to 2.

12. The method of claim 11, further comprising:
while both the first area with one or more video chatting windows and the second area with one or more voice chatting windows are presenting on the call interface, in response to a switch operation for switching between a video chatting window and a voice chatting window from the user,
determining a target voice chatting window corresponding to a third party in the second area, and determining a target video chatting window corresponding to a fourth party in the first area;
associating audio data and video data of the third party to the target video chatting window, and playing the audio data and video data of the third party in the target video chatting window, and
associating audio data of the fourth party to the target voice chatting window, and playing the audio data of the fourth party in the target voice chatting window without outputting the video data of the fourth party.

13. The method of claim 11, further comprising:
in response to a selection operation on a cast control on the call interface, controlling the display to show a device list with one or more devices which are capable of accepting content cast from the display apparatus;
in response to a selection operation on a target device in the device list, sending a cast request to the target device, wherein the cast request carries a call ID and a device ID corresponding to each party in a virtual room corresponding to the video call;
in response to cast success information sent from the target device based on the cast request, stopping receiving audio data and video data of each party from the server, and controlling the display to display only a video image of the local display apparatus.

14. The method of claim 1, wherein the display is configured to present at most n call windows which comprise the one or more video chatting windows in the first area and the one or more voice chatting windows in the second area, and the method further comprises:
in response to the quantity Y being greater than n, controlling the display to play call data of n call users among Y call users, wherein the call data comprises video data and audio data, and n is an integer greater than or equal to 2;
detecting audio data in call data of channels of the Y parties during call;
in response to first audio data in first-channel call data among the call data of channels of the Y parties satisfying a preset condition and the first-channel call data being not among the one or more video chatting windows presented on the first area and the one or more voice chatting windows presented on the second area, controlling a first call window to stop displaying call data, and control the first call window to output the first audio data, wherein the first call window is a call window ranked first among the one or more video chatting windows or the one or more voice chatting windows.

15. The method of claim 12, further comprising:
in response to a selection operation on a first control, controlling the display to present a control list associated with the first control on a floating layer above the call interface, wherein the control list comprises a control associated with switching between a video chatting window and a voice chatting window; and
in response to a selection operation on the control associated with switching between the video chatting window and the voice chatting window;
determining the target voice chatting window in the second area;
controlling the display to present a pop-up window for selecting a fourth party on the floating layer, wherein user IDs of the X video chatting windows in the first area are displayed in the pop-up window;
selecting a target video chatting window corresponding to the fourth party in the pop-up window.

16. The method of claim 15, wherein the control list further comprises an invitation control, and the method comprises:
in response to a selection operation on the invitation control, sending invitation information to a display apparatus of a fifth party invited by the user through the server;
in response to invitation success information sent from the display apparatus of the fifth party based on the invitation information, controlling the display to present a newly added window for voice chatting in the second area, obtaining audio data of the fifth party from the server, and play the audio data of the fifth party in the newly added voice chatting window.

17. The method of claim 11, further comprising:
displaying the one or more video chatting windows in the first area according to a time sequence in which call parties join a virtual room corresponding to the video call after the video call is started;

in response the total quantity of video chatting windows in the first area reaching the preset number X of channels, switching subsequent call parties accessing the virtual room to voice access, and presenting voice chatting windows in sequence in the second area according to a time sequence of the subsequent call parties joining the virtual room.

18. The method of claim 13, further comprising:

controlling the display to present a control for indicating that cast is being started in a cast state area, after sending the cast request and before receiving the cast success information; and controlling the display to present a control for indicating that the cast is being performed in the cast state area, and controlling the display to present a device switch control for switching a cast device and a cast exit control, after receiving the cast success information.

19. The method of claim 18, further comprising:

in response to a selection operation on the device switch control, controlling the display to present a device list which is able to accept content cast from the local display apparatus, and sending first indication information to the target device, wherein the first indication information is used to indicate the target device to control a second application installed in the target device to stop receiving call data of each call party from the server and exit from current video call; and in response to a selection operation on a first device in the device list, sending a cast request to the first device; and in response to a selection operation on the cast exit control, sending second indication information to the target device, wherein the second indication information is used to indicate the target device to control the second application installed in the target device to stop obtaining call data of each call party from the server, exit the current video call and send cast exit information to the display apparatus.

20. The method of claim 19, further comprising:

in response to the cast exit information sent from the target device, controlling a first application installed in the display apparatus to resume receiving call data of each call party from the server, controlling the display to display video images of a local call party and each call party, and controlling the audio player to play audio data of each call party, wherein the first application is a video call application in the display apparatus.

* * * * *